United States Patent [19]

Kawaguchi et al.

[11] Patent Number: 5,217,252
[45] Date of Patent: Jun. 8, 1993

[54] ACTUATOR FOR USE IN EMERGENCY SITUATION OF VEHICLE

[75] Inventors: Teruhiko Kawaguchi; Keiichi Tamura; Hisahiro Ando; Tamotsu Horiba; Kenichi Kinoshita, all of Aichi, Japan

[73] Assignee: Kabushiki Kaisha Tokai-Rika-Denki-Seisakusho, Aichi, Japan

[21] Appl. No.: 684,177

[22] Filed: Apr. 12, 1991

[30] Foreign Application Priority Data

| | | | |
|---|---|---|---|
| Apr. 17, 1990 | [JP] | Japan | 2-40930[U] |
| Jul. 5, 1990 | [JP] | Japan | 2-178429 |
| Jul. 19, 1990 | [JP] | Japan | 2-191170 |
| Jul. 19, 1990 | [JP] | Japan | 2-191171 |
| Aug. 7, 1990 | [JP] | Japan | 2-209025 |
| Aug. 8, 1990 | [JP] | Japan | 2-209492 |
| Aug. 13, 1990 | [JP] | Japan | 2-214080 |
| Aug. 28, 1990 | [JP] | Japan | 2-225573 |
| Sep. 3, 1990 | [JP] | Japan | 2-232905 |
| Sep. 6, 1990 | [JP] | Japan | 2-236637 |

[51] Int. Cl.⁵ ............................................. B60R 21/32
[52] U.S. Cl. ..................................... 280/731; 280/735
[58] Field of Search ........................ 280/731, 732, 735

[56] References Cited

U.S. PATENT DOCUMENTS

| | | | |
|---|---|---|---|
| 3,556,556 | 1/1971 | Goetz | 280/735 |
| 3,768,832 | 10/1973 | Schmidt | 280/735 |
| 4,021,057 | 5/1977 | Held | 280/735 |
| 4,573,706 | 3/1986 | Breed | 280/731 X |
| 4,851,705 | 7/1989 | Musser | 280/735 X |
| 5,031,931 | 7/1991 | Thuen | 280/735 |
| 5,069,479 | 12/1991 | Koide | 280/731 X |

*Primary Examiner*—Richard A. Schacher
*Attorney, Agent, or Firm*—Sixbey, Friedman, Leedom & Ferguson

[57] ABSTRACT

An actuator for use in an air bag device which is inflated by a gas as a firing pin is moved by the movement of an inertia member to actuate a gas generator and in a preloader of a webbing retractor actuated by the gas. A contact is provided for outputting an electrical signal by being turned on at the time of movement of the inertia member or movement of the firing pin. Accordingly, by providing another gas generating means adapted to be actuated in correspondence with an output of this contact, it is possible to actuate a plurality of air bag devices or preloaders.

21 Claims, 40 Drawing Sheets

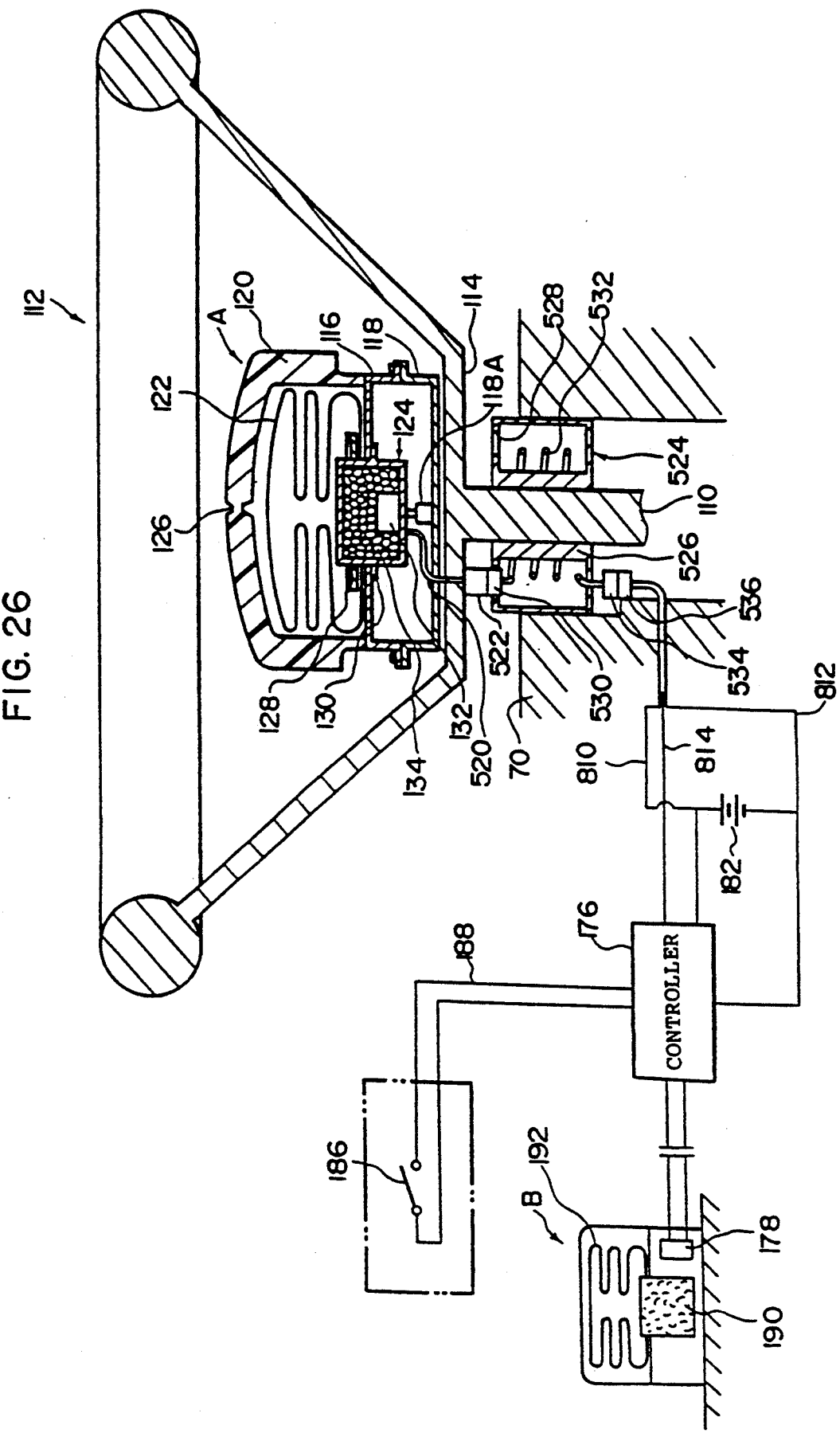

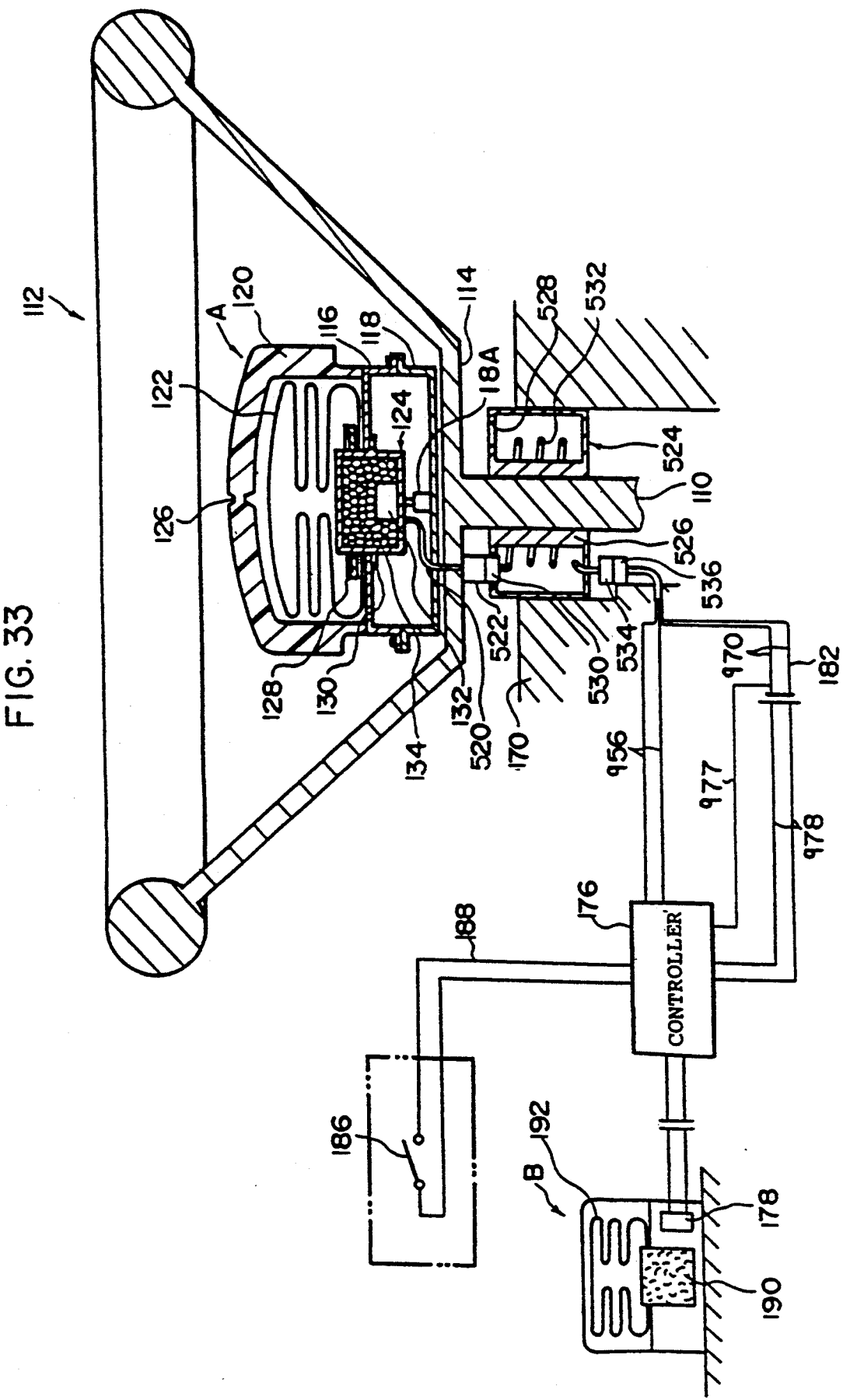

ACTUATOR FOR USE IN EMERGENCY SITUATION OF VEHICLE

BACKGROUND OF THE INVENTION

1. Field of the Invention

The present invention relates to an actuator for use in an air bag device which is inflated at the time of a sudden deceleration of the vehicle or in a preloader of a webbing retractor which is actuated at the time of the sudden deceleration of the vehicle. More particularly, the present invention concerns an actuator for actuating a plurality of air bag devices or preloaders by means of a single acceleration sensor.

2. Description of the Related Art

As an actuator for actuating an air bag device or a preloader of a webbing retractor, a so-called mechanically operated-type actuator is used in which an inertia member is employed and a firing pin actuates a gas generating means at the time of operation of the inertia member.

For example, in a case where a plurality of air bag devices are mounted on a single vehicle by using this mechanically operated-type actuator, e.g., a driver's seat and a passenger's seat are provided with air bag bodies, respectively, it is necessary to provide actuators in correspondence with the air bag bodies, respectively. However, it is desirable that these air bag devices be actuated simultaneously at a predetermined deceleration, and in order to actuate the air bag devices simultaneously at a strictly identical deceleration, it is necessary to fabricate the inertia members and their related components to extremely high degrees of precision.

SUMMARY OF THE INVENTION

In view of the foregoing, it is an object of the present invention to provide an actuator capable of simultaneously actuating a plurality of devices such as a plurality of air bag devices or a plurality of air bag devices and preloaders.

To this end, in accordance with one aspect of the present invention, there is provided an actuator comprising: an inertia member adapted to move at the time of a sudden deceleration of a vehicle; a moving member adapted to be moved by an urging force with the movement of the inertia member so as to actuate first gas generating means; and energizing means for outputting an electrical signal as a result of movement of one of the inertia member and the moving member so as to actuate second gas generating means.

With the actuator constructed as described above, at the time of a sudden deceleration of the vehicle, the inertia member moves, and the moving member is moved by an urging force as a result of movement of this inertia member so as to actuate the first gas generating means. In addition, owing to movement of the inertia member or the movement of the moving member, an electrical signal is outputted from the energizing means to actuate the second gas generating means. Accordingly, in a case where a first air bag device is provided in correspondence with the first gas generating means, and a second air bag device is provided in correspondence with the second gas generating means, the first and second air bag devices are actuated virtually simultaneously. Specifically, the first air bag device can be installed on a steering wheel, and the second air bag device in a dashboard, thereby to correspond to both a driver's seat and a passenger's seat.

In accordance with another aspect of the present invention, there is provided an actuator comprising: an inertia member adapted to move at the time of a sudden deceleration of a vehicle; a drive shaft adapted to be rotated by the movement of the inertia member; a moving member whose engagement with the drive shaft is canceled by the rotation of the drive shaft, and which is adapted to be moved by the release of an urging force accumulated in urging means, so as to actuate first gas generating means; and energizing means adapted to output an electrical signal when one of the rotation of the drive shaft, release of the urging force of the urging means, and movement of a firing pin takes place, so as to actuate second gas generating means.

With the actuator constructed as described above, at the time of a sudden deceleration of the vehicle, the inertia member moves, and the drive shaft is rotated by the movement of this inertia member. The rotation of the drive shaft causes the urging force accumulated in the urging to be released, which in turn causes the moving member to move to actuate the first gas generating means. When one of the rotation of the drive shaft, release of the urging force of the urging means, and movement of a firing pin takes place, an electrical signal is outputted by the energizing means to actuate the second gas generating means. Accordingly, in a case where an air bag device is provided in correspondence with the first gas generating means, and a preloader is provided in correspondence with the second gas generating means, the air bag device and the preloader are actuated virtually simultaneously.

It should be noted that the second gas generating means may comprise a plurality of gas generating devices. In this case, each gas generating device is made to correspond with the air bag device or the preloader.

The above and other objects, features and advantages of the present invention will become more apparent from the following detailed description of the invention when read in conjunction with the accompanying drawings.

BRIEF DESCRIPTION OF THE DRAWINGS

FIGS. 17A to 17C are diagrams illustrating the operation of the firing pin and the photointerrupter shown in FIG. 15;

FIG. 26 is a schematic diagram of air bag devices provided for the driver's seat and the passenger's seat, respectively, in accordance with the eighth embodiment;

FIG. 33 is a schematic diagram of air bag devices provided for the driver's seat and the passenger's seat, respectively in accordance with the ninth embodiment;

DESCRIPTION OF THE PREFERRED EMBODIMENTS

Figure 1:
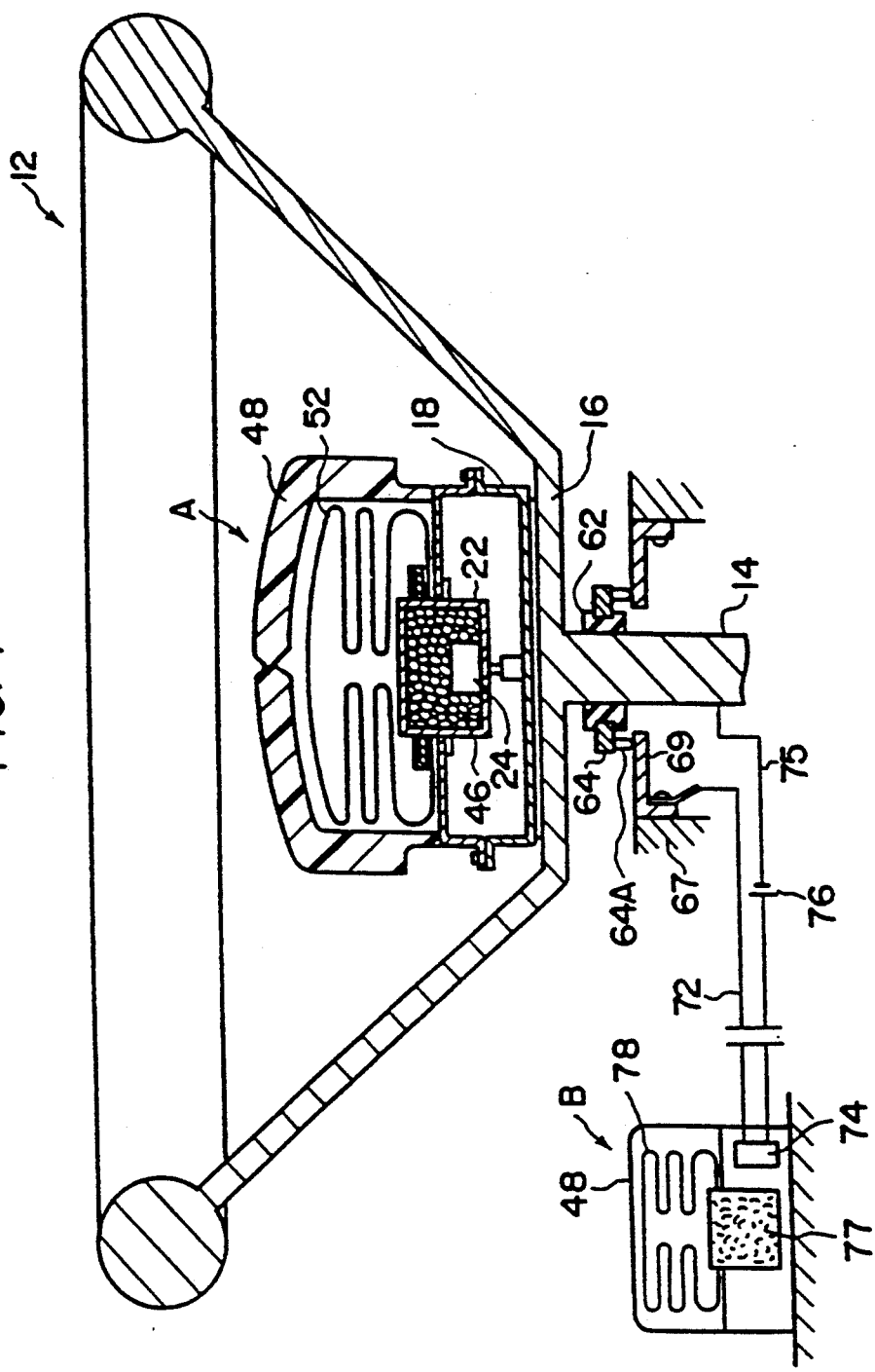
FIG. 1 is a cross-sectional view illustrating a first embodiment to which the present invention is applied.

FIG. 1 illustrates a schematic cross-sectional view of an air bag device to which the present invention is applied.

A steering wheel 12 for a driver's seat has a hub 16 secured to a tip of a steering shaft 14.

Figure 2:
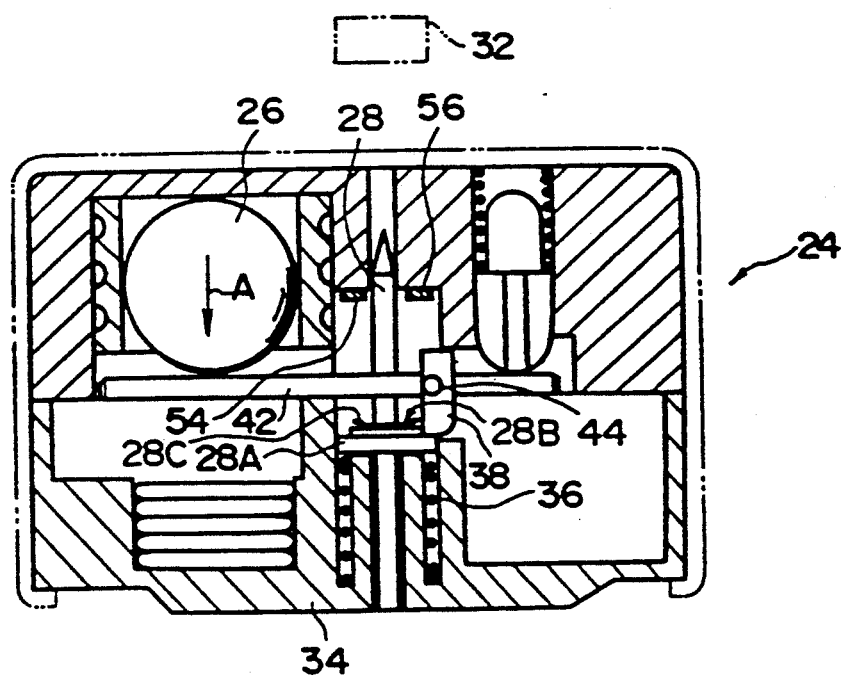
FIG. 2 is a cross.sectional view of an acceleration sensor shown in FIG. 1.

A bracket 18 is secured to the hub 16, and an inflator 22 is mounted on the bracket 18. An acceleration sensor 24 shown in FIG. 2 is disposed in the inflator 22, and is arranged such that a firing pin 28 is adapted to actuate a detonator 32 by means of an inertia member 26. That is, a tip portion of the firing pin 28 is urged toward the detonator 32 by means of a compression coil spring 36 interposed between a collar 28A and a sensor case 34.

In a normal state, the movement of the firing pin 28 is prevented by engagement of a block 38 with the collar 28A, and a distal end of an arm 42 projecting from the block 38 corresponds to the inertia member 26. Accordingly, when the deceleration of the vehicle reaches a predetermined value, the inertia member 26 moves in the direction of arrow A and causes the arm 42 and the block 38 to rotate about a pin 44, which cancels the engagement between the block 38 and the collar 28A, thereby allowing the firing pin 28 to collide against the detonator 32 to actuate the same.

A gas generating agent 46 shown in FIG. 1 is disposed in the vicinity of the detonator 32, and a gas generated by the gas generating agent 46 is adapted to be sent into a bag 52 which is an air bag body accommodated in a cover 48 in a folded state. As a result, the bag 52 is inflated and opens up the cover 48 so as to expand toward the front of an occupant of the vehicle.

As shown in FIG. 2, the collar 28A of the firing pin 28 is provided with a contact member 28B formed of an electrically conductive spring material and located on its surface opposing the detonator 32. This contact member 28B has its opposite ends bent toward the detonator 32 to serve as a bent portion 28C which, when pressed, undergoes resilient deformation in the direction in which it is pressed. Contacts 54, 56 are disposed in correspondence with the bent portion 28C of the contact member 28B. These contacts 54, 56 are turned on by the contact member 28B when the firing pin 28 moves by a stroke required for colliding against the detonator 32.

One of the contacts 54, 56 is connected to the steering shaft 14, and the other to a rotating ring 64 secured to the steering shaft 14 shown in FIG. 1 via an insulator 62.

A projection 64A of the rotating ring 64 abuts against a connecting plate 69 secured to a chassis 67. Accordingly, the projection 64A constantly abuts against the connecting plate 69 even when the steering wheel 12 is rotated.

Furthermore, the connecting plate 69 is connected to a detonator 74 of an air bag device B disposed on the passenger's seat side. In addition, the steering shaft 14 is connected to the detonator 74 via a wiring 75 and a power supply 76. Accordingly, when the firing pin 28 turns on the contacts 54, 56 on the driver's seat side, the detonator 74 on the passenger's seat side is actuated to operate a gas generating agent 77 located on the passenger's seat side. It should be noted that, on the passenger's seat side as well, a bag 78 having the same configuration as that on the driver's seat side is disposed within an instrument panel.

In addition to the slip ring using the rotating ring 64, it is possible to use any other arrangement if it is capable of leading the wirings 72, 75 from the rotating steering wheel to the air bag device B.

The operation of this embodiment will be described hereinunder.

In a normal running state of the vehicle, as shown in FIG. 2, the block 38 is engaged with the collar 28A to keep the firing pin 28 spaced apart from the detonator 32.

When the vehicle undergoes a sudden deceleration, the inertia member 26 moves in the direction of arrow A, causing the arm 42 and the block 38 to rotate about the pin 44 counterclockwise as viewed in FIG. 2. As a result, the engagement of the block 38 with the collar 28A is canceled, so that the firing pin 28 moves linearly by the urging force of the compression coil spring 36 and collides against the detonator 32. Consequently, the detonator 32 is actuated, so that the gas generating agent 46 generates a large amount of gas, thereby inflating the bag 52.

Meanwhile, since the contact member 28B of the collar 28A is concurrently brought into contact with the contacts 54, 56, these contacts 54, 56 are turned on, a signal thereof being transmitted to the detonator 74 on the passenger's seat side via the wirings 72, 75. As a result, the detonator 74 is actuated, so that the gas generating agent 77 inflates the bag 78 in the same way as the air bag device A on the driver's seat side. Hence, both the bags 52, 78 for the driver's and passenger's seats are simultaneously inflated, and the actuation of one air bag device alone is prevented.

It should be noted that the contacts for detecting the movement of the firing pin are not restricted to the above-described arrangement, and the contacts may be adapted to detect an interim state of movement of the firing pin, or may be disposed on an outer side of the sensor case 34.

In addition, although in this embodiment a description has been given of an example in which the contact member 28B is disposed on the firing pin 28, the invention is not restricted to this arrangement. For instance, the firing pin 28 itself may be formed of an electrically conductive material, or only the collar 28A may be formed of an electrically conductive material.

A description will now be given of a second embodiment.

Figure 3:
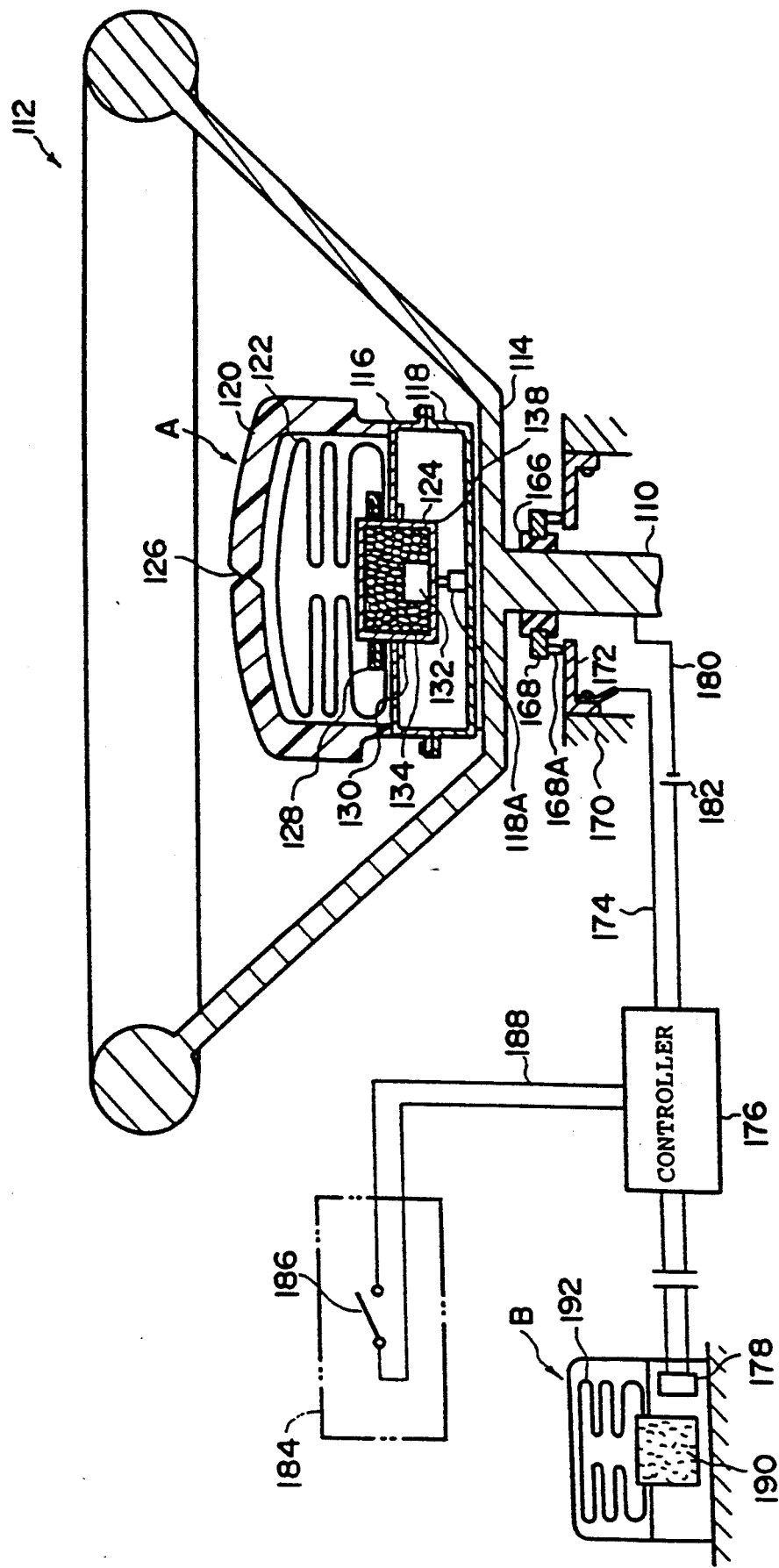
FIG. 3 is a schematic diagram of air bag devices provided for a driver's seat and a passenger's seat, respectively, in accordance with a second embodiment.

FIG. 3 shows a schematic cross-sectional view of the air bag device A on the driver's seat side and the air bag device B on the passenger's seat side in accordance with this embodiment.

In the air bag device A on the driver's seat side, a hub 114 of a steering wheel 112 is secured to a tip of a steering shaft 110, and a substantially box-shaped base plate 116 is supported via a substantially box-shaped supporting bracket 118 in parallel with the hub 114. Fixed to the base plate 116 are a pad 120, a bag 122, and an inflator 124.

Figure 4:
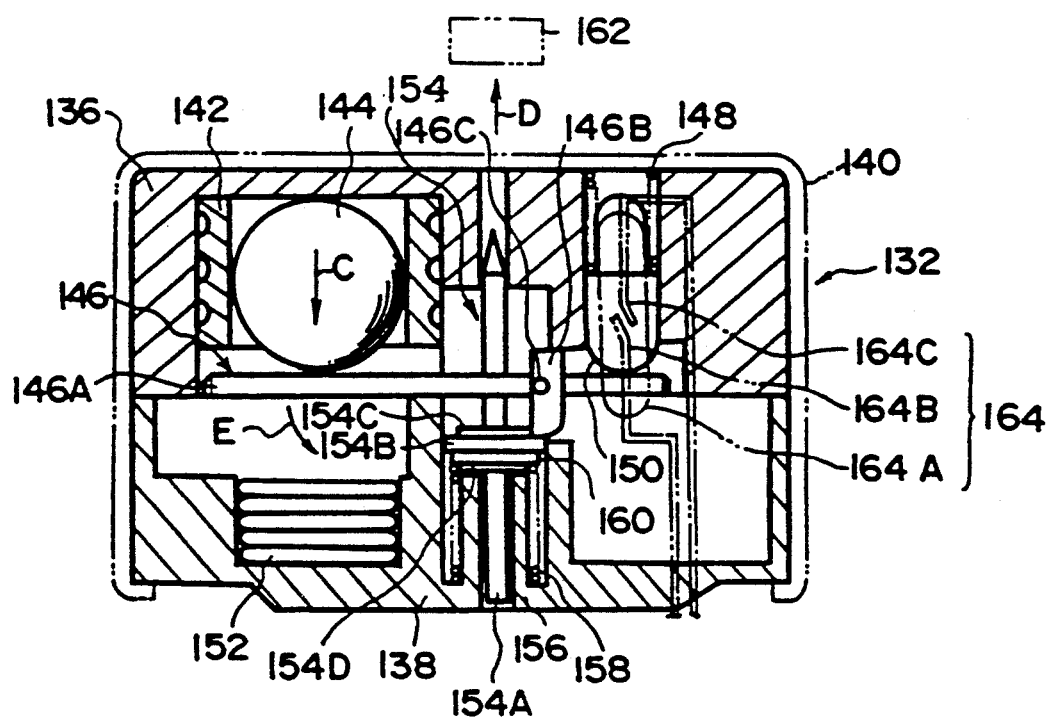
FIG. 4 is a cross-sectional view of an actuator body shown in FIG. 3.

The pad 120 is disposed on the occupant's side of the base plate 116 (on the side opposite to the direction of arrow C in FIG. 4). An unillustrated frame-like core is embedded in a peripheral edge of the pad 120, and the pad 120 is secured to a peripheral edge of the base plate 116 by means of rivets or the like via the core. In addition, a thin-walled portion 126 is formed in a portion of the pad 120 opposing the base plate 116, so that the pad 120 is liable to be broken at this thin-walled portion 126.

Figure 5:
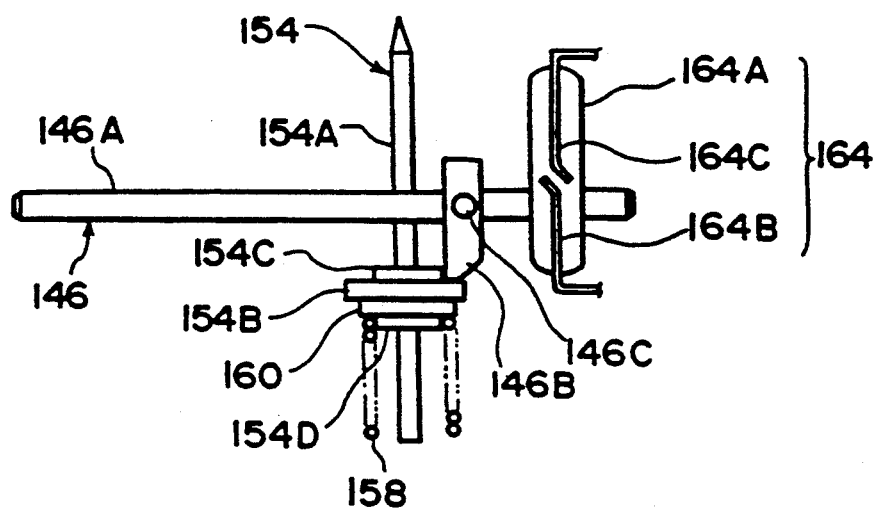
FIG. 5 is an enlarged view of an essential portion including a reed switch, a magnet, and a firing pin that are disposed in the actuator body in accordance with the second embodiment.

The bag 122 is disposed on the occupant's side of the base plate 116 in a folded state, and is accommodated between the base plate 116 and the pad 120. An edge of the bag 122 on its opening side is secured to a substantially central portion of the base plate 116 via a ring plate 128. The ring plate 128 is tightened to the base plate 116 by means of unillustrated bolts, and presses the opening-side edge of the bag 122 against the base plate 116. The inflator 124 is formed into a cylindrical configuration and is disposed in such a manner as to penetrate a circular hole formed in a substantially central portion of the base plate 116. The inflator 124 has a flange 130 formed at its axially intermediate portion in such a manner as to extend radially of the inflator 124. The flange 130 is secured to a surface of the base plate 116 which is remote from a surface thereof opposing the occupant by means of unillustrated bolts. In addition, a plurality of gas holes (not shown) are formed in a peripheral surface of the inflator 124 on the occupant side at predetermined intervals. An actuator body 132 which will be described later is incorporated in an axial portion of the inflator 124, while an unillustrated booster is disposed in an outer peripheral portion of the actuator body 132, and a gas generating agent 134 is sealed therein. Hereinafter, a detailed description will be given of the actuator body 132 with reference to FIGS. 4, 5, and 6.

As shown in FIG. 4, this actuator body 132 has an upper case 136 and a lower case 138 each having a substantially cylindrical configuration. The upper case 136 and the lower case 138 as fitted together are accommodated in a cover 140 a peripheral edge of which is caulked so as to secure the two cases 136, 138.

A cylinder 142 is disposed in the upper case 136 along an axial direction thereof, and a ball 144 serving as an inertia member is accommodated in the cylinder 142. At a sudden deceleration of the vehicle, the ball 144 moves owing to its inertia in the direction of arrow C in FIG. 4. The respective components within the actuator body 132, including the ball 144, are provided in pairs in such a manner as to be disposed at symmetrical positions about the axis of the actuator body 132, and a description will be given below of components located on one side only.

One end portion of a shaft 146A of a drive shaft 146 disposed within a plane of abutment between the upper case 136 and the lower case 138 abuts against a portion of the surface of the ball 144 which is remote from a portion of the surface thereof opposing the occupant. A retaining portion 146B perpendicular to the shaft 146A is formed in the vicinity of an axially intermediate portion of the drive shaft 146. A pair of support shafts 146C project from the retaining portion 146B from opposite sides thereof for pivotally supporting the retaining portion 146B.

In the upper case 136, a bias pin 150 pressed and urged by a bias spring 148 is disposed. A tip of the bias pin 150 abuts against the other end portion of the shaft 146A of the drive shaft 146.

In the lower case 138, a coil spring 152 is disposed on the opposite side of the ball 144 with the shaft 146A of the drive shaft 146 as a center. The coil spring 152 comprises a coil portion and a hook portion projecting radially of the occupant-side end of the coil portion. Although the hook portion is not shown in FIG. 4, a coil-portion side of the hook portion is retained by a release pin (not shown) inserted in an axial portion of the actuator body 132, while a tip portion of the hook portion is located at a portion of the surface of the other ball (located on the opposite side of the ball 144 with the axis of the actuator body 132 as a center in FIG. 4) which is remote from a portion of the surface thereof opposing the occupant. In a state prior to the assembly of the air bag device A onto the steering wheel 112, the movement of the other ball in the direction of inertial movement as well as the rotation of the drive shaft 146 are prevented by means of this coil spring 152. However, in a state after assembly, since the release pin is pressed by a projecting portion 118A of the supporting bracket 118 and thereby moves away from the occupant against the urging force of the coil spring 152, the hook portion is retracted from the aforementioned position and sets the actuator body 132 in an operative state.

In addition, disposed in the actuator body 132 is a firing pin 154 (shown in both FIGS. 5 and 6) serving as a firing member. This firing pin 154 has a shaft portion 154A, and a collar 154B is formed around an axially intermediate portion thereof. The shaft portion 154A is loosely fitted inside a compression coil spring 158 inserted over a spring supporting portion 156 formed in the lower case 138. Disk-shaped retaining plates 154C, 154D are formed integrally with both surfaces of the collar 154B, respectively, and the retaining portion 146B of the drive shaft 146 is retained by a stepped portion formed by the occupant-side retaining plate 154C and the collar 154B. In addition, a cylindrically shaped permanent magnet 160 is inserted in and secured to the retaining plate 154D located farther from the occupant, and the compression coil spring 158 is retained by a stepped portion formed by this permanent magnet 160 and the retaining plate 154D located farther from the occupant. For this reason, the compression coil spring 158 presses and urges the firing pin 154 in the direction of arrow D in FIG. 4. A detonator 162 is disposed on the path of movement of the firing pin 154.

Now, as shown in FIGS. 4, 5, and 6A–6C, a reed switch 164 is disposed in the actuator body 132 in proximity to the firing pin 154 (in FIG. 4, the reed switch 164 is indicated by phantom lines). This reed switch 164 has a glass 164A with an inert gas sealed therein, and two resilient reed pieces 164B, 164C formed of a ferromagnetic substance are disposed in this glass tube 164A in such a manner that their end portions oppose each other.

During the normal running of the vehicle, the reed pieces 164B, 164C of the reed switch 164 are in a spaced-apart state (a non-actuated state of the reed switch 164, shown in FIG. 6A) by virtue of their own resiliency. On the other hand, when the vehicle undergoes a sudden deceleration, the firing pin 154 moves toward the detonator (in the direction of arrow D in FIG. 4) a predetermined distance, and magnetic flux generated by the permanent magnet 160 passes through the reed pieces 164B, 164C. As a result, the opposing portions thereof are attracted toward each other so as to be set in a state of contact (an actuated state of the reed switch 164, shown in FIGS. 6B and 6C).

Figure 6A:
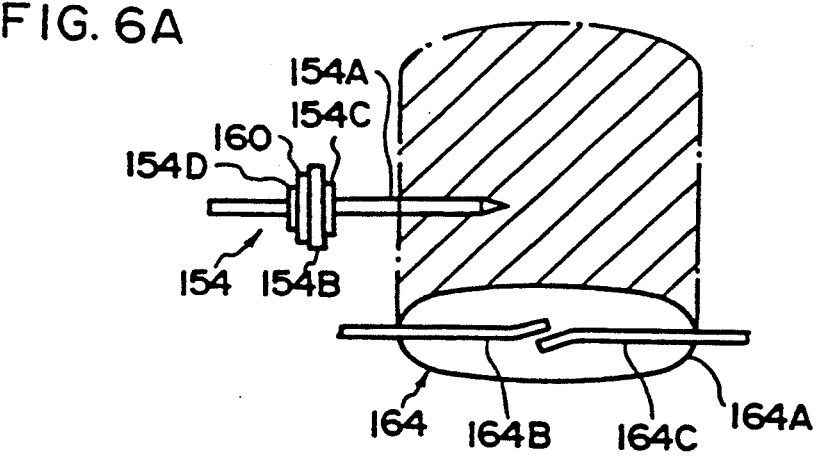
FIGS. 6A to 6C are diagrams illustrating the operation of the firing pin and the reed switch shown in FIG. 5.
Figure 6B:
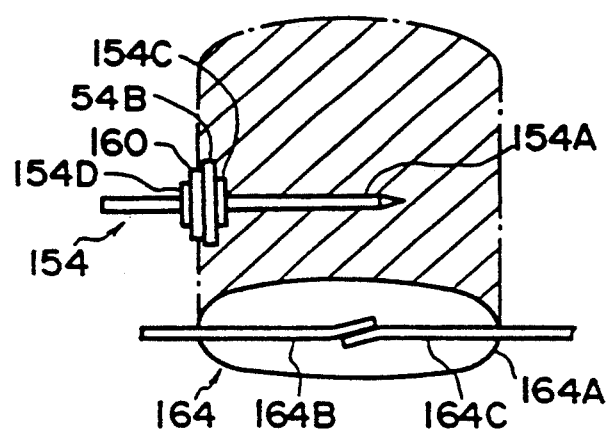
Figure 6C:
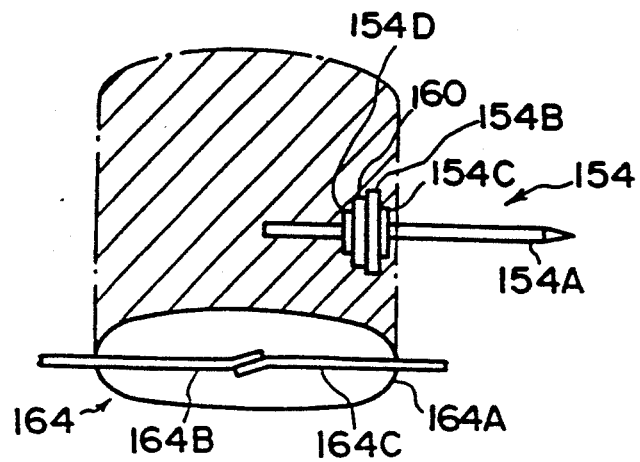

To give a more detailed description, during the normal running of the vehicle, as shown in FIG. 6A, i.e., in a state in which the firing pin 154 has not moved, the magnetic flux generated by the permanent magnet 160 does not interfere with the "on" zone (a region indicated by a hatched portion in FIGS. 6A–6C) of the reed switch 164. On the other hand, as shown in FIG. 6B, when the vehicle undergoes a sudden deceleration, the firing pin 154 moves toward the detonator 162 and enters the "on" zone, and the point of time when the central position of the permanent magnet 160 reaches a boundary of the "on" zone is the point of time when the reed switch 164 is turned on. In addition, in a state in which the tip of the shaft portion 154A of the firing pin 154 collides against the detonator 162, as shown in FIG. 6C, the central position of the permanent magnet 160 is located in the "on" zone, so that the red switch 164 remains turned on since the starting time of its operation.

As shown in FIG. 3, one reed piece 164A of the reed switch 164 is connected to the steering shaft 110, and the other reed piece 164C is connected to a rotating ring 168 secured to the steering shaft 110 via an insulator 166. This rotating ring 168 has a projection 168A formed thereon, and this projection 168A abuts against a connecting plate 172 secured to a chassis 170. Accordingly, the projection 168A constantly abuts against the connecting plate 172 regardless of whether or not the steering wheel 112 is rotated.

In addition, the connecting plate 172 is connected to a controller 176 by means of a wiring 174, and is further connected to an electrical detonator 178 via an unillustrated filament disposed in the electrically-fired type air bag device B on the passenger's side. The steering shaft 110 is in turn connected to the electrical detonator 178 via a wiring 180, a chassis electric supply 182, and the controller 176. The controller 176 is in turn connected to a buckle switch 186 inside a buckle device 184 on the passenger's side via a wiring 188.

The air bag device B on the passenger's side is so arranged that an electric current flows across the filament only when both the buckle switch 186 and the reed switch 164 are turned on. When the current flows across the filament, Joule heat is produced to ignite the electrical detonator 178, which in turn causes a gas generating agent 190 to react, thereby inflating a bag 192.

The operation of this embodiment will be described hereinunder.

In the normal running state of the vehicle, since the ball 144 does not move and the amount of inertial movement is very small, the retaining portion 146B of the drive shaft 146 is prevented from being disengaged from the collar 154B of the firing pin 154 by means to the urging force of the bias spring 148. For this reason, the firing pin 154 is in the state shown in FIG. 6A, and the permanent magnet 160 is located completely outside the "on" zone of the reed switch 164. Accordingly, since the magnetic flux does not pass through the reed pieces 164B, 164C of the reed switch 164, the reed switch 164 is not turned on and remains nonoperative. As a result, the actuator body 132 is not actuated, and the normal running state of the vehicle is maintained.

When the vehicle undergoes a sudden deceleration in this state, the ball 144 moves greatly owing to its inertia in the direction of arrow C in FIG. 4. Consequently, the drive shaft 146 rotates about the support shafts 146C in the direction of arrow E in FIG. 4, allowing the retaining portion 146B to be disengaged from the collar 154B of the firing pin 154. As a result, the firing pin 154 moves in the direction of arrow D in FIG. 4 by means of the urging force of the compression coil spring 158 and collides against the detonator 162. Hence, the detonator 162 is ignited and the gas generating agent 134 reacts via an unillustrated booster, thereby generating a large amount of gas. Accordingly, the bag 122 is inflated, breaking the pad 120 at the thin-walled portion 126. After the pad 120 is broken, the inflated bag 122 is interposed between the steering wheel 112 and the occupant. As a result, the occupant is protected securely from an impact at the time of the sudden deceleration of the vehicle.

Meanwhile, in conjunction with the movement of the firing pin 154, the permanent magnet 160 also moves by following the same. As shown in FIG. 6B, when the central position of the permanent magnet 160 reaches a boundary of the "on" zone of the reed switch 164, the magnetic flux generated by the permanent magnet 160 passes through the reed pieces 164B, 164C of the reed switch 164, so that the reed pieces 164B, 164C of the reed switch 164 are brought into contact with each other, allowing the reed switch 164 to be turned on. It should be noted that this operating state of the reed switch 164 continues positively from the starting point of operation until the firing pin 154 collides against the detonator 162 as shown in FIG. 6C.

As a result, an electrical signal is sent to the controller 176 via the wirings 174, 180. Here, in a case where an occupant is not seated in the passenger's seat, i.e., when the buckle switch 186 on the passenger's seat side is not turned on, this electrical signal is not sent from the controller 176 to the passenger's seat-side air bag device B, so that this air bag device B is not operated. However, in a case where the occupant is seated in the passenger's seat, i.e., when the buckle switch 186 is turned on, this electrical signal is sent from the controller 176 to the passenger's seat-side air bag device B. As a result, electric current flows across the filament, so that Joule heat is produced to ignite the electrical detonator 178, thereby allowing the gas generating agent 190 to produce a large amount of gas. Hence, the passenger's seat-side air bag device B is actuated, and as the bag 192 is inflated, the occupant seated in the passenger's seat is protected.

Thus, in accordance with this embodiment, the air bag device A of a mechanically ignited type is disposed on the driver's seat side and the air bag device B of an electrically ignited type is disposed on the passenger's seat side. In addition, the permanent magnet 160 adapted to move in conjunction with the movement of the firing pin 154 as well as the reed switch 164, which is operated when the central position of the permanent magnet is inside the "on" zone, are disposed inside the actuator body 132. Accordingly, both the driver's seat-side air bag device A and the passenger's seat-side air bag device B can be actuated simultaneously by means of the single actuator body 132 at the time of a sudden deceleration of the vehicle.

In addition, as compared with a case where the electrically ignited-type air bag devices are disposed on both the driver's seat side and the passenger's seat side as in the conventional case, the sensors, wire harness, etc. that are disposed in the vicinity of the front wheels of the vehicle, respectively, become unnecessary. Hence, it is possible to reduce the number of components used, and effect a substantial reduction in the cost. Furthermore, since it is unnecessary to secure spaces for installing the sensors, wires, wire harness, etc. in the vehicle, there is an advantage in design.

Furthermore, in this embodiment, since in the case where an occupant is not seated in the passenger's seat, the pssenger's seat-side air bag device B is prevented from being actuated by means of the controller 176. Hence, it is possible to prevent the passenger's seat-side air bag device B from being actuated unnecessarily, thereby contributing to the improvement of safety.

Furthermore, in this embodiment, a description has been given of one actuator being applied to the driver's seat-side air bag device A and of another actuator being applied to the passenger's seat-side air bag device B. However, the embodiment is not restricted to this arrangement, and is applicable to all other arrangements in which a plurality of actuators are operated by a single actuator, such as an arrangement in which one actuator is applied to a takeup shaft driving member of a preloader which is disposed in a driver's seat-side webbing retractor and adapted to forcedly take up a webbing onto the takeup shaft, while another actuator is applied to a takeup shaft driving member of a preloader of the same construction which is disposed in a passenger's seat-side webbing retractor.

In addition, although in this embodiment the present invention is applied to an actuator body 132 of a type provided with the drive shaft 146, the present invention is not restricted to the same. For instance, the present invention is applicable to an actuator for an air bag constructed such that the drive shaft 146 is not employed by using as an inertia member a cylindrical mass partially projecting in the axial direction, and by allowing the projecting portion of the mass to directly retain the collar 154B of the firing pin 154.

Furthermore, although in this embodiment the permanent magnet 160 is used as the magnet, the magnet is not restricted to the same, and an electromagnet or the like may be used. That is, any arrangement may be used insofar as the magnet is capable of moving by following the firing pin 154 and magnetic flux is capable of passing through the reed pieces 164B, 164C of the reed switch 164.

Although in this embodiment the controller 176 is connected to only the reed switch 164, the passenger's seat-side air bag device B, and the buckle switch 186, the controller 176 may also be connected to a failure memory or the like for storing a failure of the electrically ignited-type air bag device B, if it should occur, due to some cause or other.

Although in this embodiment the reed switch 164 is used in which the reed pieces 164B, 164C are spaced apart from each other in the normal running state of the vehicle but contact each other when magnetic flux passes through the reed pieces 164B, 164C at the time of a sudden deceleration of the vehicle, this arrangement may be reverse. For instance, an arrangement may be alternatively provided such that the reed pieces 164A, 164B are normally set in a mutually contacting state, and the reed pieces 164B, 164C are spaced apart by being attracted by respective magnetic members as magnetic flux passes through the magnetic members at the time of a sudden deceleration of the vehicle.

Figure 7:
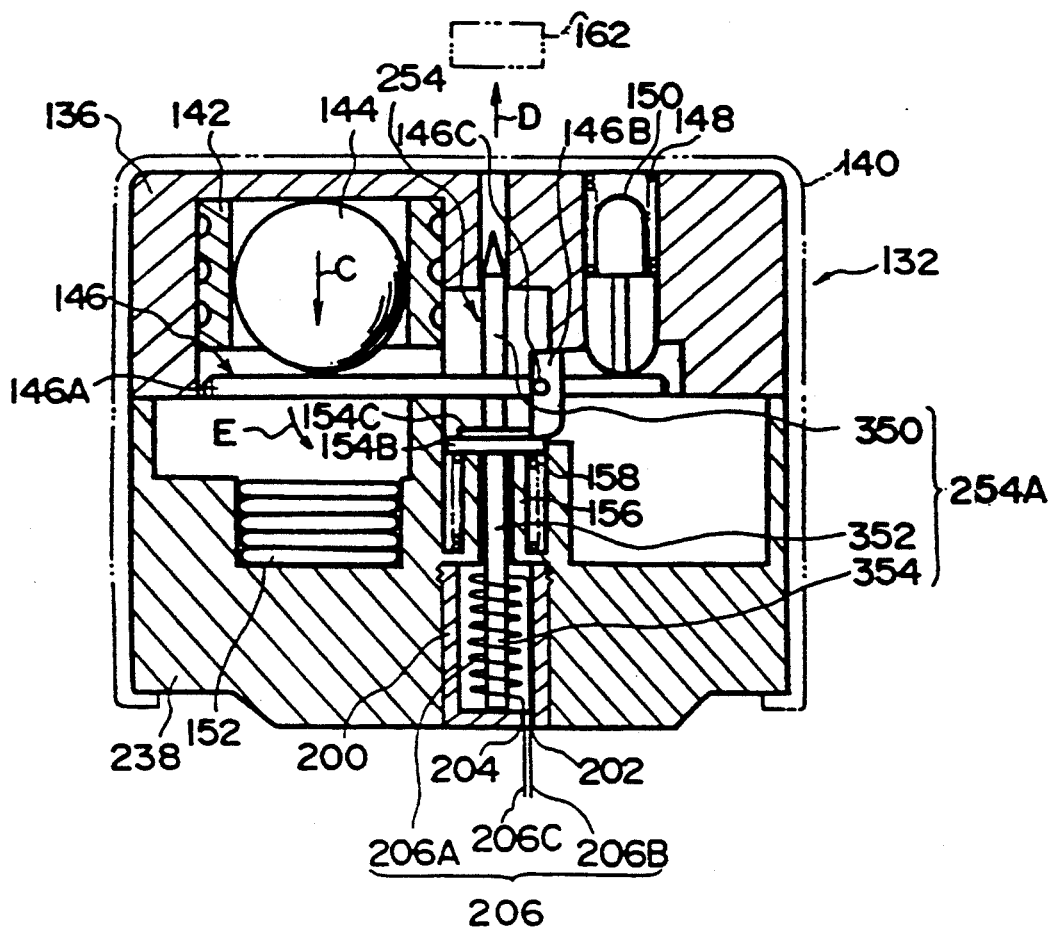
FIG. 7 is a cross-sectional view of an actuator body in accordance with a third embodiment.

Referring now to FIGS. 7 and 8, a description will be given of a third embodiment.

In the description of this embodiment, the same arrangements, members and the like as those of the second embodiment will be denoted by the same reference numerals used in the second embodiment, and a description thereof will be omitted.

Since the schematic configuration of this embodiment is similar to that of the second embodiment shown in FIG. 3, the configuration shown in FIG. 3 will also be referred to, as necessary.

In this embodiment, the arrangement of a firing pin 254 and its peripheral components in the actuator body 132 differs from that of the second embodiment, so that a description will be given centering on this aspect.

In this firing pin 254, its portion below the collar 154B (see FIG. 7) is longer than that of the firing pin 154 of the second embodiment.

A portion of a shaft portion 254A on the occupant's side with the collar 154B of the firing pin 254 as a reference will be referred to as an upper portion 350 of the shaft portion; a remaining upper half portion, as viewed in FIG. 7, of the shaft portion 254A with an axially intermediate portion of the portion of the shaft portion 254A on the side away from the occupant as a boundary will be referred to as an intermediate portion 352 of the shaft portion; and a remaining lower half portion, as viewed in FIG. 7, of the shaft portion 254A with the axially intermediate portion of the portion of the shaft portion 254A on the side away from the occupant as the boundary will be referred to as a lower portion 354 of the shaft.

The upper portion 350 of the shaft portion, the intermediate portion 352 of the shaft portion, and the lower portion 354 of the shaft portion are formed of an iron material which is a magnetic substance. It should be noted that iron is a ferromagnetic substance.

A lower case 238 is more elongated in a downward direction (see FIG. 7) than the lower case 138 of the second embodiment in correspondence with the length of the firing pin 254. The shaft portion 254A is loosely fitted inside the compression coil spring 158 inserted over the cylindrically-shaped spring supporting portion 156 formed in an axial portion of the lower case 238 located on the occupant's side. In the loosely fitted state, the intermediate portion 352 of the shaft portion is disposed inside the compression coil spring 158, while the lower portion 354 of the shaft portion penetrates the spring supporting portion 156.

Formed in the lower case 238 is a cylindrically-shaped recessed portion coaxially with the spring supporting portion 156 and on the side further away from the occupant. An internal thread is formed on an inner peripheral portion of this recessed portion on the occupant's side. A coil case 200 for accommodating a coil 206 which will be described later is inserted in this recessed portion, and this coil case 200 is threadingly engaged with the internal thread and is secured thereto. The coil case 200 has a cylindrical configuration in which its surface on the side away from the occupant is closed. The closed surface on the side away from the occupant is provided with two small holes 202, 204.

The coil 206 serving as an induced electromotive force means is accommodated in the coil case 200. Inside a coil portion 206A of the coil, the lower portion 354 of the firing pin 254 is disposed in an inserted state at an axial position thereof.

Figure 8A:
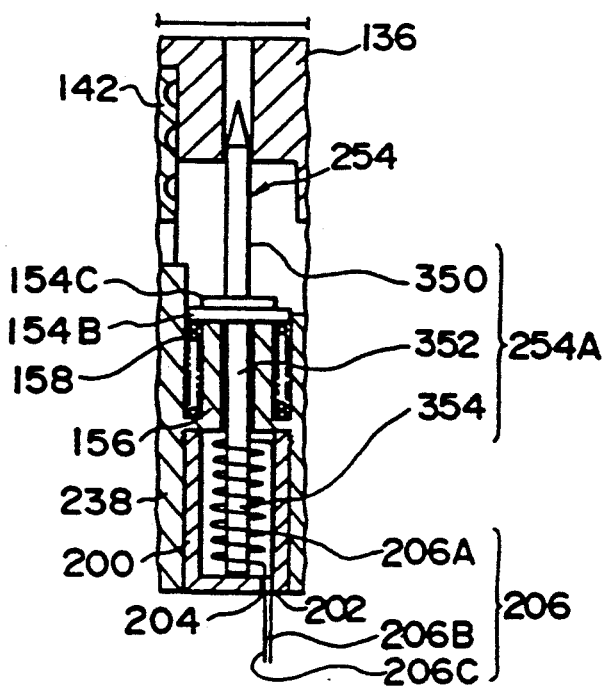
FIGS. 8A and 8B are enlarged views of an essential portion including a firing pin, a coil, and peripheral portions thereof that are disposed in the actuator body shown in FIG. 7.
Figure 8B:
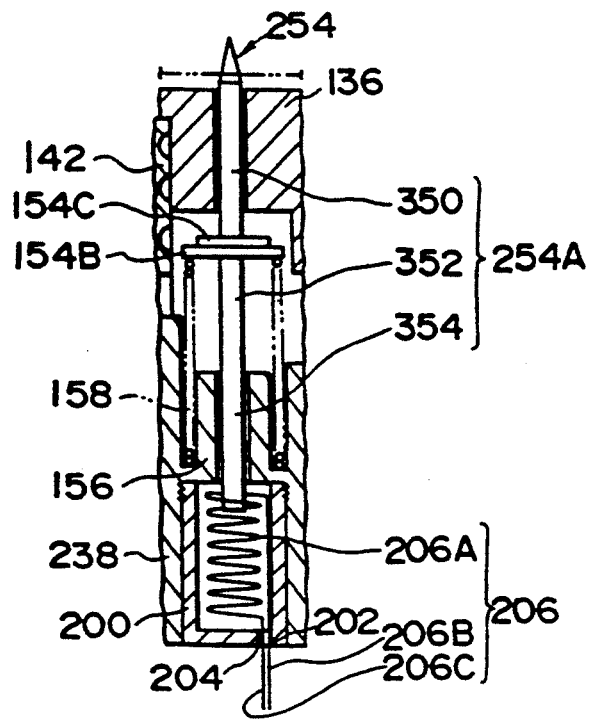

An electric current constantly flows across the coil 206 from the chassis electric supply 182 (see FIG. 3). In addition, the positional relationship between the coil 206 and the lower portion 354 of the shaft portion of the firing pin 254 is set in such a manner that magnetic flux density can change owing to the relative movement of the coil 206 and the lower portion 354 of the shaft portion. That is, in the normal running state of the vehicle as shown in FIG. 8A, the firing pin 254 (particularly the lower portion 354 of the shaft portion) is in a state in which it has not moved. In this state, the magnetic flux density occurring in the coil portion 206A has not changed and remains constant. In the state of a sudden deceleration of the vehicle as shown in FIG. 8B, however, the firing pin 254 (particularly the lower portion 354 of the shaft portion) is in a moving state, and in this state a change in the magnetic flux density occurs in the coil portion 206A in such a manner as to prevent the movement of the firing pin 254.

As shown in FIG. 7, one end 206B of the above-described coil 206, after penetrating one small hole 202, is connected to the steering shaft 110, and the other end 206C of the coil 206, after penetrating the other small hole 204, is connected to the rotating ring 168 secured via the insulator 166 (see FIG. 3).

Since the other arrangements are the same as those of the second embodiment, a description thereof will be omitted.

A description will be given hereinunder of the operation of this embodiment.

When the vehicle undergoes a sudden deceleration, the ball 144 moves greatly in the direction of arrow C in FIG. 7 by means of its inertia. Consequently, the drive shaft 146 rotates about the support shafts 146C in the direction of arrow E in FIG. 7, allowing the retaining portion 146B to be disengaged from the collar 154B of the firing pin 254. As a result, the firing pin 254 moves in the direction of arrow D in FIG. 7 by means of the urging force of the compression coil spring 158 and collides against the detonator 162. Hence, the detonator 162 is ignited and the gas generating agent 134 reacts via an unillustrated booster, thereby generating a large amount of gas. Accordingly, the bag 122 is inflated, breaking the pad 120 at the thin-walled portion 126. After the pad 120 is broken, the inflated bag 122 is interposed between the steering wheel 112 and the occupant. As a result, the occupant is protected securely from an impact at the time of the sudden deceleration of the vehicle.

Meanwhile, in conjunction with the movement of the firing pin 254, the lower portion 354 of the shaft portion also moves with the firing pin 254, and its state shifts from the one shown in FIG. 8A to the one shown in FIG. 8B. The movement of this lower portion 354 of the shaft portion causes a change in the magnetic flux density in the coil portion 206A in such a manner as to prevent that movement. Consequently, an induced electromotive force is produced in the coil portion 206A. An induced current flows across the coil 206 due to this induced electromotive force. Accordingly, a change occurs in the electric current flowing across the coil 206, and this change in the electric current is detected by the controller 176 via the wirings 174, 180.

Here, in the case where an occupant is not seated in the passenger's seat, i.e., when the buckle switch 186 on the passenger's seat side is not turned on, this electrical signal is not sent to the controller 176, so that the air bag device B is not actuated regardless of whether or not the aforementioned change in the electric current is detected by the controller 176. However, in the case where the occupant is seated in the passenger's seat, i.e., when the buckle switch 186 is turned on, this electrical signal is sent to the controller 176. As a result, the electric current flows across the filament, so that Joule heat is produced to ignite the electrical detonator 178, thereby allowing the gas generating agent 190 to produce a large amount of gas. Hence, the passenger's seat-side air bag device B is actuated, and as the bag 192 is inflated, the occupant seated in the passenger's seat is protected.

Thus, in accordance with this embodiment, the air bag device A of the mechanically ignited type is disposed on the driver's seat side and the air bag device B of the electrically ignited type is disposed on the passenger's seat side. In addition, disposed in the actuator body 132 is the coil 206 adapted to generate an induced electromotive force as magnetic flux density undergoes a change with the movement of the firing pin 254 whose lower portion 354 of the shaft portion is formed of an iron material. Accordingly, both the driver's seat-side air bag device A and the passenger's seat-side air bag device B can be actuated simultaneously by means of the single actuator body 132 at the time of a sudden deceleration of the vehicle.

Furthermore, in this embodiment, despite the fact that the coil portion 206A of the coil 206 and the shaft portion 254A of the firing pin 254 are in a state of non-contact with each other, it is possible to detect the movement of the firing pin 254. Accordingly, as compared with the conventional structure in which the contact is energized as it is brought into contact with the firing pin 254 in conjunction with the movement of the firing pin, it is possible to improve the sensitivity at the time of a sudden deceleration of the vehicle.

In addition, although in this embodiment the present invention is applied to an actuator body 132 of a type provided with the drive shaft 146, the present invention is not restricted to the same. For instance, the present invention is applicable to an actuator for an air bag constructed such that the drive shaft 146 is not employed by using as an inertia member a cylinder mass partially projecting in the axial direction, and by allowing the projecting portion of the mass to directly retain the collar 154B of the firing pin 254.

Furthermore, although in this embodiment an arrangement is adopted in which electric current is constantly allowed to flow across the coil 206 and an iron material is used for the lower portion 354 of the shaft portion of the firing pin 254, the present invention is not restricted to the same, and a permanent magnet may be disposed for the lower portion 354 of the shaft portion. In this case, there is no need to allow the current to flow across the coil 206. That is, since the magnetic flux changes if the permanent magnet moves with the movement of the firing pin 254, an induced electromotive force is generated in the coil portion 206A, with the result that an induced current flows. Thus, it is possible to actuate the other air bag device B. In this case, as compared with a structure in which an iron material is used as in the case of this embodiment, there is an advantage in that a permanent magnet of a desired strength can be readily selected and used.

Although in this embodiment all of the upper portion 350, the intermediate portion 352, and the lower portion 354 of the shaft portion are formed of an iron material, the present invention is not restricted to the same. For instance, only the lower portion 354 of the shaft portion may be formed of a magnetic substance such as iron, and the other shaft portions may be formed of a synthetic resin or the like having a high hardness, or only the surface of the lower portion 354 of the shaft portion may be covered with a magnetic substance such as iron.

Although in this embodiment whether or not the firing pin 254 has moved is determined by the controller 176 by detecting a change in the induced electric current, the present invention is not restricted to the same, and whether or not the firing pin 254 has moved may be determined by the controller 176 by detecting a changing magnetic flux density itself by means of, for instance, a magnetic sensor or the like. Alternatively, whether or not the firing pin 254 has moved may be determined by the controller 176 by detecting the change itself of the induced electromotive force generated in the coil portion 206A or resistance occurring in the coil portion 206A.

In addition, although in this embodiment the coil portion 206A is formed spirally, i.e., the curved coil 206 is used, the arrangement is not restricted to the same, and a squarely or rectangularly wound coil may be used. Additionally, although in this embodiment the single coil 206 is used, the arrangement is not restricted to the same. For instance, an arrangement may be alternatively provided such that, instead of the coil 206, a group of coils of a linear coil type (i.e., a plurality of coils of the same structure as the coil 206 are juxtaposed linearly) are provided, and the firing pin 254 is disposed adjacent this group of coils.

Although in this embodiment the controller 176 is connected to only the coil 206, the passenger's seat side air bag device B, and the buckle switch 186, the controller 176 may also be connected to a failure memory or the like for storing a failure of the electrically ignited-type air bag device B, if it should occur, due to some cause or other.

Figure 9A:
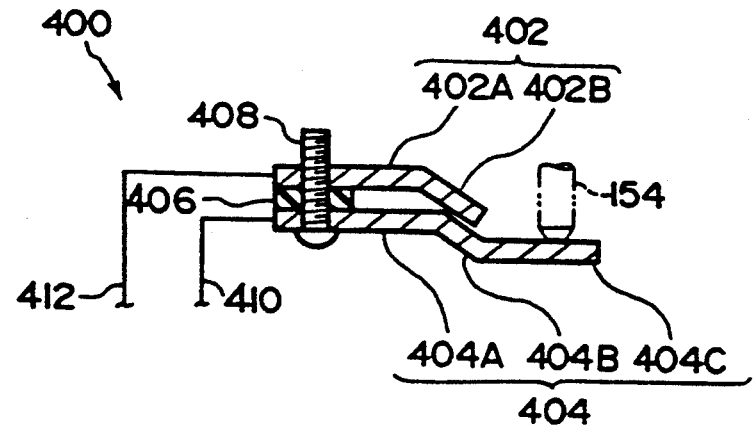
FIGS. 9A to 9C are enlarged views of an essential portion illustrating the operation of a contact disposed in the actuator body in accordance with a fourth embodiment.
Figure 9B:
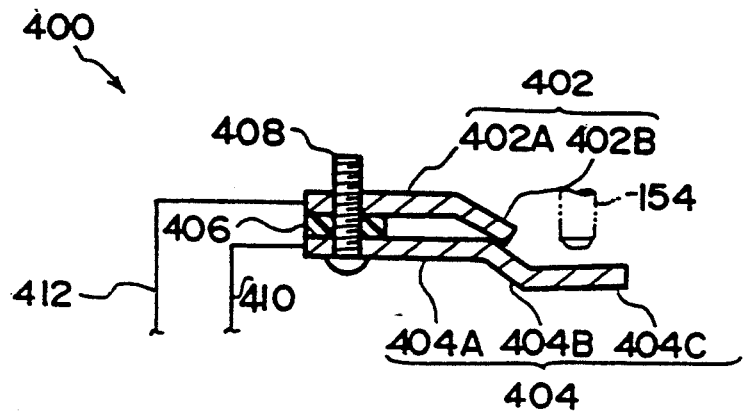
Figure 9C:
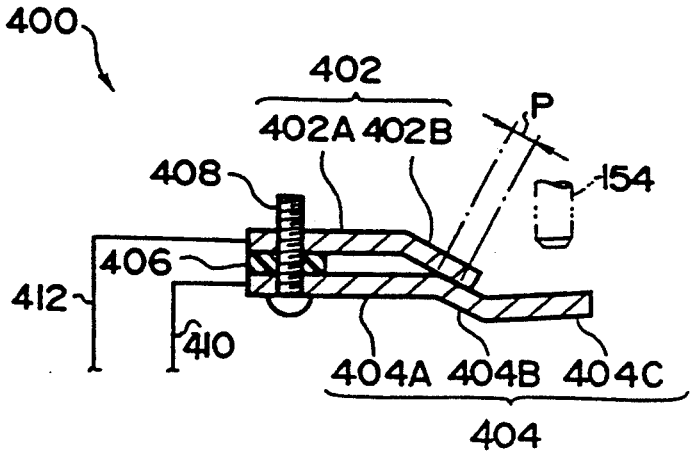
Figure 10:
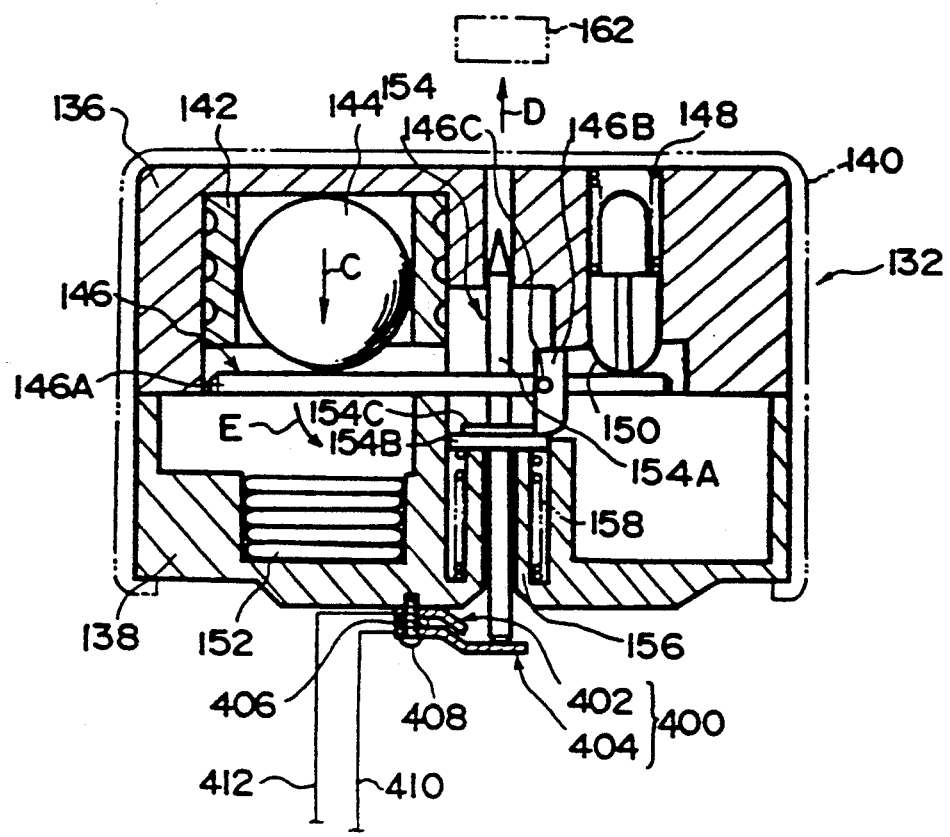
FIG. 10 is a cross-sectional view of an actuator body in accordance with the fourth embodiment.

Referring now to FIGS. 9 and 10, a description will be given of a fourth embodiment.

In the description of this embodiment, the same arrangements, members and the like as those of the second embodiment will be denoted by the same reference numerals used in the second embodiment, and a description thereof will be omitted.

Since the schematic configuration of this embodiment is similar to that of the second embodiment shown in FIG. 3, the configuration shown in FIG. 3 will also be referred to, as necessary.

A contact 400 serving as a contact means is disposed on a lower end surface, as viewed in FIG. 10, of the lower case 138 of the actuator body 132. The contact 400 has a contact piece 402 disposed on the occupant's side and a contact piece 404 located away from the occupant. These contact pieces 402, 404 are each formed by bending a rectangular thin-walled metallic piece formed of an electrically conductive material. In addition, the contact pieces 402, 404 themselves are provided with resiliency, but the resiliency of the contact piece 402 on the occupant's side is set to be slightly lower than the resiliency of the contact piece 404 located away from the occupant.

The occupant-side contact piece 402 comprises a proximal portion 402A and a bent portion 402B formed by slightly bending a distal end of the proximal portion 402A away from the occupant. The contact piece 404 located away from the occupant comprises a proximal portion 404A, a bent intermediate portion 404B formed by slightly bending a distal end of the proximal portion 404A away from the occupant, and an extended portion 404C provided by extending a distal end of the bent intermediate portion 404B in parallel with and away from the proximal portion 404A.

The occupant-side contact piece 402 and the contact piece 404 located away from the occupant are fixed to the lower case 138 by means of a male screw 408 in a state in which a cylindrical insulating plate 406 formed of a resilient material is interposed the contact pieces 402, 404. In the fixed state, as shown in FIGS. 10 and 9A, the bent portion 402B of the occupant-side contact piece 402 and the extended portion 404C of the contact piece 404 located away from the occupant are in a mutually spaced-apart state as the extended portion 404C is pushed down by a lower end, as viewed in FIG. 10, of the shaft portion 154A of the firing pin 154. However, the extended portion 404C is in contact with the lower end, as viewed in FIG. 10, of the shaft portion 154A of the firing pin 154, but presses and urges the firing pin 154 toward the detonator 162 with an urging force smaller than the urging force of the compression coil spring 158. The resiliency of the contact piece 404 itself is the urging force for pressing the firing pin 154 toward the detonator 162, and is an urging force for urging the contact piece 404 to obtain a detecting state, as will be described later. In other words, this contact 400 serves not only as a contact means but also as an urging means.

To give a more detailed description of this contact 400, the state shown in FIG. 9A is the normal running state of the vehicle, in which the bent portion 402B of the contact piece 402 and the extended portion 404C of the contact piece 404 are spaced apart from each other. This state is a state of nondetection of the firing pin 154.

FIG. 9B shows a state immediately after the firing pin 154 has moved toward the detonator 162 at the time of a sudden deceleration of the vehicle, in which state a corner (on the proximal portion 404A side) of the bent intermediate portion 404B of the contact piece 404 located away from the occupant is in contact with a surface (located away from the occupant) of the bent portion 402B of the occupant-side contact piece 402.

FIG. 9C shows a state in which, at the time of the sudden deceleration of the vehicle as in the case shown in FIG. 9B, the contact piece 404 located away from the occupant has further moved from the position shown in FIG. 9B by means of its own resiliency (restoring force) while sliding on the surface (located away from the occupant) of the bent portion 402B as the bent portion 402B of the occupant-side contact piece 402 is being resiliently deformed slightly by the corner (on the proximal portion 404A side) of the bent intermediate portion 404B. In this state, the occupant-side end surface of the bent intermediate portion 404B of the contact piece 404 located away from the occupant is in close contact with the surface (located away from the occupant) of the bent portion 402B of the occupant-side contact piece 402. These states shown in FIGS. 9B and 9C are a state of detection of the firing pin 154 by means of the contact 400.

It should be noted that moving distance of the corner (on the proximal portion 404A side) of the bent intermediate portion 404B slides on the surface (located away from the occupant) of the bent portion 402B of the occupant-side contact piece 402 is a length P shown in FIG. 9A. The time during which the aforementioned corner of the bent intermediate portion 404B slides this length P is set to be necessary and sufficient for actuating the passenger's seat side air bag device B.

In addition, wirings 410, 411 are connected to the contact pieces 402, 404, respectively.

As shown in FIG. 3, the occupant-side contact piece 402 is connected to the steering shaft 110 via the wiring 410, while the contact piece 404 located away from the occupant is connected via the wiring 412 to the rotating ring 168 secured to the steering shaft 110 via the insulator 166. Since the other arrangements are the same as those of the second embodiment, a description thereof will be omitted.

The operation of this embodiment will be described hereinunder.

In this embodiment as well, in the same way as the other embodiments, in conjunction with the movement of the firing pin 154 at the time of the sudden deceleration of the vehicle, the corner of the bent intermediate portion 404B of the contact piece 404 located away from the contact piece is brought into contact with the surface (located away from the occupant) of the bent portion 402 of the occupant side contact piece 402 by means of its resiliency. Hence, the state of the contact 400 shifts from the state shown in FIG. 9A to the state shown in FIG. 9B, with the result that the contact 400 is turned on and becomes energized, thereby establishing a detected state for detecting the movement of the firing pin 154. As a result, an electrical signal is sent to the controller 176 via the wirings 410, 412 as well as 174, 180. It should be noted that from the time when the corner shown in FIG. 9B is brought into contact with the surface (located away from the occupant) of the bent portion 402B until the state shown in FIG. 9C is reached, the corner slides on the surface (located away from the occupant) of the bent portion 402B.

Here, in the case where an occupant is not seated in the passenger's seat, this electrical signal is not sent to the controller 176, so that the air bag device B is not operated regardless of whether the contact 400 is energized. However, when the occupant is seated in the passenger's seat, this electrical signal is sent to the controller 176, and the contact 400 is energized and is set in the detected state. As a result, electric current flows across the filament, so that Joule heat is produced to ignite the detonator 178, thereby allowing the gas generating agent 190 to produce a large amount of gas. Hence, the passenger's seat-side air bag device B is actuated, and as the bag 192 is inflated, the occupant seated in the passenger's seat is protected. Since the other aspects of the operation of this embodiment are the same as those of the second embodiment, a description thereof will be omitted.

In addition, as described above, the arrangement provided in this embodiment is such that in cases where the occupant is not seated in the passenger's seat, the actuation of the passenger's seat-side air bag device B is prevented by means of the controller 176. Accordingly, it is possible to prevent the passenger's seat-side air bag device B from becoming actuated unnecessarily, thereby contributing to the improvement of safety.

Furthermore, this arrangement is so arranged that, in a state in which the stepped portion formed by the collar 154B and retaining portion 154C of the firing pin 154 is retained by the retaining portion 146B of the drive shaft 146 by means of the urging force of the compression coil spring 158, the extended portion 404C of the contact piece 404 located away from the occupant presses and urges the end face (located away from the occupant) of the shaft portion 154A of the firing pin 154 in the same direction as the urging direction of the compression coil spring 158 by means of the resiliency inherent to the contact piece 404 itself. Accordingly, it is possible to increase the contact pressure (i.e., pressure at the time when the extended portion 404C of the contact piece located away from the occupant presses and urges the end face (located away from the occupant) of the shaft portion 154A).

Accordingly, it is possible to increase the moving speed of the firing pin 154 at the time when it moves toward the detonator 162 during a sudden deceleration of the vehicle.

In addition, in this embodiment, the contact 400 is disposed on the surface of the lower case 138 located away from the occupant and the aforementioned advantage can be obtained in that the contact pressure can be increased. Accordingly, as compared with the conventional structure in which the contact is disposed in the vicinity of the detonator 162, it is possible to obviate the risk of the contact, after being temporarily energized, becoming nonenergized again by receiving a spit occurring when the detonator 162 is ignited.

Furthermore, this embodiment is so arranged that, at the time of the sudden deceleration of the vehicle, the corner (on the proximal end 404A side) of the bent intermediate portion 404B of the contact piece 404 located away from the occupant slides on the surface (located away from the occupant) of the bent portion 402B of the occupant side contact piece 402 from the time when the contact 400 is set in the state in which the contact pieces 402, 404 are initially brought into contact with each other (the state shown in FIG. 9B) until the state shown in FIG. 9C is reached. Additionally, the sliding distance thereof is set to be the length P (see FIG. 9C) required for positively actuating the passenger's seat-side air bag device B. Accordingly, it is possible to obviate the drawback of the passenger's seat-side air bag device B from not being actuated although the occupant is seated in the passenger's seat and the vehicle has undergone a sudden deceleration.

Although in this embodiment the compression coil spring 158 for pressing and urging the firing pin 154 toward the detonator 162 is disposed, an arrangement may be alternatively provided such that, by omitting this compression coil spring 158, the portion of the urging force thereof may be borne by increasing the resiliency of the contact piece 404 located away from the occupant. In this case, the number of components used can be decreased.

In this connection, as a structure for omitting the compression coil spring 158, the contact pieces 402, 404 themselves may be formed of a nonresilient member, and compression coil springs or tensile coil springs may be used separately to urge these contact pieces 402, 404.

Although in this embodiment the contact 400 is used which is arranged such that the contact pieces 402, 404 are spaced apart from each other during the normal running of the vehicle, while at the time of a sudden deceleration of the vehicle the contact pieces 402, 404 are brought into contact with each other by virtue of their own resiliency, this arrangement may be reversed. For instance, it is conceivable to reverse the positional relationship between the contact piece 402 and the contact piece 404.

Next, a description will be given of a fifth embodiment with reference to FIGS. 11 to 14.

In the description of this embodiment, the same arrangements, members and the like as those of the second embodiment will be denoted by the same reference numerals used in the second embodiment, and a description thereof will be omitted.

One end portion of the shaft 146A of the drive shaft 146 disposed within a plane of abutment between the upper case 136 and the lower case 138 abuts against a portion of the surface of the ball 144 which is remote from a portion of the surface thereof opposing the occupant. The retaining portion 146B perpendicular to the shaft 146A is formed in the vicinity of an axially intermediate portion of the drive shaft 146. The pair of support shafts 146C project from the retaining portion 146B on both sides thereof so as to pivotally support the retaining portion 146B at a position of abutment between the upper case 136 and the lower case 138.

In addition, disposed in the actuator body 132 is the firing pin 154 (shown also in FIG. 13) serving as a firing member. This firing pin 154 has the shaft portion 154A, and the collar 154B is formed around an axially intermediate portion thereof. The disk-shaped retaining plate 154C is formed integrally with the occupant-side surface of the collar 154B, and the retaining portion 146B of the drive shaft 146 is retained by a stepped portion 154E formed by the retaining plate 154C and the collar 154B. This stepped portion 154E serves as an abutting portion. An occupant-side portion of the shaft portion 154 is inserted in a communicating passage 518 communicating with the detonator 162.

A piezoelectric element 500 serving as a detecting means is disposed on a path of movement of the firing pin 154. This piezoelectric element 500 has a circular hole 502 in an axial portion thereof, and is hence formed into an annular configuration. This piezoelectric element 500 is formed of a material having a piezoelectric effect. Because electric charges of a crystal constituting the piezoelectric material does not have a center of structural symmetry, the piezoelectric element 500, when pressurized, exhibits strong piezoelectric properties as a change takes place in electric polarization. That is, this piezoelectric element 500 converts a mechanical signal to an electrical signal. It should be noted that the piezoelectric effect in this case is a positive effect, and a value of the piezoelectric properties of the piezoelectric element 500 is set in advance to a predetermined value.

The occupant-side surface of the piezoelectric element 500 is secured to a support portion 504 formed between the cylinder 142 of the upper case 136 and the bias pin 150. The inside diameter of the piezoelectric element 500 is set to be slightly larger than the diameter of the retaining portion 154C of the firing pin 154. The outside diameter of the piezoelectric element 500 is set to be larger than the diameter of the collar of the firing pin 154. For this reason, a face 500A (located away from the occupant) of the piezoelectric element 500 is opposed to the stepped portion 154E of the firing pin 154.

The distance between the surface 500A (located away from the occupant) of the piezoelectric element 500 and the stepped portion 154E of the firing pin 154 is set to be slightly larger than the distance by which the tip of the shaft portion 154A of the firing pin 154 moves until it collides against the detonator 162. Accordingly, in the state in which the firing pin 154 has moved in the direction of the detonator 162 and collided against the detonator 162 at the time of a sudden deceleration of the vehicle (the state shown in FIG. 13B), the stepped portion 154E of the firing pin 154 has collided against the surface 500A (located away from the occupant) of the piezoelectric element 500. In addition, the kinetic energy of the firing pin 154 at the time when the stepped portion 154E collides against the surface (located away from the occupant) of the piezoelectric element 500 is substantially equal to the kinetic energy of the firing pin 154 at the time when the tip of the shaft portion 154A of the firing pin 154 collides against the detonator 162. If the stepped portion 154E collides against the piezoelectric element 500 in the state in which this kinetic energy is present, the aforementioned predetermined value of the piezoelectric properties of the piezoelectric element 500 is sufficiently exceeded.

The aforementioned piezoelectric element 500 is provided with a first terminal 506 and a second terminal 508 at radially mutually opposed positions. One end of a wiring 510 is connected to the first terminal 506, and the wiring 510 is guided to the side of the actuator body 132 located away from the occupant via the small hole 114 by detouring the cylinder 142 so that the wiring 510 will not interfere with the path of movement of the ball 144. Meanwhile, one end of a wiring 512 is connected to the second terminal 508, and the wiring 512 is guided to the side of the actuator body 132 located away from the occupant via a small hole 516 by detouring the bias pin 150 so that the wiring 512 will not interfere with the path of movement of the bias pin 150.

Figure 12:
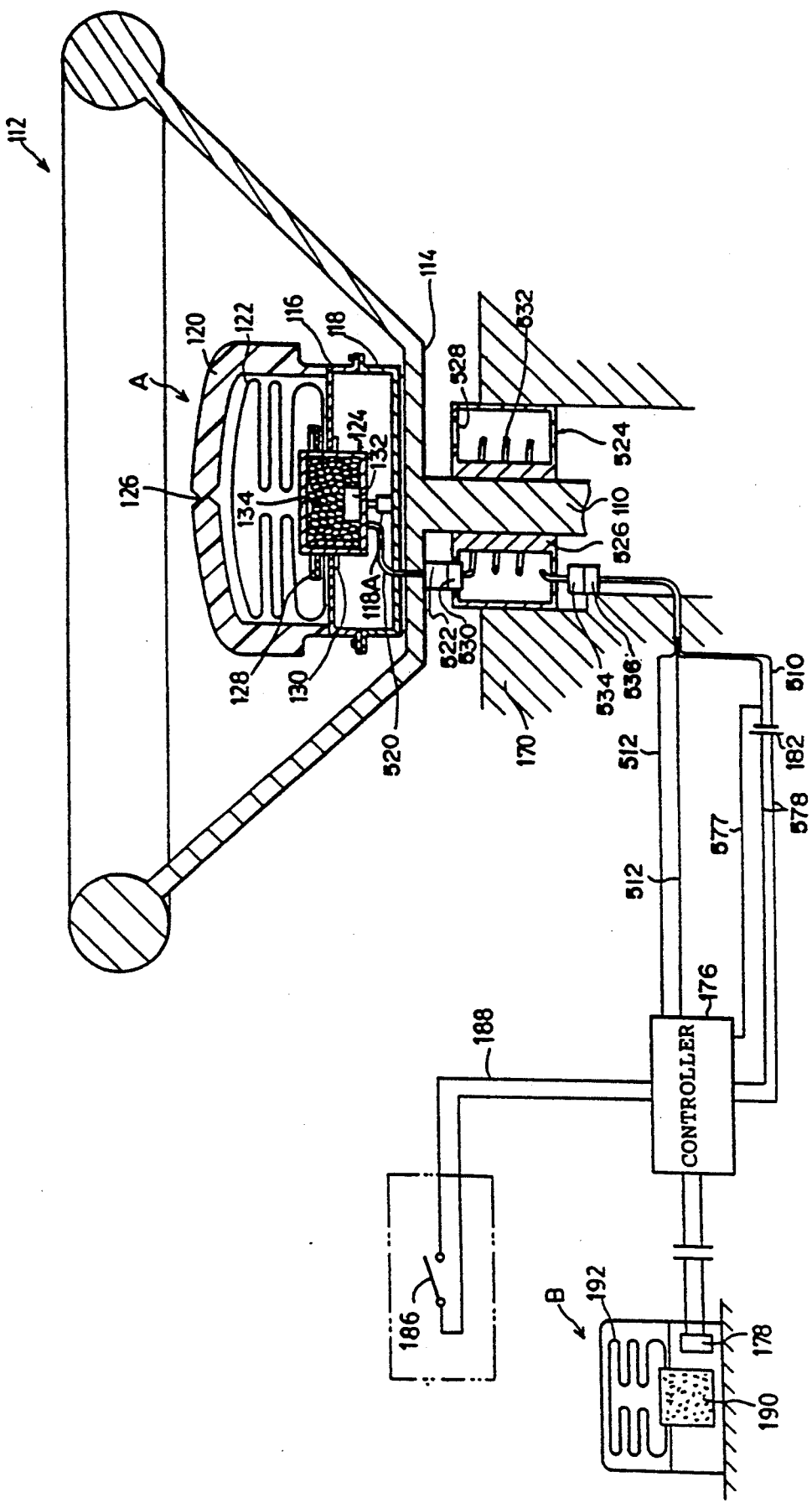
FIG. 12 is a schematic diagram of air bag devices provided for the driver's seat and the passenger's seat, respectively, in accordance with the fifth embodiment.

As shown in FIG. 12, the wiring 510 for the first terminal 506 and the wiring 512 for the second terminal 508 are bundled together as a wire harness 520 bent and suspended from the lower side, as viewed in FIG. 12, of the hub 114. A connector 522 is provided at the end of the wire harness 520. This connector 522 is connected to a connector 530 of a roll connector 524 which will be described below.

The roll connector 524 has a hollow cylindrical configuration, and a hollow cylindrical boss 526 is coaxially formed in an axial portion thereof. The roll connector 524 has its outer peripheral surface secured to the chassis 170, the steering shaft 510 being rotatably inserted in the boss 526. An annular groove 528 is formed in an occupant-side end face of the roll connector 524. The aforementioned connector 530 is disposed in the groove 528, and is connected to the connector 522. A wire harness 532 connected to the connector 530 is accommodated in this roll connector 524. The wire harness 532 is wound loosely around the boss 526 with a plurality of turns, and a connector 534 is disposed at its end. By virtue of this roll connector 524, the state of connection of the four wirings 510, 512 (two sets of wirings 510 and 512) from the piezoelectric element 500 to the controller 176 is securely maintained. In other words, since the winding diameter of the wire harness 532 changes in correspondence with the amount of rotation of the steering wheel 112, even if the steering wheel 112 undergoes a maximum rotation, the winding diameter of the wire harness 532 is merely shrunk or enlarged, so that no disconnection occurs.

The connector 534 is further connected to a connector 536, from which the four wirings 510, 512 are branched off. The other end of the wiring 510 for the first terminal 506 is directly connected to the minus terminal of the chassis power supply 182. The plus terminal of the chassis power supply 182 is connected via a wiring 578 to the controller 176 for igniting the electric detonator 178 disposed in the passenger's seat-side air bag device B of the electrically ignited type.

Meanwhile, the other end of the wiring 512 for the second terminal 508 is connected to the controller 176. It should be noted that a wiring 577 is a minus-side power supply line of the controller 176.

The passenger's seat-side air bag device B is so arranged that electric current flows across the filament only when the buckle switch 186 is turned on and a voltage is generated in the piezoelectric element 500. When the current flows across the filament, Joule heat is produce to ignite the electric detonator 178, which in turn causes the gas generating agent 190 to react, thereby inflating the bag 192.

The operation of this embodiment will be described hereinunder.

Figure 13A:
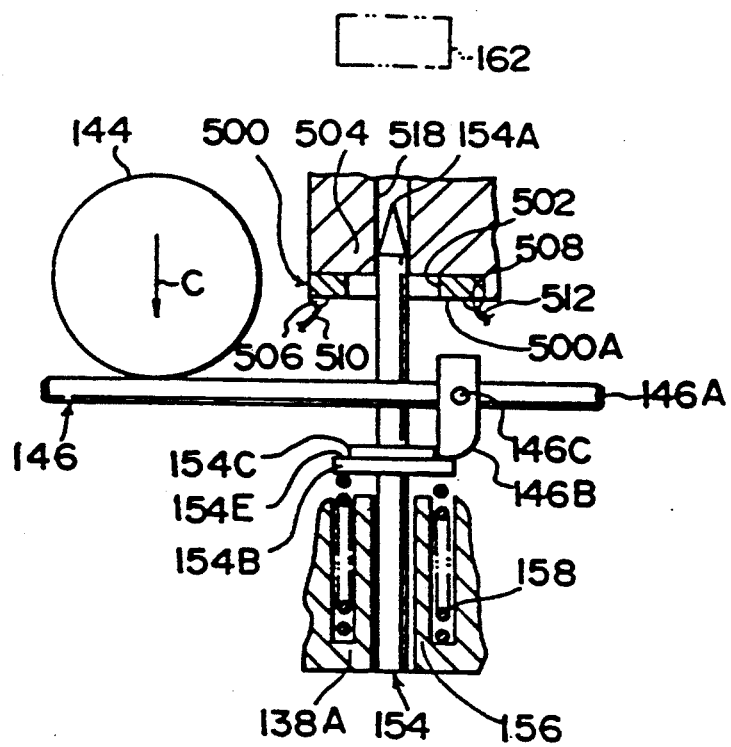
FIGS. 13A and 13B are diagrams illustrating the operation of a piezoelectric element, shown in FIG. 11, in terms of relationships among a ball, a firing pin, and a compression coil spring.

In the normal running state of the vehicle, the firing pin 154 is in the state shown in FIG. 13A, and the stepped portion 154E of the firing pin 154 and the surface 500A (located away from the occupant) of the piezoelectric element 500 are in a state of noncontact with each other. For this reason, no voltage occurs in the piezoelectric element 500, so that no current flows across the wirings 510, 512. As a result, the passenger's seat-side air bag device B is not actuated. The normal running state of the vehicle is thus maintained.

Figure 11:
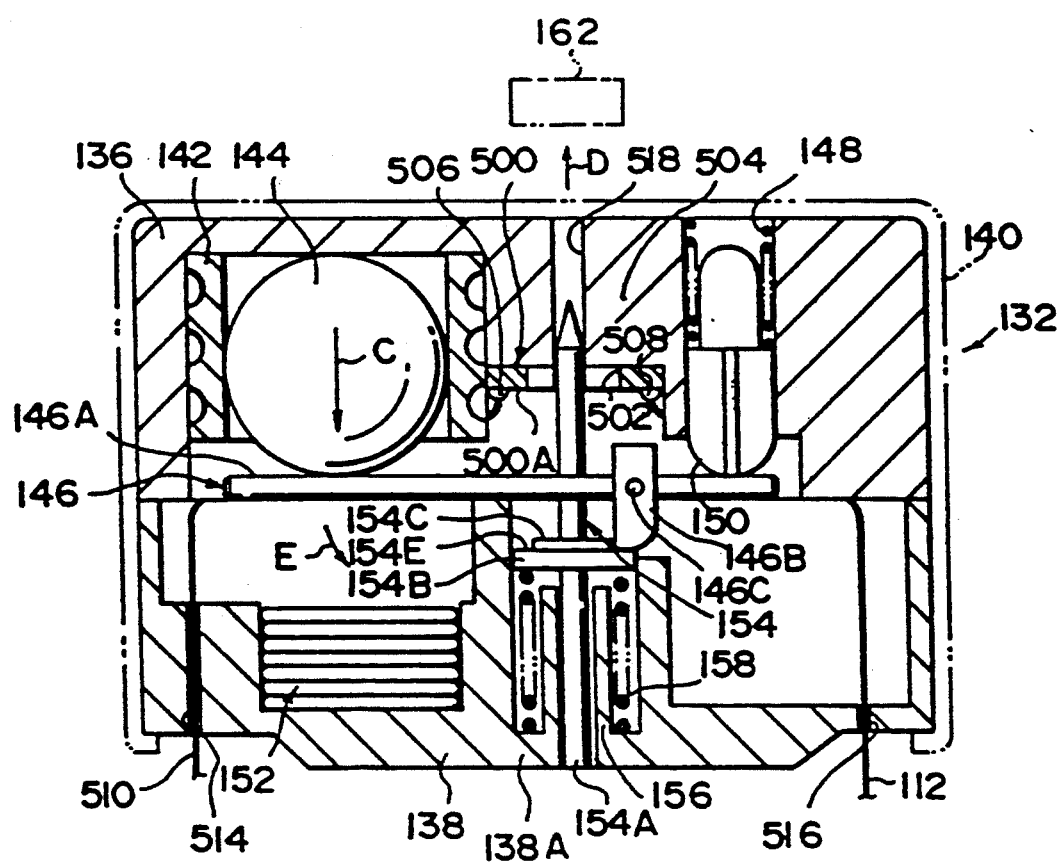
FIG. 11 is a cross.sectional view of an actuating portion in accordance with a fifth embodiment taken along the axial direction thereof, the actuating portion being provided with a piezoelectric element.

When the vehicle undergoes a sudden deceleration in this state, the ball 144 moves greatly in the direction of arrow C in FIG. 11 by means of its inertia. Consequently, the bag 122 is inflated, breaking the pad 120 at the thin-walled portion 126. After the pad 120 is broken, the inflated bag 122 is interposed between the steering wheel 112 and the occupant. As a result, the occupant on the driver's seat side is protected securely from the impact at the time of the sudden deceleration of the vehicle.

Figure 13B:
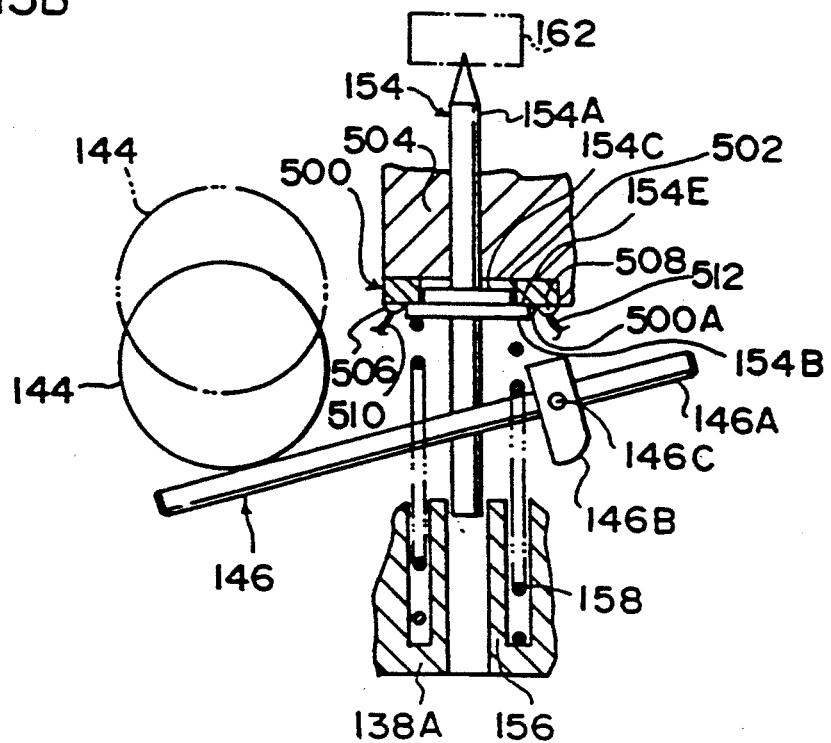

Meanwhile, in the state in which the firing pin 154 has collided against the detonator 162, the stepped portion 154E of the firing pin 154 collides against the surface 500A (located away from the occupant) of the piezoelectric element 500, as shown in FIG. 13B. Hence, the piezoelectric element 500 produces a voltage, allowing electric current to flow across the wirings 510, 512.

Here, in the case where the occupant is not seated in the passenger's seat, a determination circuit of the controller 176 functions, so that this air bag device B is not actuated regardless of whether or not electric current is flowing across the wiring 510 for the first terminal 506 of the piezoelectric element 500 and the wiring 512 for the second terminal 508 thereof. However, in the case where the occupant is seated in the passenger's seat, the determination circuit of the controller 176 determines that the occupant is seated in the passenger's seat. Also, since electric current is flowing across the wirings 510 and 512, electric current flows across the filament from the controller 176, so that Joule heat is produced to ignite the electric detonator 178, which in turn causes the gas generating agent 190 to generate a large amount of gas. As the bag 192 is thereby inflated, the occupant seated in the passenger's seat is protected.

Since the arrangement provided in this embodiment is such that immediately after the tip of the shaft portion 154A of the firing pin 154 has collided against the detonator 162, the stepped portion 154E of the firing pin 154 collides against the surface 500A (located away from the occupant) of the piezoelectric element 500, it is possible to positively actuate the passenger's seat-side air bag device B without losing the kinetic energy until the firing pin 154 collides against the detonator 162.

In addition, since the piezoelectric element 500 is disposed on the lower side, as viewed in FIG. 11, of the support portion 504 of the upper case 136, and the diameter of the circular hole 502 is set to be larger than the diameter of the communicating passage 518, in a case where the shaft portion 154A of the firing pin 154 has collided against the detonator 162 disposed on the occupant's side of the actuator body 132, the piezoelectric element 500 is prevented from being affected by a spit occurring at the time when the detonator 162 is fired.

Figure 14A:
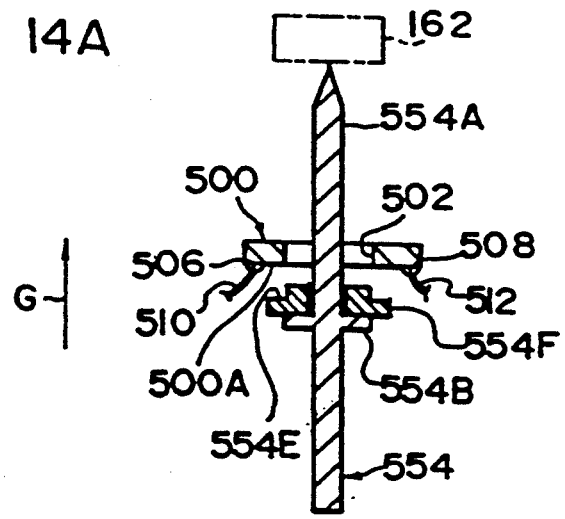
FIGS. 14A and 14B are diagrams illustrating a modification of the firing pin shown in FIG. 11.
Figure 14B:
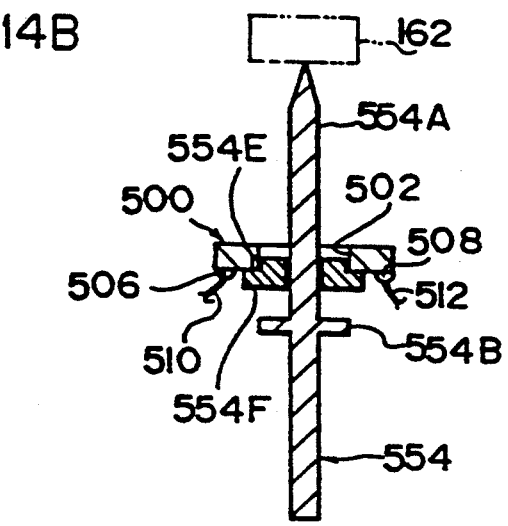

Furthermore, in this embodiment, the stepped portion 154E of the firing pin 154 is arranged to collide against the surface 500A (located away from the occupant) of the piezoelectric element 500, the arrangement is not restricted to the same, and as shown in FIGS. 14A and 14B, an arrangement may be provided alternatively such that a firing pin 554 is comprised of a shaft portion 554A and a collar 554B which are integrally formed, and an abutment plate 554F having a stepped portion 554E is inserted in this shaft portion 554A. In other words, according to this modification, the abutment plate 554F is formed into a substantially disk-shaped configuration, and an insertion hole is formed in its axial portion. The shaft portion 554A of the firing pin 554 is inserted into this insertion hole from the side away from the occupant, and the abutment plate 554F is located on the occupant's side of the collar 554B. Consequently, in the normal running state of the vehicle, since the retaining portion 146B of the drive shaft 46 is retained by the stepped portion 554E of the abutment plate 554F, the retaining portion 146 functions as a stopper, so that the abutment plate 554F is prevented from relatively moving in the direction of arrow G in FIG. 14A. At the time of a sudden deceleration of the vehicle, however, since the retaining portion 146B is disengaged from the stepped portion 554E, so that the abutment plate 554F is capable of relatively moving in the direction of arrow G in FIG. 14A. It should be noted that the abutment plate 554F is formed of a metal and has predetermined inertial mass.

In accordance with this modification, in the state at the time of a sudden deceleration of the vehicle when the tip of the shaft portion 554A of the firing pin 554 has collided against the detonator 162, as shown in FIG. 14A, the abutment plate 554F has not relatively moved in the direction of arrow G in FIG. 14A. However, immediately after the collision, the stepped portion 554E of the abutment plate 554F collides against the surface 500A (located away from the occupant) of the piezoelectric element 500 through the inertial movement of the abutment plate 554F. as a result, the other actuator B is actuated.

Although the arrangement provided in this embodiment is such that the stepped portion 154E of the firing pin 154 functions as an abutment portion and collides against the piezoelectric element 500, the arrangement is not restricted to the same. For instance, an arrangement may be alternatively provided such that a pawl pivotally supported by a pin is disposed at a position interfering with the path of movement of the stepped portion 154D, and a lever engaging with this pawl is disposed in such a manner as to be pressed and urged by an urging means having a stronger urging force than the urging force of the compression coil spring 158. In operation, when the vehicle undergoes a sudden deceleration, the engagement between the pawl and the lever is canceled as the firing pin 154 moves, and the lever strikes the piezoelectric element 500 by the urging force of the urging means. In other words, any arrangement can be adopted insofar as the abutment portion moves with the movement of the firing pin 154 at the time of the sudden deceleration of the vehicle, and a voltage can be produced in the piezoelectric element 500 by this abutment portion. It should be noted that according to the above-described arrangement using the pawl, lever, and urging means, the number of components used increases, but it is possible to increase the impact applied to the piezoelectric element 500 by using an urging means having a large urging force.

Referring now to FIGS. 15 to 19, a description will be given of a sixth embodiment.

In the description of this embodiment, the same arrangements, members and the like as those of the second and fifth embodiments will be denoted by the same reference numerals used in the second and fifth embodiments, and a description thereof will be omitted.

Figure 15:
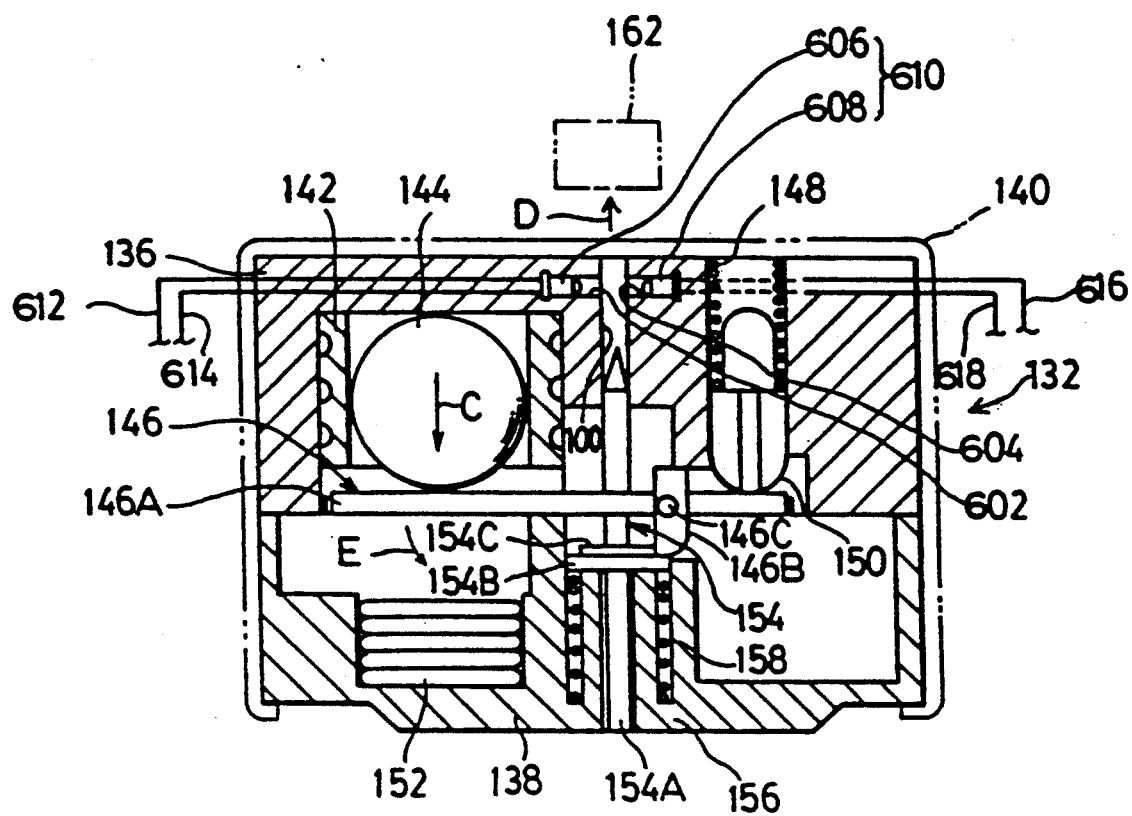
FIG. 15 is a cross.sectional view of an actuator device in accordance with a sixth embodiment provided with a photointerrupter.
Figure 17A:
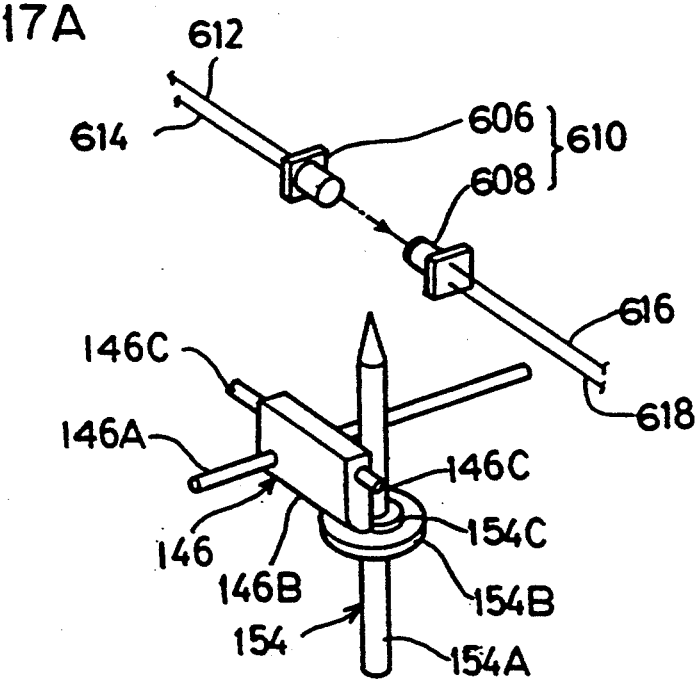

An occupant-side portion of the shaft portion 154A of the firing pin 154 is inserted in a communicating passage 600 formed in the upper case along the axis thereof. As shown in FIG. 15, a pair of a light-emitting passage 602 and a light-receiving passage 604 both having a cylindrical configuration are formed in the actuator body 132 perpendicularly to the communicating passage 600. Both the light-emitting passage 602 and the light-receiving passage 604 are located coaxially, and communicate with the communicating passage 600, respectively. A light-emitting element 606 is accommodated in the light-emitting passage 602, while a light-receiving element 608 is accommodated in the light-receiving passage 604. As shown in FIG. 17A, the light-emitting surface of the light-emitting element 606 and the light-receiving surface of the light-receiving element 608 are opposed to each other. When the ignition switch (not shown) is turned on, the light-emitting element 606 constantly emits light toward the light-receiving element 608, whereas the light-receiving element 608 subjects the light received to photoelectric conversion. An optical path leading from the light-emitting element 606 to the light receiving element 608 is adapted to be interrupted by being interfered by the shaft portion 154A of the firing pin 154 as the firing pin 154 moves. An opposing-type photointerrupter comprising the light-emitting element 606 and the light-receiving element 608 constitutes a photodetection section.

Figure 17B:
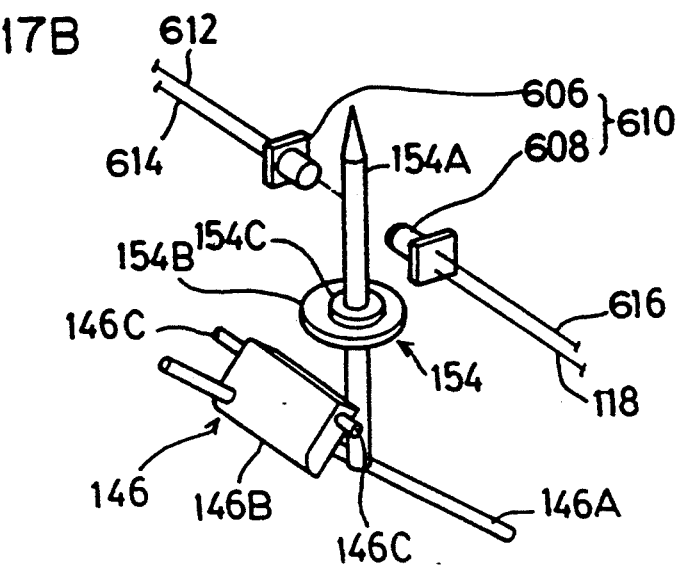

As shown in FIG. 17A, in the normal running state of the vehicle, the light projected from the light-emitting element 606 to the light-receiving element 608 is not interrupted. In this state, the light-receiving element 608 constantly effects photoelectric conversion. However, in the state of a sudden deceleration of the vehicle as shown in FIG. 17B, the light is interrupted by the shaft portion 154A of the firing pin 154. In this interrupted state, the light-receiving element 608 does not effect photoelectric conversion.

Figure 16:
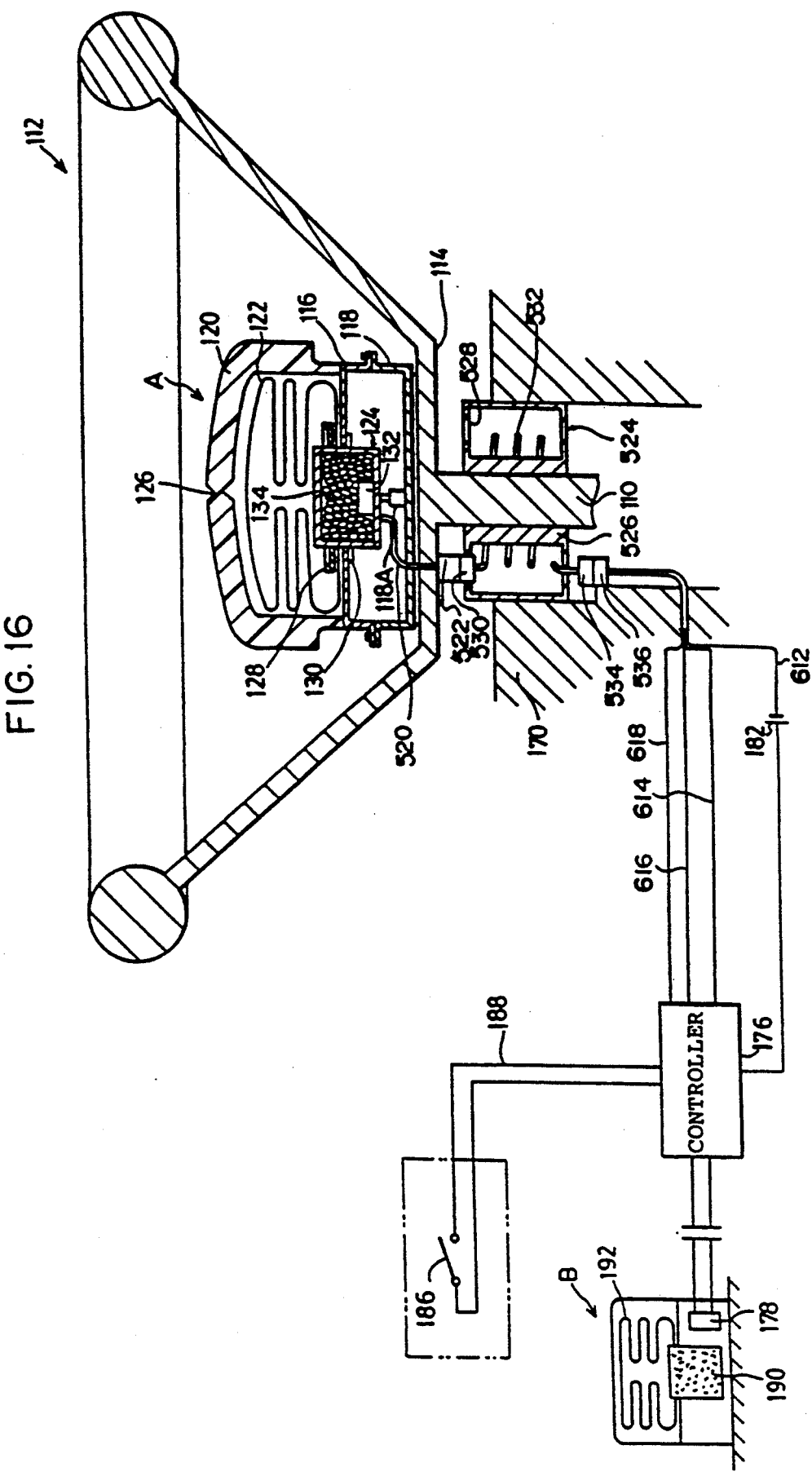
FIG. 16 is a schematic diagram of air bag devices provided for the driver's seat and the passenger's seat, respectively, in accordance with the sixth embodiment.

As shown in FIG. 16, two wirings 612, 614 are connected to the light-emitting element 606. Similarly, two wirings 616, 618 are connected to the light-receiving element 608. The two wirings 616, 618 of the light-receiving element 608 detour the bias spring 148 in such a manner as not to interfere with the bias spring 148, as shown in FIG. 15.

As shown in FIG. 16, the wirings 612, 614, 616, 618 for the light-emitting element 606 and the light-receiving element 608 are bundled together as a wire harness 620 bent and suspended from the lower side, as viewed in FIG. 16, of the hub 114. The connector 522 is provided at the end of the wire harness 620. Since this connector 522 is arranged in the same way as that of the fifth embodiment, a description thereof will be omitted.

The state of connection of the four wirings 612, 614, 616, 618 from the light-emitting element 606 and the light-receiving element 608 to the controller 176 is securely maintained By virtue of the roll connector 524.

The connector 534 is further connected to the connector 536, and the four wirings 612, 614, 616, 618 are branched off from the connector 536. The wiring 612 for the light-emitting element 606 is directly connected to the minus terminal of the chassis power supply 182. The plus terminal of the chassis power supply 182 is connected to the controller 176 for igniting the electric detonator 178 disposed in the passenger's seat-side air bag device B of the electrically ignited type. The wiring 614 for the light-emitting element 606 and the wirings 616, 618 for the light-receiving element 608 are connected to the controller 176.

The passenger's seat-side air bag device B is so arranged that electric current flows across the filament only when the buckle switch 186 is turned on and and the light from the light-emitting element 606 is interrupted by the firing pin 154 and the electrical signal from the light-receiving element 608 ceases to be inputted to the controller 176.

The operation of this embodiment will be described hereinunder.

In the normal running state of the vehicle, the firing pin 154 is in the state shown in FIG. 17A, and the light projected from the light-emitting element 606 is constantly received by the light-receiving element 608 and is subjected to photoelectric conversion. Accordingly, an electrical signal outputted from the light-receiving element 608 is constantly inputted to the controller 176. As a result, the passenger's seat-side air bag device B is not actuated, either.

When the vehicle undergoes a sudden deceleration in this state, the firing pin 154 moves in the direction of arrow D in FIG. 15 by means of the urging force of the compression coil spring 158 and collides against the detonator 162. Consequently, the detonator 162 is ignited, and the gas generating agent 134 undergoes reaction via an unillustrated booster, producing a large amount of gas. Hence, the bag 122 is inflated, breaking the pad 120 at the thin-walled portion 126. After the pad 120 is broken, the inflated bag 122 is interposed between the steering wheel 112 and the occupant. As a result, the occupant on the driver's seat side is protected securely from the impact at the time of the sudden deceleration of the vehicle.

Meanwhile, in conjunction with the movement of the firing pin 154, the light projected from the light-emitting element 606 is interrupted by the firing pin 154, as shown in FIG. 17B. Consequently, the light-emitting element 606 ceases to effect photoelectric conversion, so that the electrical signal outputted from the light-receiving element 608 ceases to be inputted to the controller 176. This interrupted state is positively maintained from the time when the light projected from the light-emitting element 606 is initially interrupted by the firing pin 154 until after the firing pin 154 collides against the detonator 162.

Here, in the case where the occupant is not seated in the passenger's seat, the determination circuit of the controller 176 functions, so that this air bag device B is not actuated regardless of whether or not the light projected from the light-emitting element 606 is shielded. However, in the case where the occupant is seated in the passenger's seat, the determination circuit of the controller 176 determines that the occupant is seated in the passenger's seat. Also, since the projected light is shielded and the electrical signal from the light-receiving element 608 is not inputted to the controller 176, electric current flows across the filament, so that Joule heat is produced to ignite the electric detonator 178, which in turn causes the gas generating agent 190 to generate a large amount of gas. As a result, the passenger's seat-side air bag device B is actuated, and as the bag 192 is inflated, the occupant seated in the passenger's seat is protected.

In this embodiment, since the movement of the firing pin 154 is optically detected by the photointerrupter 610, the movement of the firing pin 154 at the time of a sudden deceleration of the vehicle can be detected in a state of noncontact with the firing pin 154. Moreover, the passenger's seat-side air bag device B can be actuated positively without losing the kinetic energy of the firing pin 154 until it collides against the detonator 162.

The interrupted state of the optical path is maintained from the time the optical path is interrupted by the shaft portion 154A of the firing pin 154 until the firing pin 154 collides against the detonator 162 and even after the collision of the firing pin 154 against the detonator 162. Accordingly, it is possible to obviate the occurrence of a case where the passenger's seat-side air bag device B is not actuated even though the vehicle has undergone a sudden deceleration.

Figure 18A:
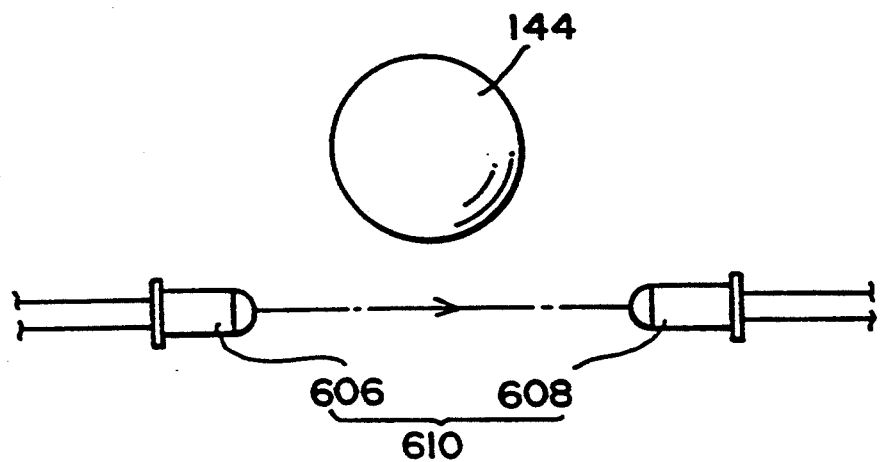
FIGS. 18A and 18B are diagrams illustrating a modification for detecting the movement of a ball.
Figure 18B:
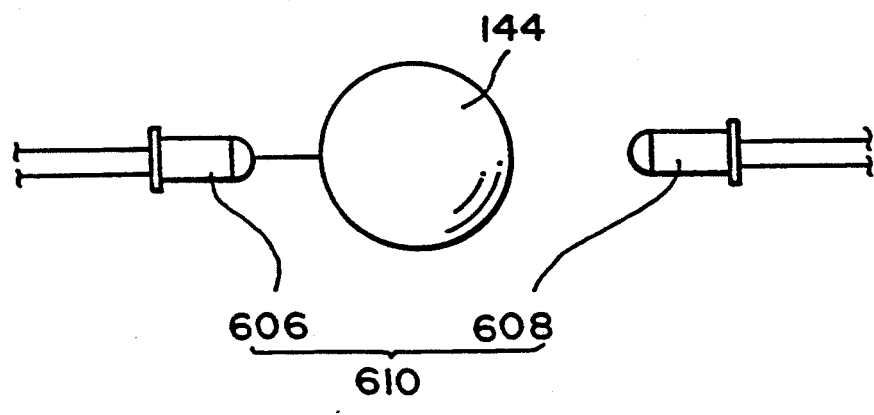

Although in this embodiment the movement of the firing pin 154 is optically detected by the photointerrupter 610, the arrangement is not restricted to the same. For instance, it is possible to adopt an arrangement in which the inertial movement of the ball 144 is detected by the photointerrupter 610, as shown in FIGS. 18A and 18B. Alternatively, it is possible to adopt an arrangement in which the rotation of the drive shaft 146 is detected by the photointerrupter 610, as shown in FIGS. 19A and 19B.

Namely, according to the structure shown in FIGS. 18A and 18B, the light-emitting element 606 and the light-receiving element 608 are respectively disposed on the side of the inertial movement of the ball 144 (on the side away from the occupant) at mutually opposing positions with the ball 144 as a center. According to this structure, in the normal running state of the vehicle shown in FIG. 18A, the light projected from the light-emitting element 606 is constantly received by the light-receiving element 608. In the state of a sudden deceleration of the vehicle shown in FIG. 18B, the ball 144 moves by means of its inertia, so that the light projected from the light-emitting element 606 is shielded by the ball 144. Consequently, since the electrical signal obtained by photoelectric conversion by the light-receiving element 608 is not inputted to the controller 176, so that the passenger's seat-side air bag device B is actuated. According to the above-described arrangement as well, it is possible to obtain the same advantage as in the case of the arrangement in which the movement of the firing pin 154 is detected. Moreover, since the ball 144 itself which initially moves at the time of the sudden deceleration of the vehicle is detected by the photointerrupter 610, it is possible to reduce the time for actuating the passenger's seat-side air bag device B.

Figure 19A:
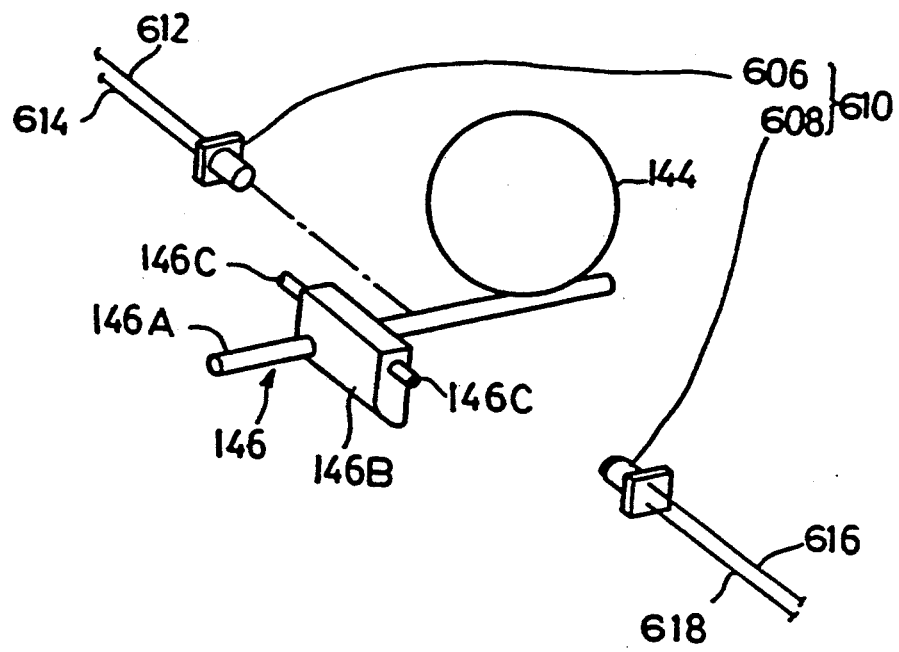
FIGS. 19A and 19B are diagrams illustrating a modification for detecting the rotation of a drive shaft.
Figure 19B:
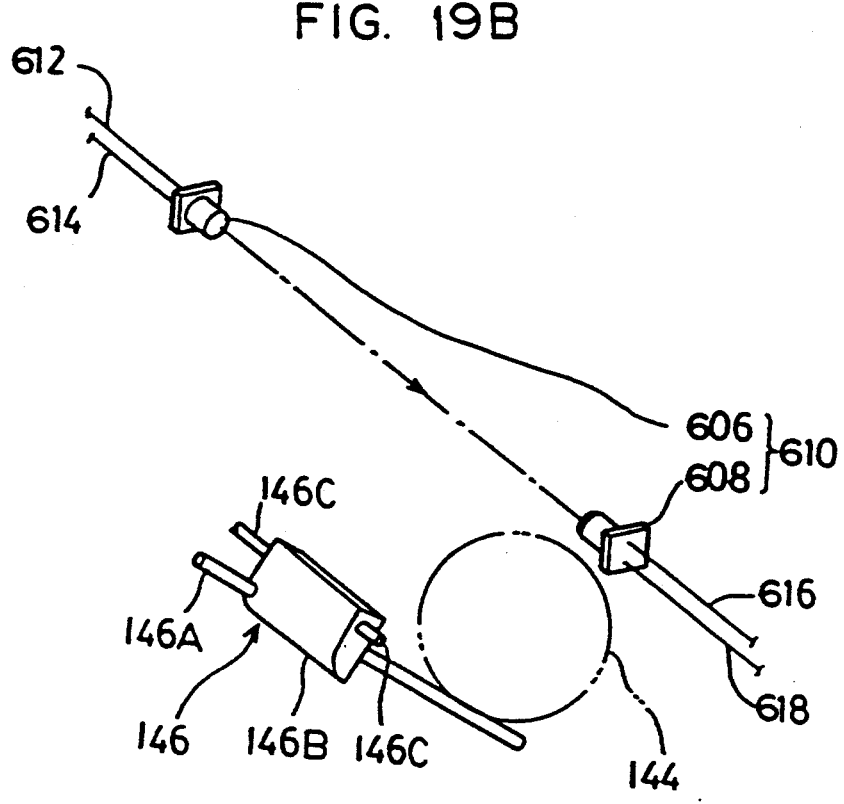

Then, according to the structure shown in FIGS. 19A and 19B, the light-emitting element 606 and the light-receiving element 608 are disposed in the vicinity of one end portion of the shaft 146A of the drive shaft 146 at mutually symmetrical positions with the vicinity of this end portion as a center. According to this arrangement, in the normal running state of the vehicle shown in FIG. 19A, the light projected from the light-emitting element 606 is constantly interrupted by the shaft 146A. However, in the state of a sudden deceleration of the vehicle shown in FIG. 19B, the drive shaft 146 rotates in the direction of arrow E in FIG. 15 by means of the inertial movement of the ball 144, so that the light projected from the light-emitting element 606 is received by the light-receiving element 608. Consequently, since the electrical signal obtained by photoelectric conversion by the light-receiving element 608 is inputted to the controller 176, the passenger's seat-side air bag device B is actuated. It should be noted that the drive shaft 146 in this case constitutes a moving member.

In addition to the arrangement in which the drive shaft 146 is used as the moving member to detect the rotation of the drive shaft 146, the movement of the bias pin 150, for instance, may be detected by the photointerrupter 610.

Furthermore, an arrangement in which the moving member is newly added may be adopted. For example, an arrangement may be provided such that a light-shielding plate is provided which moves by following the movement of any of the ball 144, drive shaft 146, bias pin 150, and firing pin 154 such that in the normal running state of the vehicle the light projected from the light-emitting element 606 is not shielded by the light-shielding plate, but in the state of a sudden deceleration of the vehicle the light is shielded by the light-shielding plate which moves by following the movement of any of the members mentioned above. As another example of the arrangement in which the moving member is newly added, it is possible to dispose a light-shielding plate adapted to shield the projected light by moving in stages as the ball 144 and the firing pin 154 move consecutively.

An arrangement may be alternatively provided such that a circular or elongated hole is formed in a portion of the ball 144, firing pin 154, or the like in such a manner that the light projected from the light-emitting element 606 passes through the circular or elongated hole, and the projected light is shielded as the ball 144, firing pin 154, or the like moves. In this case, by appropriately changing the position where the circular or elongated hole is formed, it is possible to freely change the position where the photointerrupter 610 is disposed.

Although in this embodiment the photointerrupter 610 of the opposing type is used, the arrangement is not restricted to the same, and a photosensor of a reflection type may be used.

Alternatively, a portion of the surface of the shaft portion 154A of the firing pin 154 is colored in, for instance, black, and the movement of the firing pin 154 may be detected by means of the relative strength of the light reflected from the firing pin 154.

Although in this embodiment the movement of a single kind of member is optically detected, the arrangement is not restricted to the same, and an arrangement may be provided such that the movement of a plurality of kinds of members (e.g., ball 144 and firing pin 154) may be detected by the photointerrupter 610, so as to more reliably actuate the passenger's seat-side air bag device at the time of a sudden deceleration of the vehicle.

Referring now to FIGS. 20 to 22 and 23A to 23C, a description will be given of a seventh embodiment.

In the description of this embodiment, the same arrangements, members and the like as those of the second and fifth embodiments will be denoted by the same reference numerals used in the second and fifth embodiments, and a description thereof will be omitted.

Figure 20:
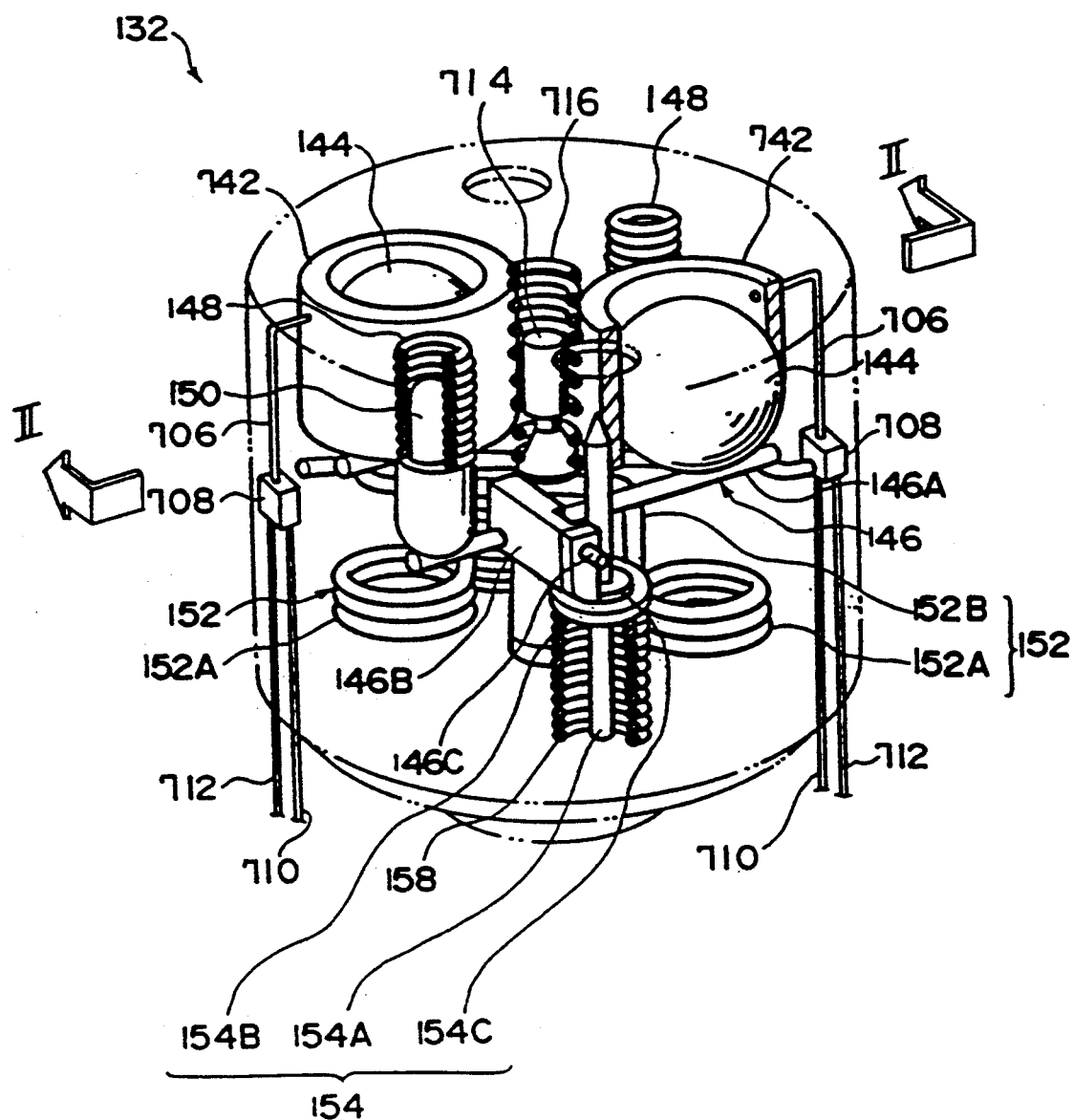
FIG. 20 is a perspective view of an actuator body in accordance with a seventh embodiment.

As shown in FIG. 20, a cylinder 742 serving as a pressure-change producing means is disposed in the upper case 126 along the axial direction thereof. This cylinder 742 has a cylindrical configuration, and the ball 144 serving as the inertia member is accommodated in the cylinder 742. As shown in FIGS. 20, 21, and 23A to 23C, a gap 700 of a small dimension d (see FIGS. 21 and 23A-23C) between the inner peripheral surface of the cylinder 742 and the ball 144. The internal space of the cylinder 742, which excludes the gap 700, is divided into two portions: an occupant-side space portion 702 which is in contact with one half surface (on the occupant's side) of the ball 144, and a space portion 704 located away from the occupant which is in contact with the other half surface (on the side away from the occupant) of the ball 144.

A small hole is formed inn a peripheral wall of the cylinder 142 facing the occupant-side space portion 702, one end of a pressure pipe 706 being inserted tightly in this small hole. An end face of this end of the pressure pipe 706 is made flush with the inner peripheral surface of the cylinder to ensure smooth flow of air at the time of a pressure change which will be described later. The other end of the pressure pipe 706 is connected to a pressure sensor 708 serving as a detecting means disposed in the vicinity of the peripheral surface of the upper case 136. This pressure sensor 708 is a diaphragm type semiconductor pressure sensor. That is, this pressure sensor 708 has a resilient diaphragm and a strain gage (neither are shown), and when pressure is applied to the diaphragm, the diaphragm undergoes deformation in proportion to the pressure applied, and the strain gage is deflected in proportion to this deformation.

Figure 23A:
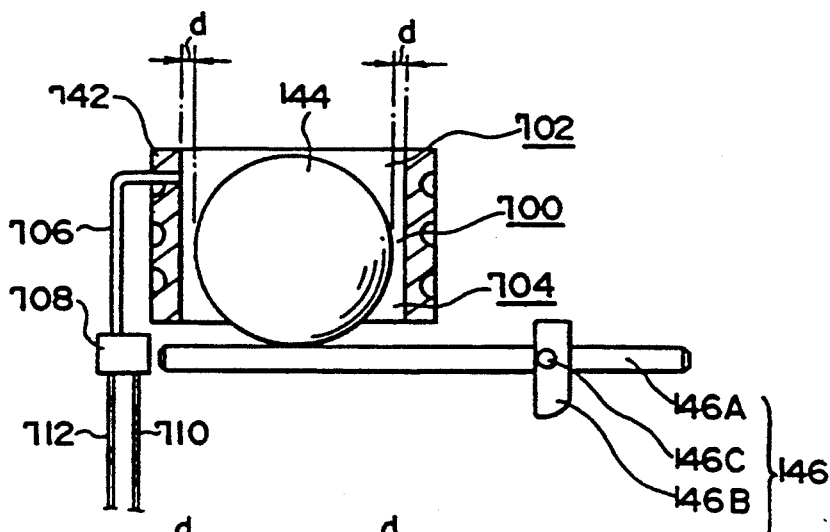
FIGS. 23A to 23C are diagrams illustrating relationships among a ball, a cylinder, a drive shaft, and a pressure shown in FIG. 20.
Figure 23B:
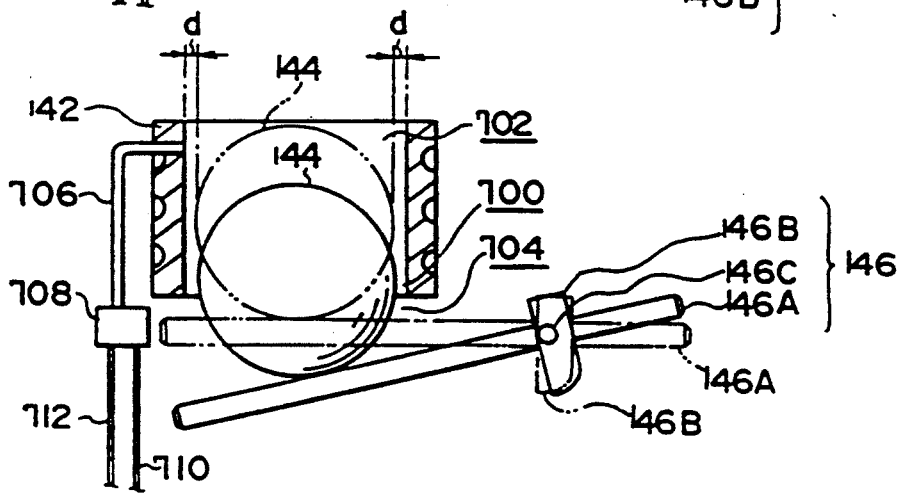
Figure 23C:
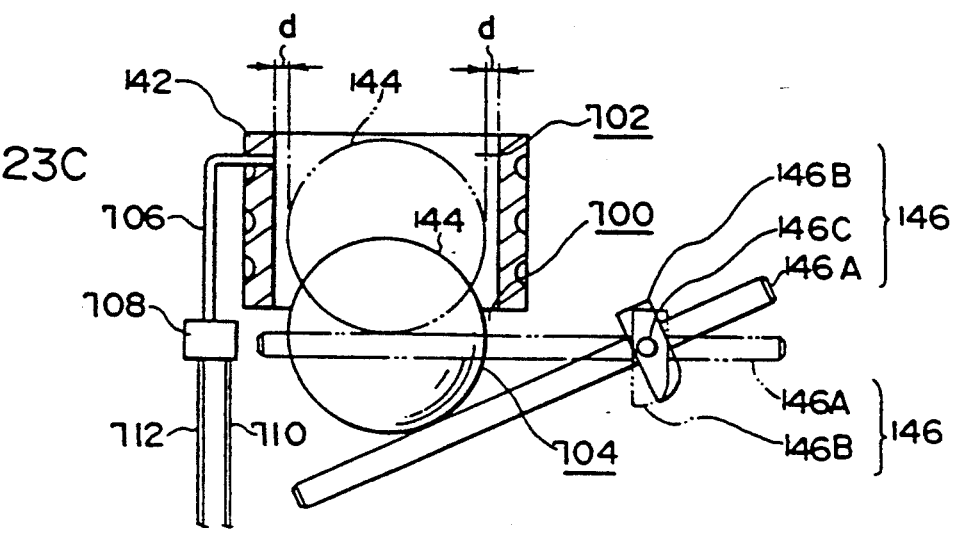
Figure 24:
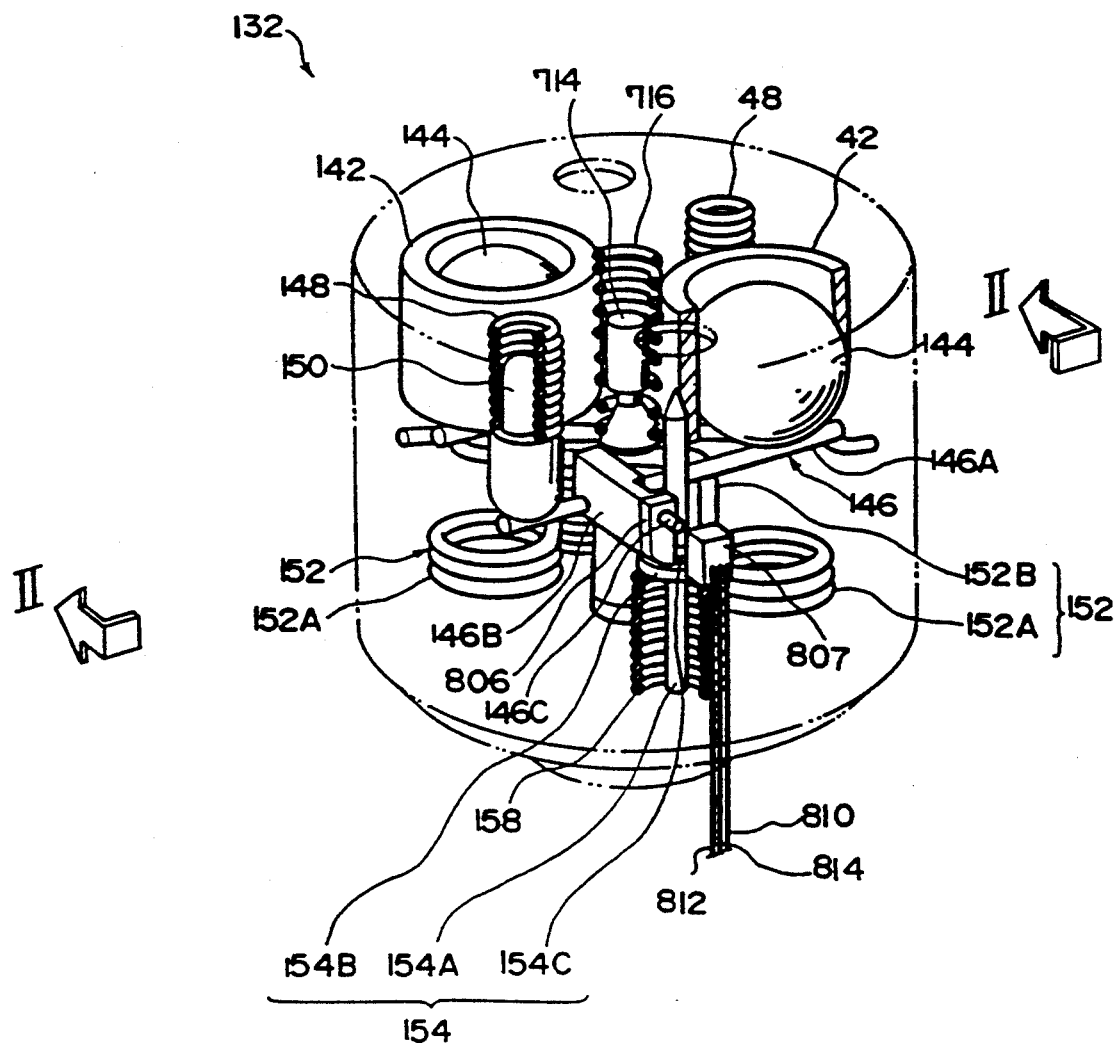
FIG. 24 is a perspective view of an actuator body in accordance with an eighth embodiment.

As shown in FIG. 23A, in the normal running state of the vehicle, the ball 44 does not undergo inertial movement, so that no pressure change occurs in the occupant-side space portion 702. However, in the state of a sudden deceleration of the vehicle, as shown in FIG. 23C, an impact load at a relatively low frequency for a long duration is applied to the actuator body 132, in which state a negative pressure of a greater predetermined range than during the normal running of the vehicle occurs in the occupant-side space portion 702, and its duration is longer. As shown in FIG. 23B, in a case where an impact load at a high frequency for a short duration (instantaneous impact load) is applied to the actuator body 132 as in the case where a relatively heavy load has accidentally collided against the steering wheel, the driving force disappears before the ball 144 starts inertial movement. Hence, a very lard negative pressure in terms of an absolute value does not occur in the occupant side space portion 702. Furthermore, in this case, the duration of the negative pressure is short.

In the operational diagrams shown in FIGS. 23B and 23C, the distance of movement of the ball 144 and the rotating position of the drive shaft 146 are illustrated in an exaggerated manner. Particularly in the case where an impact load at a high frequency for a short duration is applied as shown in FIG. 23B, the movement of the ball 144 is, in practice, equal to nil. Also, in the case where an impact load at a relatively low frequency for a long duration is applied as shown in FIG. 23C, the actuator body 132 is actually actuated before the ball 144 moves by the extent illustrated in the drawing.

Two sets of wirings 710, 712 (a total four wirings) are connected to the respective pressure sensors 708.

Figure 22:
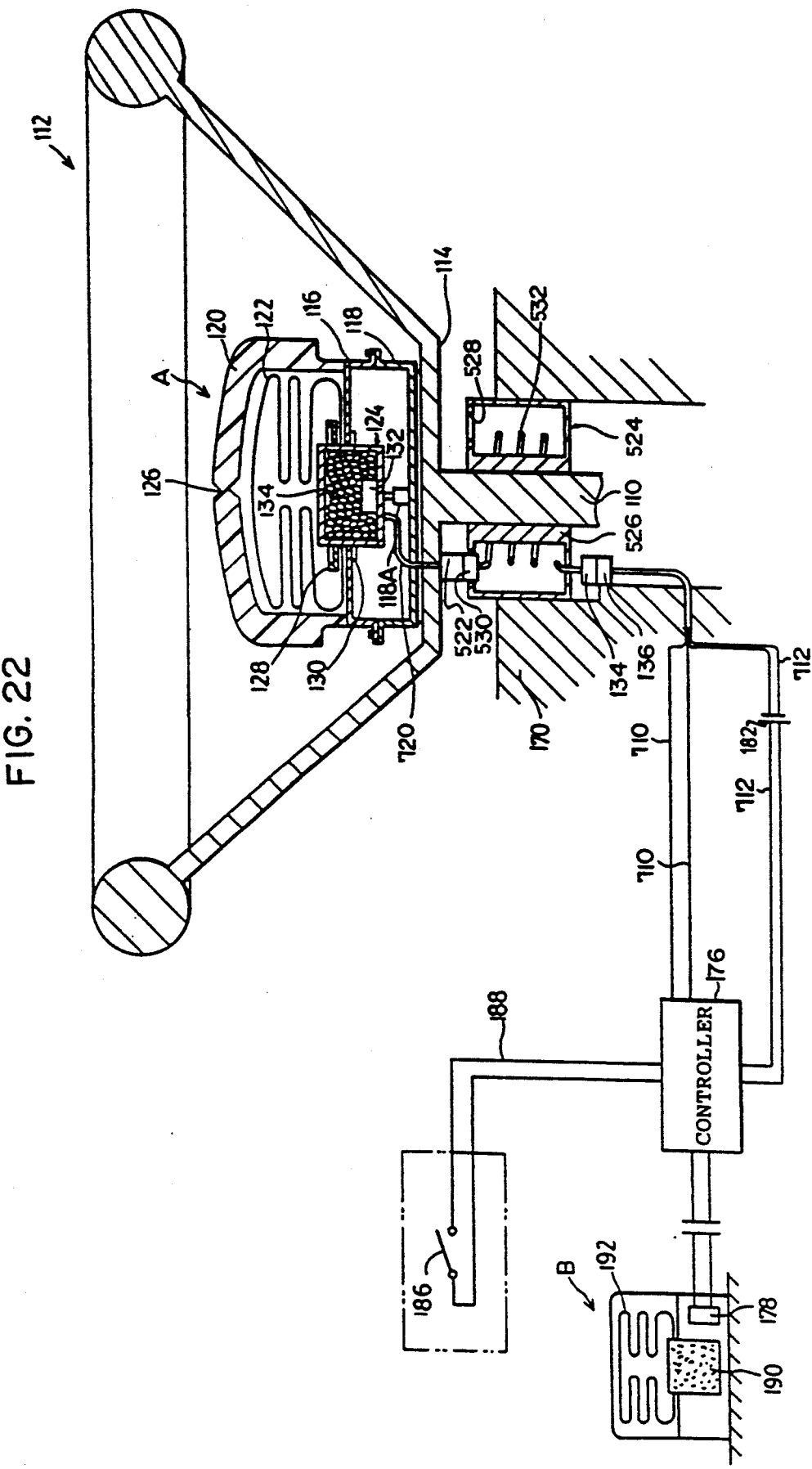
FIG. 22 is a schematic diagram of air bag devices provided for the driver's seat and the passenger's seat, respectively, in accordance with the seventh embodiment.

As shown in FIG. 22, the total of four wirings 710, 712 are bundled together as a wire harness 720 bent and suspended from the lower side, as viewed in FIG. 22, of the hub 114. The connector 522 is provided at the end of the wire harness 520.

The connector 534 is further connected to the connector 536, from which the four wirings 710, 712 are branched off. The wirings 712 for the pressure sensor 708 are directly connected to the minus terminal of the chassis power supply 182. The plus terminal of the chassis power supply 182 is connected to the controller 176 for igniting the electric detonator 178 disposed in the passenger's seat-side air bag device B of the electrically ignited type. Meanwhile, the wirings 710 for the pressure sensor 708 are connected to the controller 176.

A pressure value of a predetermined range and its duration are stored in advance in the controller 176. Upon comparing the pressure value of this predetermined range with a pressure value inputted to the controller 176, only when the pressure value inputted is within the predetermined range, when the duration exceeds a predetermined range, and when the buckle switch 186 is turned on does electric current flow across the filament of the passenger's seat-side air bag device B. When the current flows across the filament, Joule heat is generated to ignite the electric detonator 178, which in turn causes the gas generating agent 190 to react, thereby to inflate the bag 192.

The coil spring 152 in the lower case 138 comprises a coil portion 152A and a hook portion 152B projecting radially from the occupant-side end portion of the coil portion 152A. The hook portion 152B on the coil portion 152A side thereof is retained by a release pin 714 pressed and urged by a lock spring 716 inserted in an axial portion of the actuator body 132, while a tip portion of the hook portion 152B is located at a portion of the peripheral surface (located away from the occupant) of the other ball 144. In the state prior to installation of the air bag device A onto the steering wheel 112, the movement of the other ball 144 in the direction of its inertial movement and the rotation of the drive shaft 146 are prevented by means of this coil spring 152. In the state after installation thereof, as the release pin 714 moves toward the occupant's side against the urging forces of the lock spring 716 and the coil spring 152 by means of the projecting portion 118A of the support bracket 118, the hook portion 152B is retracted from the aforementioned position, thereby setting the actuator body 132 in an actuatable state.

The operation of this embodiment will be described hereinunder.

As shown in FIG. 23A, in the normal running state of the vehicle, since the ball 144 does not move by means its inertia, the pressure value of the occupant-side space portion 702 and the pressure value of the space portion 704 located away from the occupant within the cylinder 742 are identical. Consequently, air in the space portion 704 located away from the occupant does not flow into the occupant-side space portion 702 via the gap 700, and the pressure value within the pressure pipe 706 is identical with the pressure value within the cylinder 742. Accordingly, the pressure sensor does not detect a pressure change within the cylinder 742. As a result, the passenger's seat-side air bag device B is not actuated in the same way as the driver's seat-side air bag device A.

Figure 21:
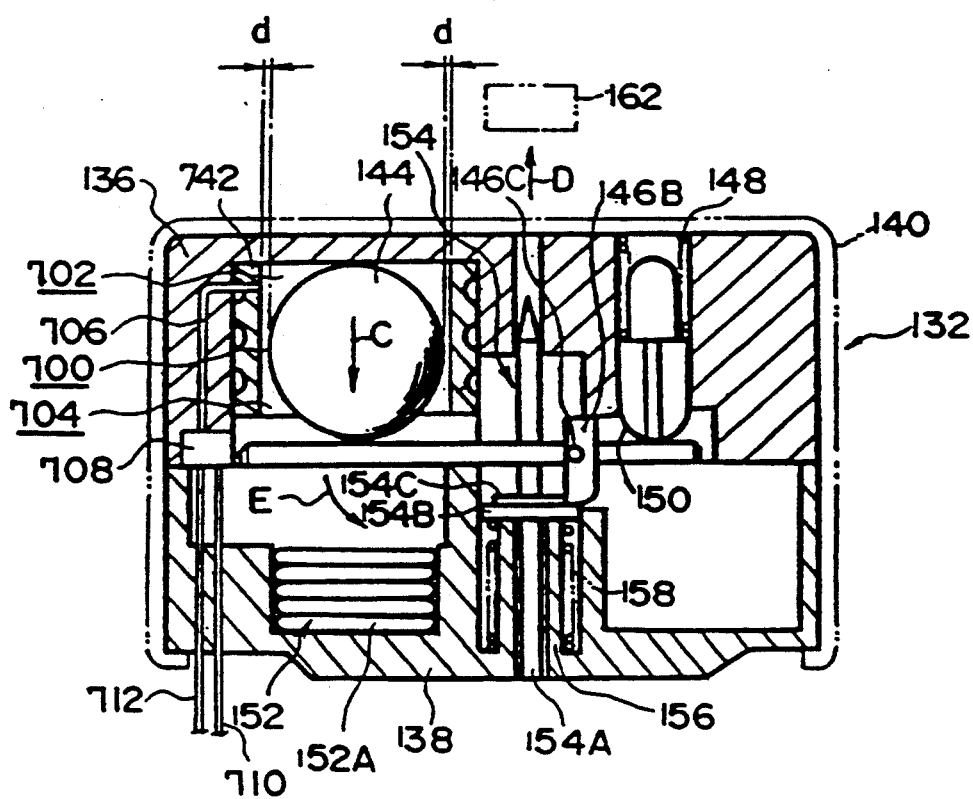
FIG. 21 is a cross-sectional view taken along line II—II of FIG. 20.

Then, as shown in FIG. 23B, in a case where an impact load at a high frequency for a short duration is applied to the actuator body 132 in this state, the ball 144 momentarily attempts to move in the direction of arrow C in FIG. 21 by means of its inertia, but the driving force disappears before its inertial movement is substantially begun. Consequently, a very large negative pressure in terms of an absolute value does not occur in the occupant-side space portion 702. In addition, since the duration of the negative pressure does not exceed the predetermined range, the passenger's seat-side air bag device B is not actuated. In other words, even if the air in the space portion 704 located away from the occupant momentarily attempts to flow into the occupant side space portion 702 via the gap 700, since the dimension d of the gap 700 is very small, the air in the space portion 704 located away from the occupant is unable to momentarily flow into the occupant-side space portion 702. In addition, although the occupant-side space portion 702 assumes a negative pressure, this negative pressure suppresses the movement of the ball 144, coupled with the fact that the driving force disappears before the ball 144 begins to move greatly. Accordingly, the ball 144 is unable to inertially move to the extent that the retaining portion 146B of the drive shaft 146 is disengaged from the collar 154B of the firing pin 154. As a result, in a case where an impact load at a high frequency for a short duration is applied to the actuator body 132, the driver's seat-side air bag device A is not actuated, either.

It should be noted that in FIG. 23B the state of the ball 144 and the drive shaft 146 prior to the inertial movement is shown by two-dotted chain lines, while the state thereof after the inertial movement is shown by solid lines (the same holds true of FIG. 23C as well).

Meanwhile, in a case where at the time of a sudden deceleration of the vehicle an impact load at a relatively low frequency for a long duration is applied to the actuator body 132, the ball 144 attempts to move greatly in the direction of arrow in FIG. 21. Then, a negative pressure occurs in the occupant-side space portion 702, and the air in the space portion 704 located away from the occupant attempts to flow into the occupant side space portion 702 via the gap 700. In this case, the frequency is relatively low and the duration is longer than in the case shown in FIG. 23B (this duration is sufficient for causing the inertial movement of the ball 144).

In addition, although the air in the space portion 704 located away from the occupant does not flow in up to the extent of fully filling up the portion of the negative pressure within the occupant-side space portion 702 (to set the pressure value for the occupant-side space portion 702 and the pressure value for the space portion 704 located away from the occupant in a state of equilibrium), this air flows into the occupant-side space portion 702 via the gap 700 to the extent of allowing the inertial movement of the ball 144. Consequently, the resistance preventing the inertial movement due to the negative pressure applied to the ball 144 does not increase in proportion to the amount of movement of the ball 144, and ceases to act at a certain level. Accordingly, the ball 144 moves greatly owing to its inertia in the direction of arrow C in FIG. 21.

Consequently, the retaining portion 146B of the drive shaft 146 rotates about the support shafts 146C in the direction of arrow E in FIG. 21, so that the retaining portion 146B is disengaged from the collar 154B of the firing pin 154. For this reason, the firing pin 154 moves in the direction of arrow D in FIG. 21 by means of the urging force of the compression coil spring 158, and collides against the detonator 162. Accordingly, the driver's seat-side occupant is securely prevented from the impact at the time of the sudden deceleration of the vehicle.

In addition, the negative pressure in this state is detected by the pressure sensor 708 via the pressure pipe 707. This pressure value is inputted to the controller 176 via the wirings 710, 712. Also, the duration of the negative pressure is inputted to the controller 176, the pressure value and the duration thus inputted are above the predetermined ranges stored in advance in the controller 176.

In the case where the occupant is seated in the passenger's seat, the "on" signal of the buckle switch 186 is inputted to the controller 176, and since the pressure value and the duration of the negative pressure inputted to the controller 176 are above the predetermined ranges stored in advance, electric current flows across the filament, so that Joule heat is generated to fire the electric detonator 178, allowing the gas generating agent 190 to produce a large amount of gas. As a result, the passenger's seat-side air bag device B is actuated, and as the bag 190 is inflated, the occupant seated in the passenger's seat is protected.

Since the arrangement provided in this embodiment is such that the pressure value of the occupant-side space portion 702 within the cylinder 742 is detected by the pressure sensor 708, no influence is exerted on the relationship of force (compression coil spring 158, bias spring 148) for imparting a driving force to drive-related components (firing pin 154, bias pin 150, and ball 144) within the actuator body 132.

Since in this embodiment the inertial movement of the ball 144 moving initially at the time of a sudden deceleration of the vehicle is detected by the pressure sensor 708, it is possible to improve the response characteristics at the time of actuating the passenger's seat-side air bag device B at the time of the sudden deceleration of the vehicle.

Furthermore, in this embodiment the pressure value of the occupant-side space portion 702 within the cylinder 742 is detected by the pressure sensor 708. Hence, since the pressure sensor 708 is spaced apart from the firing pin 154 and is spaced apart from the path of movement of the firing pin 154, the kinetic energy of the firing pin 154 is not lost during movement of the firing pin 154, and the detecting means does not receive a spit occurring when the detonator 162 is fired during the collision of the firing pin 154 against the detonator 162.

Although in this embodiment the diaphragm-type semiconductor pressure sensor is used as the pressure sensor 708, the arrangement is not restricted to the same, and a bellows-type pressure sensor or the like may be used. In other words, any arrangement may be used insofar as it is capable of detecting the pressure value of the occupant-side space portion 702 within the cylinder 742.

Although in this embodiment the state of movement of the ball 144 is detected from negative pressure by using the pressure sensor 708, the arrangement is not restricted to the same, and the state of movement of the ball 144 may be detected from positive pressure That is, any arrangement may be used insofar as it is capable of detecting the state of movement of the ball 144 on the basis of a pressure change.

Referring now to FIGS. 24 to 31, a description will be given of an eighth embodiment.

In the description of this embodiment, the same arrangements, members and the like as those of the second, fifth, and seventh embodiments will be denoted by the same reference numerals, and a description thereof will be omitted.

As shown in FIGS. 24 to 27, a permanent magnet 806 is integrally secured to the retaining portion 146B of the drive shaft 146 at a longitudinal end thereof. The cross sectional configuration of the permanent magnet 806 is set to be identical with that of the retaining portion 146B. A circular hole is formed in the permanent magnet 806 coaxially with the support shaft 146C, the support shaft 146C being inserted in this circular hole. It should be noted that it is sufficient if the permanent magnet is secured to one longitudinal end of the retaining portion 146B and may be so arranged not to interfere with the support shaft 146C.

Figure 27A:
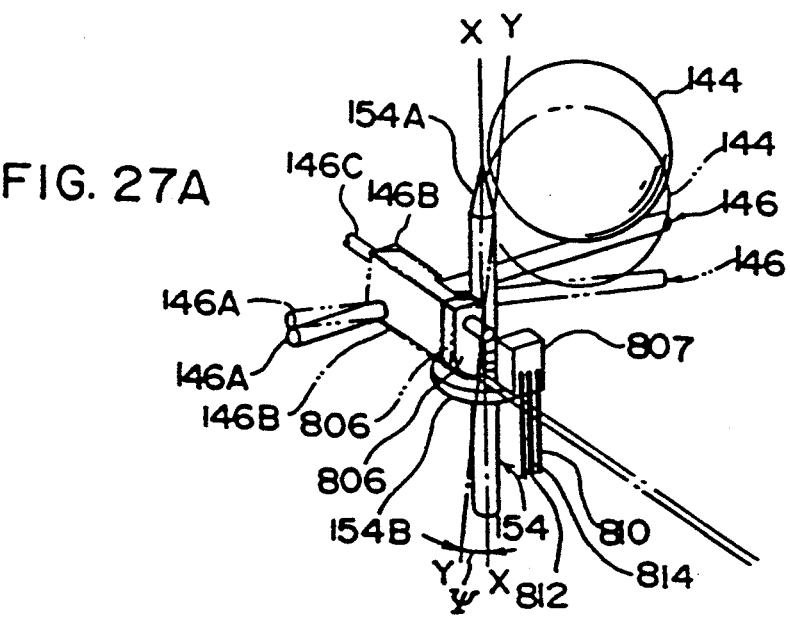
FIGS. 27A to 27C are diagrams illustrating relationships among a drive shaft, a permanent magnet, and a magnetoresistor shown in FIG. 24.
Figure 27B:
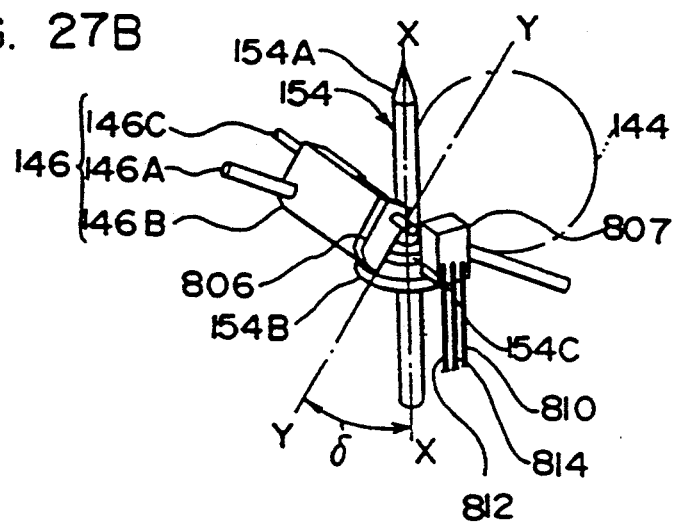
Figure 27C:
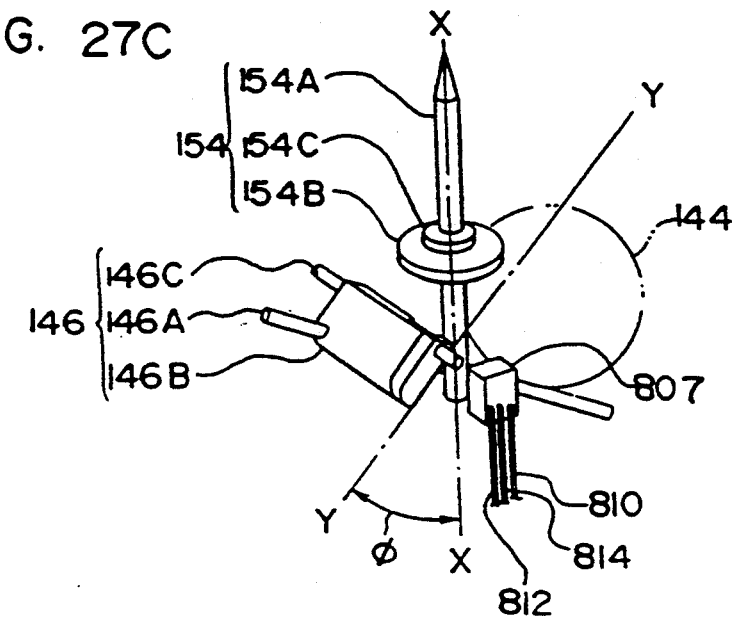
Figure 28:
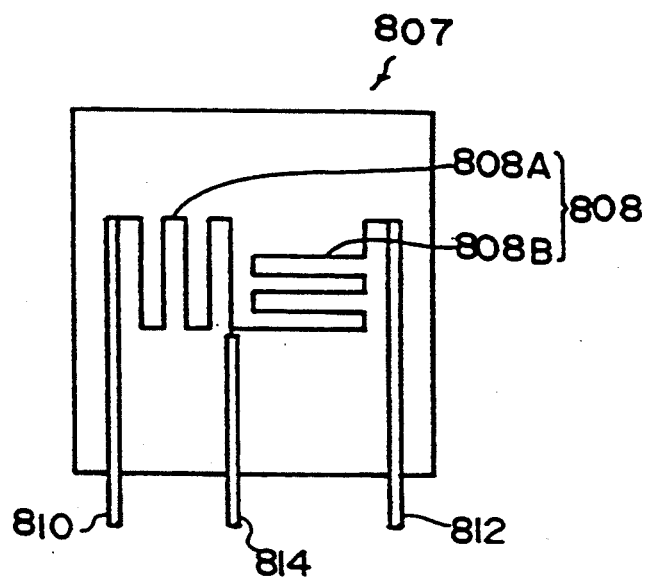
FIG. 28 is a rear view illustrating the wiring and pattern of the magnetoresistor shown in FIG. 24.
Figure 29:
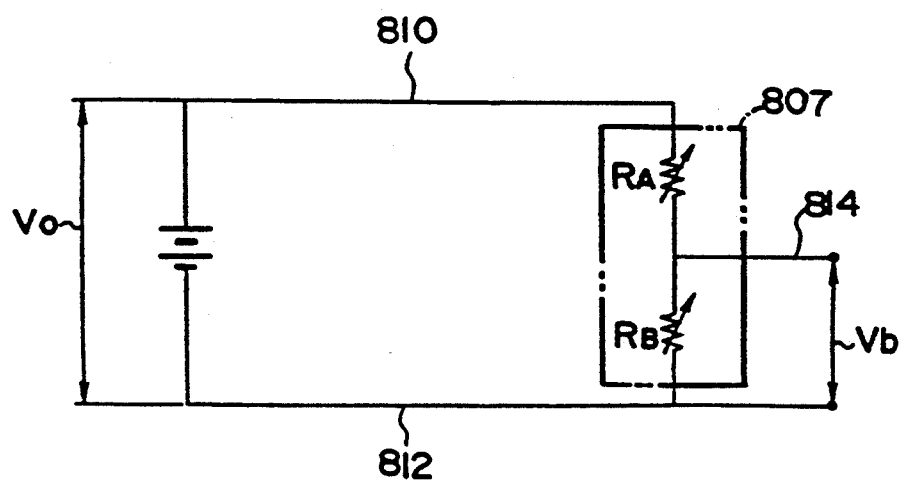
FIG. 29 is a circuit diagram including the magnetoresistor shown in FIG. 24.

In addition, a three-terminal type magnetoresistor 807 serving as the detecting means is disposed in the actuator body 132 at a position opposed to the permanent magnet 806. As shown in FIG. 28, this magnetoresistor 807 has a pattern 808A and a pattern 808B that are disposed in directions perpendicular to each other, and by detecting a mid-point voltage $V_b$ of a pattern 808, a change in the direction of a magnetic field is detected, as shown in FIGS. 27A to 27C. This mid-point voltage $V_b$ is calculated as follows $$V_b = V_0/2 - \Delta\rho \cdot \cos 2\theta \cdot v_0/2 \cdot 2\rho_0$$

where, $V_0$: initial voltage $\Delta\rho$: change in specific resistance due to magnetoresistance $\theta$: angle formed between the direction of the magnetic field and a longitudinal direction of one element among folded elements of the pattern 808A on the one hand $\rho_0$: specific resistance in no magnetic field or at $\theta = 45°$ More specifically, in a case where the direction of the magnetic field produced by the permanent magnet 806 is perpendicular to the pattern 808B, the mid-point voltage $V_b$ becomes minimum, whereas in a case where the direction of the magnetic field is parallel with the pattern 808B, the mid-point voltage $V_b$ becomes maximum. The magnetoresistor 807 is positioned such that, in the state in which the drive shaft 146 is installed (the state in which the drive shaft 146 does not rotate), the direction of the magnetic field due to the permanent magnet 806 becomes parallel with the pattern 808A and perpendicular to the pattern 808B. In addition, a fixed voltage $V_o$ is applied to the magnetoresistor 807, and electric current constantly flows across the same at least when the ignition switch is on.

In giving a more detailed description of the relationship between the direction of this direction of the magnetic field, i.e., the rotational angle of the permanent magnet 806, and the mid-point voltage $V_b$ with reference to FIGS. 27A to 27C, it is assumed that a line X—X which is indicated by a solid line in FIG. 27A and is perpendicular to the axis of the support shaft 146C and parallel with the axial direction of the actuator body 132 is a reference line for the rotational angle, and that a line Y—Y which is the longitudinal direction of the permanent magnet 806 and perpendicular to the support shaft 146C is set as a line of direction for indicating the rotational angle.

In a state in which the ball 144 has undergone no inertial movement (the state shown by the solid line in FIG. 27A), the line X—X and the line Y—Y overlap with each other, i.e., the rotational angle of the permanent magnet 806 is 0 degree. In this state, the direction of the magnetic field of the permanent magnet 806 is perpendicular to the pattern 808B, and the mid-point voltage $V_b$ of the pattern 808 is minimum.

In a state in which the ball 144 has undergone slight inertial movement (the state shown by a phantom line in FIG. 27A), a rotational angle $\Psi$ formed by the line X—X and the line Y—Y is very small. In this state, the direction of the magnetic field of the permanent magnet 806 is substantially perpendicular to the pattern 808B, and the mid-point voltage $V_b$ produced in the pattern 808 is virtually minimum.

In a state in which the ball 144 has inertially moved further from that position and immediately after the retaining portion 146B is disengaged from the collar 154B (the state shown in FIG. 27B), a rotational angle $\delta$ formed by the line X—X and the line Y—Y becomes large, and this rotational angle $\delta$ is a predetermined angle. In this state, the direction of the magnetic field of the permanent magnet 806 is at the predetermined angle with respect to the pattern 808B, and the mid-point voltage $V_b$ produced in the pattern 808 becomes large.

In a state in which the ball 144 has inertially moved further from that position and the retaining portion 146B is completely disengaged from the collar 154B (the state shown in FIG. 27C), a rotational angle $\phi$ formed between the line X—X and the line Y—Y becomes greater than the rotational angle $\delta$. In this state, the direction of the magnetic field of the permanent magnet 806 with respect to the pattern 808B becomes greater than the predetermined angle, and the mid. C point voltage $V_b$ occurring in the pattern 808 becomes greater.

Connected to the above-described magnetoresistor 807 are three wirings 810, 812, and 814.

As shown in FIG. 26, the wirings 810, 812, and 814 for the magnetoresistor 807 are bundled together as the wire harness 520 and are bent and suspended from the lower side, as viewed in FIG. 26, of the hub 114. The connector 522 is disposed at an end of the wire harness 520. This connector 522 is connected to the connector 530 of the roll connector 524.

The state of connection of the three wirings 810, 812, 814 from the magnetoresistor 807 to the controller 176 is securely maintained by means of the roll connector 524. The connector 534 is further connected to the connector 536, from which the three wirings 810, 812, 814 are branched off.

The wirings 812, 814 are in turn connected to the controller 176 which is a part of the actuator body. In addition, the wiring 810 is also connected to the wiring 812 via the chassis power supply 812, and is branched off midway thereof and is also connected to the controller 176.

In addition, a predetermined voltage value is stored in advance in the controller 176. The arrangement provided is such that electric current flows across the filament of the passenger's seat-side air bag device B only when, as a result of comparison between that predetermined voltage value and the voltage value $V_b$ of the wiring 814, this voltage value $V_b$ is not less than the predetermined voltage value (if the controller 176 incorporates a fixed-voltage generator for fixing the initial voltage $V_0$) or when $V_b/V_0$ has become not less than a fixed value (if the controller 176 does not incorporate the fixed-voltage generator for fixing the initial voltage $V_0$) and when the buckle switch 186 is turned on, when electric current flows across the filament, Joule heat is produced to ignite the electric detonator 178, which in turn causes the gas generating agent 190 to react, thereby inflating the bag 192.

The operation of this embodiment will be described hereinunder.

In the normal running state of the vehicle, since the retaining portion 146B of the drive shaft 146 is not disengaged from the collar 154B of the firing pin 154, the rotational angle of the retaining portion 146B and the permanent magnet 806 about the support shafts 146C is between 0 degree (the state shown by the solid line in FIG. 27A) and the very small angle $\Psi$ (the state shown by the phantom line in FIG. 27A). Accordingly, the direction of the magnetic field due to the permanent magnet 806 is between 0 degree and the very small angle $\Psi$ with respect to the pattern 808A. As a result, the mid-point voltage $V_b$ occurring in the pattern 808 (a resistor $R_B$ in the circuit shown in FIG. 29) becomes minimum or virtually minimum. For this reason, regardless of whether the buckle switch 186 is turned on or off, the passenger's seat-side air bag device B is not actuated in the same way as the driver's seat-side air bag device A. Accordingly, the normal running state of the vehicle is maintained.

Figure 25:
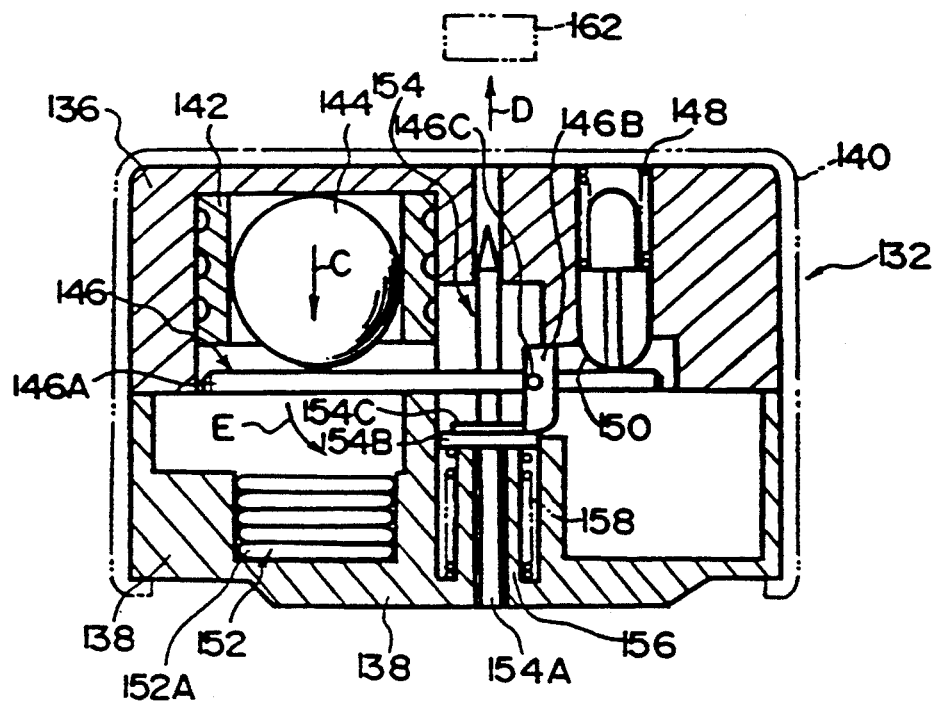
FIG. 25 is a cross-sectional view taken along line II—II of FIG. 24.

When the vehicle undergoes a sudden deceleration in this state, the ball 144 inertially moves greatly in the direction of arrow C in FIG. 25. Consequently, the retaining portion 146B of the drive shaft 146 and the permanent magnet 806 rotate about the support shafts 146C in the direction of arrow E in FIG. 25. Then, when their rotational angle has become the predetermined angle $\delta$ (the state shown in FIG. 27B), the retaining portion 146B is disengaged from the collar 154B of the firing pin 154. As a result, the firing pin 154 moves in the direction of arrow D in FIG. 25 by means of the urging force of the compression coil spring 158, and collides against the detonator 162. Hence, the detonator 162 is ignited, and the gas generating agent 134 undergoes reaction via an unillustrated booster, so that a large amount of gas is generated. Consequently, the bag 122 is inflated, and the pad 120 is broken at the thin-walled portion 126. After the pad 120 is broken, the inflated bag 122 is interposed between the steering wheel 112 and the occupant. Hence, the occupant seated in the driver's seat is securely protected from the impact at the time of the sudden deceleration of the vehicle.

Meanwhile, when the rotational angle of the permanent magnet 806 becomes $\delta$, the direction of the magnetic field due to the permanent magnet 806 similarly becomes $\delta$ with respect to the pattern 808A. For this reason, the mid-point voltage $V_b$ occurring in the pattern 808 becomes large. Accordingly, the voltage at the wiring 818 becomes large. When the ball 144 intertially moves further from that position and the rotational angle of the permanent magnet 806 with respect to the pattern 808A becomes $\phi$, as shown in FIG. 27C, the mid-point voltage $V_b$ occurring in the pattern 808 becomes greater than the mid-point voltage $V_b$ occurring in the pattern 808 in the state shown in FIG. 27B, so that the voltage at the wiring 814 becomes greater. This voltage value is greater than the predetermined voltage stored in advance in the controller 176 (if the controller 176 incorporates the fixed-voltage generator for fixing the initial voltage $V_0$), or $V_b/V_0$ becomes greater than the predetermined value stored in the controller 176 (if the controller 176 does not incorporate the fixed-voltage generator for fixing the initial voltage $V_0$).

In the case where the occupant is seated in the passenger's seat, i.e., when the buckle switch 186 is turned on, this electric signal is transmitted to the controller 176, and electric current flows across the filament to generate Joule heat, which in turn ignites the electric detonator 178, allowing the gas generating agent 190 to produce a large amount of gas. As a result, the passenger's seat-side air bag device B is actuated, and as the bag 192 is inflated, the occupant seated in the passenger's seat is protected.

Furthermore, since the arrangement provided in this embodiment is such that the permanent magnet 806 is disposed in the vicinity of the support shaft 146C of the retaining portion 146B of the drive shaft 146, no influence is exerted on the relationship of force (compression coil spring 158, bias spring 148) for imparting a driving force to drive related components (firing pin 154, bias pin 150, and ball 144) within the actuator body 132.

In the above-described embodiment, the rotational angle δ immediately after the retaining portion 146C is disengaged from the collar 154B is stored in advance in the controller 176 as a predetermined angle, and when the rotational angle of the retaining portion 146 and the permanent magnet 806 is greater than the rotational angle δ, electric current continues to flow from the controller 176 to the filament (provided that the buckle switch 186 is turned on). Hence, it is possible to reliably detect the state of the sudden deceleration of the vehicle, and it is possible to obviate the occurrence of a situation where the passenger's seat-side air bag device B is not actuated although the vehicle has undergone a sudden deceleration.

Although in the foregoing embodiment the permanent magnet 806 is used as the magnet, the arrangement is not restricted to the same, and an electromagnet or the like may be used and disposed in the vicinity of the support shaft 146C of the drive shaft 146. That is, any arrangement may be adopted insofar as it permits rotation by following the movement of the retaining portion 146B.

Although in this embodiment the magnetoresistor 807 is positioned such that, with the actuator body 132 installed, the direction of the magnetic field of the permanent magnet 806 is parallel with the pattern 808A and perpendicular to the pattern 808B, the magnetoresistor 807 may be positioned by reversing this relationship.

Furthermore, although in this embodiment the rotational angle of the drive shaft 146 is detected on the basis of a change in the mid-point voltage $V_b$ in the pattern 808, the rotational angle may be detected on the basis of a change in a mid-point voltage $V_a$ in the pattern 808A.

In addition, although the buckle switch 186 is used, it suffices if a seating sensor for detecting the seating of an occupant in the passenger's seat is used as the buckle switch 186, and for instance an infrared detection method, an ultrasonic detection method, or the like may be employed. Furthermore, as a simplified system, a system configuration with the buckle switch 186 omitted may be adopted.

Figure 30:
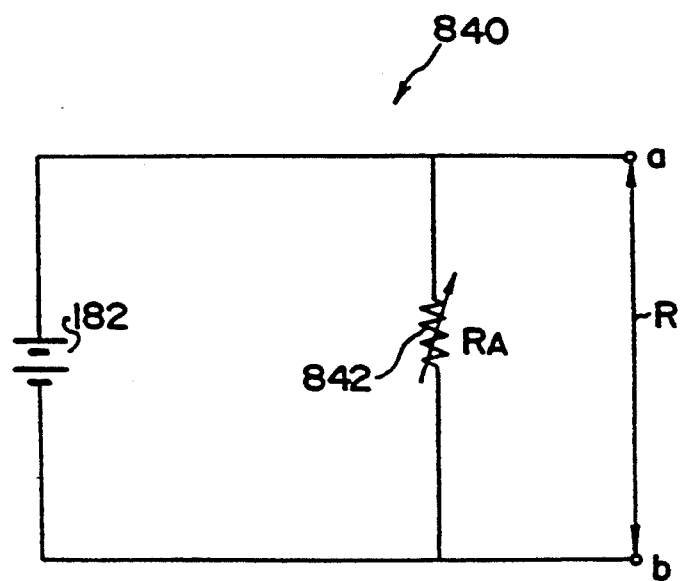
FIGS. 30 and 31 are circuit diagrams illustrating modifications of the circuit shown in FIG. 29.
Figure 31:
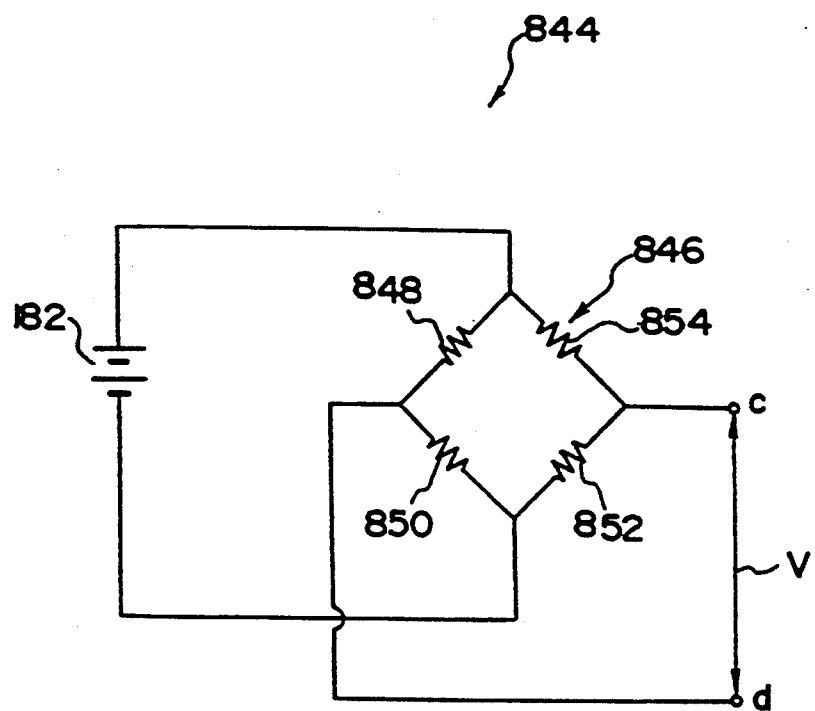

Although in this embodiment a description has been given of the case in which the three-terminal type magnetoresistor 807 is used, it is possible to use a system employing a known circuit, as shown in FIGS. 30 and 31.

More specifically, in a circuit 840 shown in FIG. 30, the chassis power supply 182 is connected to a two-terminal type magnetoresistor, and the direction of the magnetic field is detected by measuring a resistance between a and b.

Meanwhile, in a circuit 844 shown in FIG. 31, the chassis power supply 182 is connected to a bridge 846, an at least one of resistors 848, 850, 852, 854 is formed as the two-terminal type magnetoresistor. In this circuit 844, the direction of the magnetic field is detected by measuring a voltage differential between c and d. In a case where two or more magnetoresistors are used at the time of detecting the direction of the magnetic field by means this circuit, the pair of resistors 848 and 852 and the pair of resistors 850 and 854, respectively, need to be formed as a magnetoresistor having elements provided with magnetic sensitivity in the same direction. In practice, by forming all of the four resistors 848, 850, 852, 854 as magnetoresistors, it is possible to fetch a large output as the voltage differential between c and d.

Referring now to FIGS. 32, 33, and 34A to 34C, a description will be given of a ninth embodiment.

In the description of this embodiment, the same arrangements, members and the like as those of the foregoing embodiments will be denoted by the same reference numerals used in the foregoing embodiments, and a description thereof will be omitted.

A disk-shaped movable contact 950 serving as a first contact means is formed integrally with the compression coil spring 158 on an intermediate portion of the compression coil spring 158, as viewed in the stretching and shrinking direction thereof. Consequently, the movable contact 950 moves in the direction of arrow D in FIG. 32 as the compression coil spring 158 is stretched. This movable contact 950 is formed of an insulating material.

A circular hole 952 having a diameter slightly larger than the spring supporting portion 156 is formed in an axial portion of the movable contact 950, the spring supporting portion 156 being inserted in this circular hole 952. Accordingly, the outer peripheral surface of the spring supporting portion 156 and the inner peripheral surface of the movable contact 950 are constantly spaced apart from each other. Therefore, when the compression coil spring 158 is stretched at the time of a sudden deceleration of the vehicle, it is possible to prevent the loss of energy owing to contact between the inner peripheral surface of the movable contact 950 and the outer peripheral surface of the spring supporting portion 156.

A first terminal 954 is disposed on the occupant side surface of the movable contact 950 on an outer peripheral portion thereof. One end of a wiring 956 is connected to the first terminal 954, and an intermediate portion of the wiring 956 is passed through a small hole 958 formed in a bottom 138A of the lower case 138 and is guided to outside the actuator body 132. Furthermore, a second terminal 960 is disposed on the occupant-side surface of the movable contact at a position radially opposed to the first terminal 954. The first terminal 954 and the second terminal 960 are connected to each other via an unillustrated printed wiring.

A fixed contact 962 serving as a second contact means is disposed at a position adjacent the movable contact 950. This fixed contact 962 is formed by bending a resilient electrically conductive material. That is, a longitudinally intermediate portion of a rectangular electrically conductive material in a plan view is bent in such a manner that longitudinal opposite end portions of the conductive material become parallel with each other to form the fixed contact 962. One end portion 962A is secured to a square projection 964 provided on the bottom 138A of the lower case in such a manner as to project therefrom.

A third terminal 968 is formed on the end portion 962A of the fixed contact 962 on the occupant-side surface thereof, one end of a wiring 970 being connected to the third terminal 968. An intermediate portion of the wiring 970 is passed through a small hole 974 formed in the bottom 138A of the lower case 138 and is guided to outside the actuator body 132.

A fourth terminal is disposed at the other end portion 962B of the fixed contact 962. The fourth terminal is disposed by being spaced apart from the second terminal 960 on the path of movement of the second terminal 960. This spaced-apart distance is within the stroke of movement of the firing pin 154. Hence, when the firing pin 154 moves toward the detonator 162 at the time of a sudden deceleration of the vehicle, the second terminal 960 of the movable contact 950 interferes with the fourth terminal 976 of the fixed contact 962 and is hence energized.

Figure 34A:
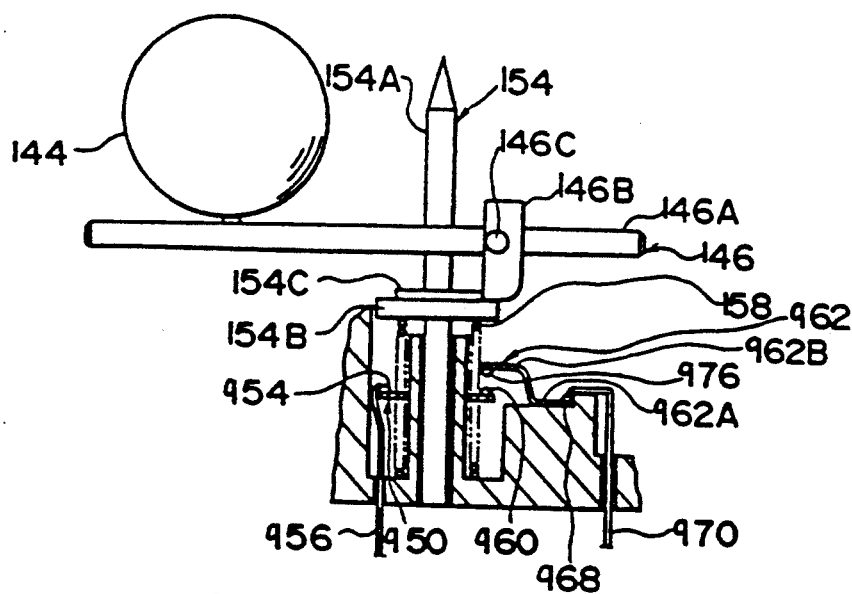
FIGS. 34A to 34C are diagrams illustrating the operation of the movable contact and the fixed contact, shown in FIG. 32, in terms of relationships between the firing pin and the compression coil spring.
Figure 34B:
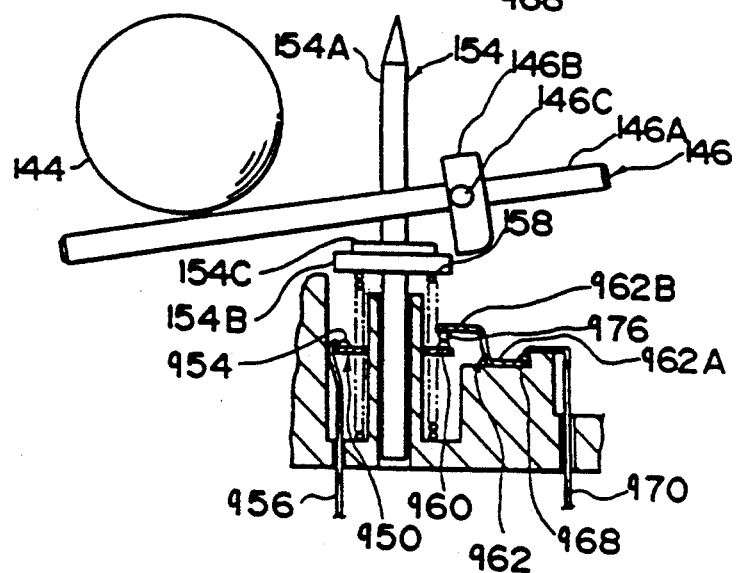
Figure 34C:
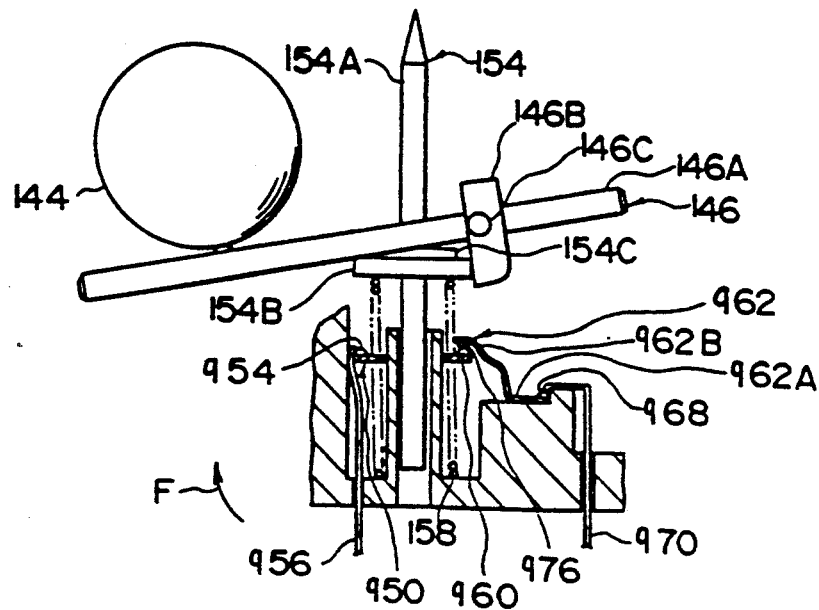

The state shown in FIG. 34A is the normal running state of the vehicle, in which state the second terminal 960 and the fourth terminal 976 are in a state of noncontact with each other. It should be noted that the position of the compression coil spring 158 in this state, i.e., the compressed position, is the second position of the urging means. In this state, when the vehicle undergoes a sudden deceleration, as shown in FIG. 34B, the second terminal 960 and the fourth terminal 976 are brought into contact with each other and are energized. Furthermore, after the second terminal 960 and the fourth terminal 976 have been brought into contact with each other, as shown in FIG. 34C, the fixed contact 962 undergoes resilient deformation in such a manner that the other end portion 962B rotates in the direction of arrow F in FIG. 34C with the one end portion 962A as a fulcrum. In this state as well, the state of contact between the second terminal 960 and the fourth contact 976 is maintained. It should be noted that the position of the compression coil spring 158 in this state, i.e., the state in which the compression coil spring 158 is virtually restored after stretching, is the first position of the urging means.

As shown in FIG. 33, the wirings 956, 970 for the movable contact 950 and the fixed contact 962 are bundled together as the wire harness 520 bent and suspended from the lower side, as viewed in the drawing, of the hub 114. The connector 522 is provided at the end of the wire harness 520. This connector 522 is connected to the connector 530 of the roll connector 524.

The state of connection of the four wirings 956, 970 (two sets of fixed movable contact 950 and fixed contact 962) from the movable contact 950 and the fixed contact 962 to the controller 176 is securely maintained by means of the roll connector 524.

The connector 534 is connected to the connector 536, from which the four wirings 956, 970 are branched off. The other ends of the wirings 970 for the fixed contact 962 are directly connected to the minus terminal of the chassis power supply 182. The plus terminal of the chassis power supply 182 is connected via wirings 978 to the controller 176 for igniting the electrical detonator 178 disposed in the passenger's seat-side air bag device B of the electrically ignited type. In addition, the other ends of the wirings 956 of the movable contact 950 are also connected to the controller 176. It should be noted that the wiring 977 is a minus-side power line for the controller 176.

The arrangement provided is such that electric current flows across the filament only when the buckle switch 186 is turned on and the movable contact 950 and the fixed contact 962 are energized. When electric current flows across the filament, Joule heat is produced to ignite the electric detonator 178, which in turn causes the gas generating agent 190 to react, thereby inflating the bag 192.

The operation of this embodiment will be described hereinunder.

In the normal running state of the vehicle, the firing pin 154 is in the state shown in FIG. 34A, and the movable contact 950 and the fixed contact 962 are spaced apart from each other, so that the second terminal 960 and the fourth terminal 976 are not energized. As a result, the passenger's seat-side air bag device B is not actuated, either. Thus, the normal running state of the vehicle is maintained.

Figure 32:
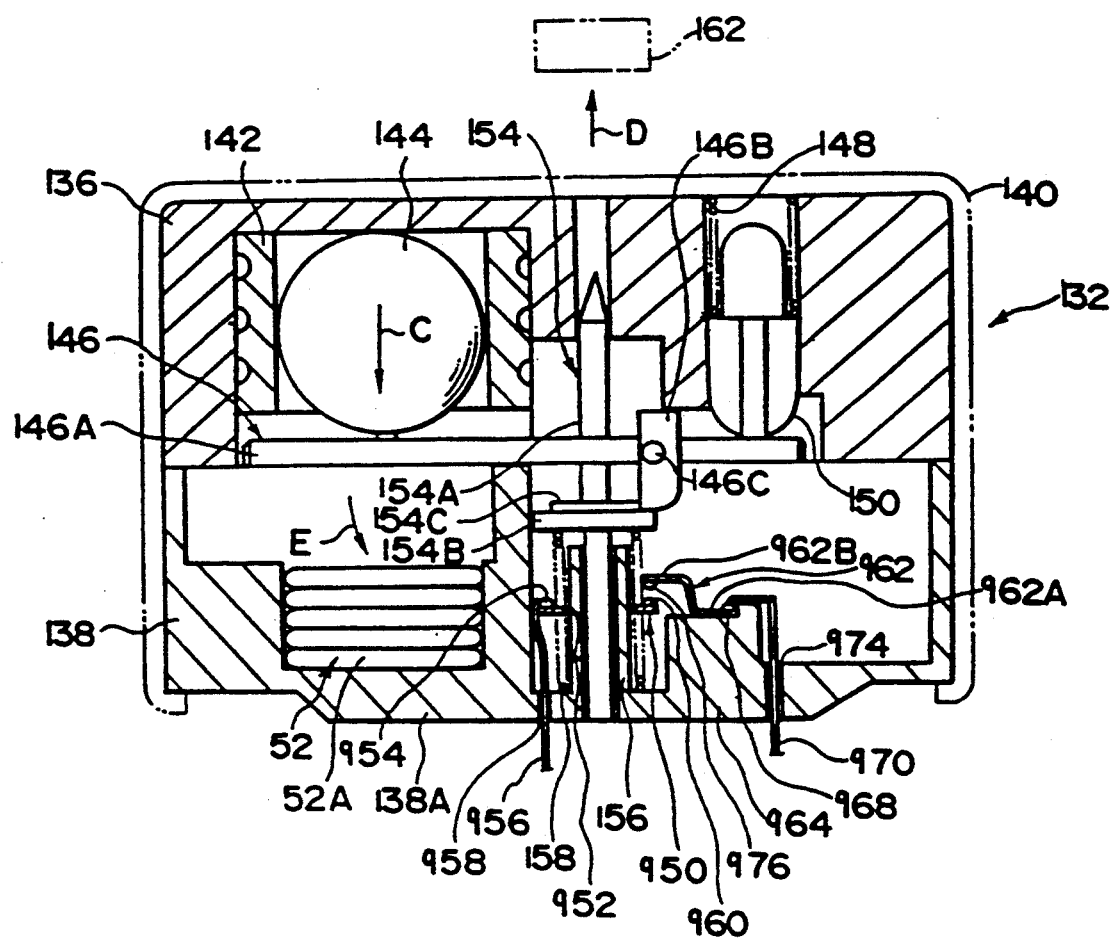
FIG. 32 is a cross-sectional view of an actuator body in accordance with a ninth embodiment taken along the axial direction thereof, the actuator body being provided with a movable contact and a fixed contact.

In this state, when the vehicle undergoes a sudden deceleration, the ball 144 inertially moves greatly in the direction of arrow C in FIG. 32. For this reason, the drive shaft 146 rotates about the support shafts 146C in the direction of arrow E in FIG. 32, so that the retaining portion 146B is disengaged from the collar 154B of the firing pin 154. As a result, the firing pin 154 moves in the direction of arrow D in FIG. 32 by means of the urging force of the compression coil spring 158, and collides against the detonator 162. Hence, the detonator 162 is ignited, so that the gas generating agent 134 undergoes reaction via an unillustrated booster, thereby generating a large amount of gas. Consequently, the bag 122 is inflated, and the pad 120 is broken at the thin-walled portion 126. After the pad 120 is broken, the inflated bag 122 is interposed between the steering wheel 112 and the occupant. Hence, the occupant seated in the driver's seat is securely protected from the impact at the time of the sudden deceleration of the vehicle.

Meanwhile, the compression coil spring 158 stretches to move the firing pin 154 toward the detonator 162, as shown in FIG. 34B. In conjunction with the stretching of the compression coil spring 158, the movable contact 950 formed integrally with the compression coil spring 158 moves in the direction of arrow D in FIG. 32 together with the compression coil spring 158. Midway in the movement of this movable contact 950, the second terminal 960 of the movable contact 950 is brought into contact with the fourth contact 976 of the fixed contact 962. Consequently the movable contact 950 and the fixed contact 962 are energized. Furthermore, after the second terminal 960 and the fourth terminal 976 are brought into contact with each other, the other end portion 962B of the fixed contact 962 is slightly deflected in the direction of arrow F with the one end portion 962A as a fulcrum, as shown in FIG. 34C. In the meantime, the state of energization between the second terminal 960 of the movable contact 950 and the fourth contact 976 of the fixed contact 962 is maintained.

Here, in the case where the occupant is not seated in the passenger's seat, i.e., when the passenger's seat-side buckle switch 186 is not turned on, the determination circuit of the controller 176 functions, so that this air bag device B is not actuated regardless of whether the second terminal 960 of the movable contact 950 and the fourth terminal 976 of the fixed contact 962 are energized. However, in the case where the occupant is seated in the passenger's seat, i.e., when the passenger's seat-side buckle switch 186 is turned on, the determination circuit of the controller 176 determines that the occupant is seated in the passenger's seat, and since the second terminal 960 of the movable contact 950 and the fourth terminal 976 of the fixed contact 962 are energized, electric current flows from the controller 176 to the filament. As a result, Joule heat is produced to ignite the electrical detonator 178, which in turn allows the gas generating agent 190 to generate a large amount of gas. Consequently, the passenger's seat-side air bag device B is actuated, and as the bag 192 is inflated, the occupant seated in the passenger's seat is protected.

The arrangement provided in the above-described embodiment is such that the movable contact 950 is formed integrally with an intermediate portion of the compression coil spring 150, as viewed in the stretching and shrinking direction thereof, for pressing and urging the firing pin 154 toward the detonator 162, and the other end portion 962B of the fixed contact 962 is disposed at a position interfering with the path of movement of the second terminal 960 of the movable contact 950, while one end portion 962A thereof is fixed to the projection 964 on the bottom 138A of the lower case. Accordingly, the movement of the firing pin 154 at the time of a sudden deceleration of the vehicle can be detected in a state of noncontact with the firing pin 154, and the passenger's seat-side air bag device B can be actuated positively without losing the kinetic energy of the firing pin 154 until it collides against the detonator 162.

In addition, since both the movable contact 950 and the fixed contact 962 are disposed in the lower case 138, the movable contact 950 and the fixed contact 962 are not affected by a spit occurring due to the firing of the detonator 162 when the shaft portion 154A of the firing pin 154 collides against the detonator 162 disposed on the occupant's side of the actuator body 132

Although in this embodiment the movable contact 950 is formed integrally with an intermediate portion, in the stretching and shrinking direction, of the compression coil spring 158, and the wiring 956 is connected to the first terminal 954 of the movable contact 950, the arrangement is not restricted to the same. For instance, an arrangement may be alternatively provided such that the wiring 956 is directly connected to the end, located away from the occupant, of the compression coil spring 158, and a tongue formed of an electrically conductive material and having the second terminal 960 is integrally formed at an intermediate portion, in the stretching and shrinking direction, of the compression coil spring 158. That is, any arrangement can be used insofar as a movable contact which moves together with the stretching of the compression coil spring 158 is energized with a fixed contact.

Referring now to FIGS. 35 to 40, a description will be given of a tenth embodiment.

In the description of this embodiment, the same arrangements, members and the like as those of the foregoing embodiments will be denoted by the same reference numerals used in the foregoing embodiments, and a description thereof will be omitted.

An arcuate notch 146D is provided diagonally on the occupant's side of the retaining portion 146B so as to not to hamper the movement of the firing pin 154 due to the urging force of the compression coil spring 158.

Figure 35:
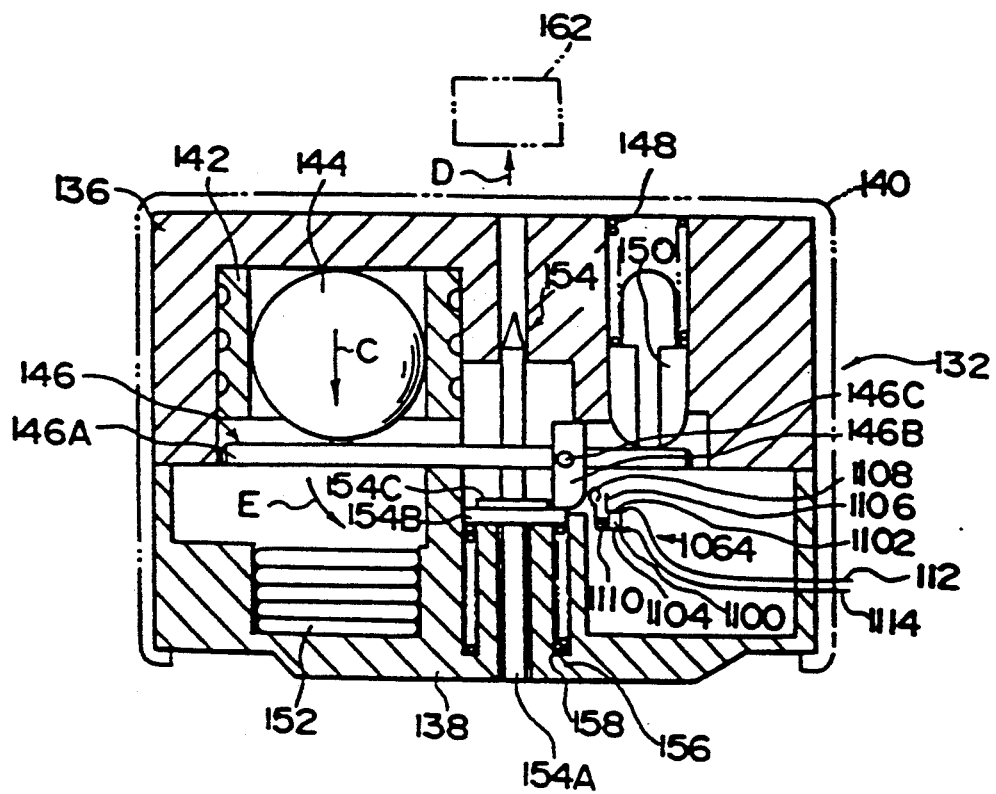
FIG. 35 is a cross-sectional view of an actuator body in accordance with a tenth embodiment provided with a detecting portion.

As shown in FIG. 35, a detecting portion 1064 for closing the contact by means of the movement of the drive shaft 146 is provided in the actuator body 132. This detecting portion 1064 is disposed in the vicinity of a tip of the retaining portion 146B of the drive shaft, as shown in FIG. 37.

Figure 37:
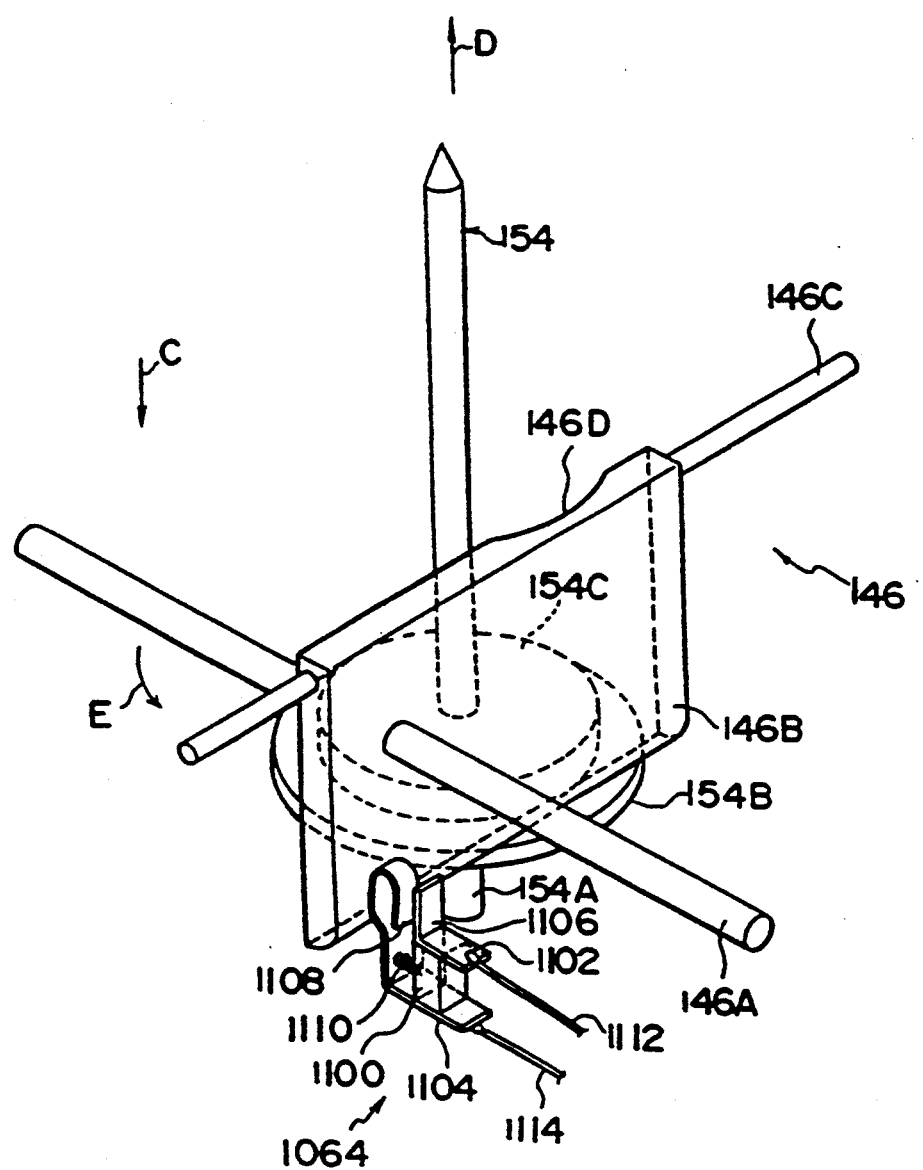
FIG. 37 is a perspective view of an essential portion illustrating the normal state of the actuator body shown in FIG. 35.

As shown in FIG. 37, the detecting portion 1064 comprises a fixed contact 1102, a movable contact 1104, and a holder 1100. The holder 1100 is formed into a configuration of a block, and is secured to the lower case 138 (not shown). The fixed contact 1102 is disposed on the occupant-side surface (on the upper side in FIG. 37) of the holder 1100, and an end portion (located on the retaining portion 146B side) of the fixed contact 1102 is bent substantially orthogonally in the direction of arrow D in FIG. 37 so as to be set as a contact 1106.

One end portion of the movable contact 1104 is disposed on the lower surface, as viewed in FIG. 37, of the holder 1100, and the other end portion thereof is bent toward the occupant after being extended toward the retaining portion 146 side, while a portion in the vicinity of that end portion is bent into an oblong circular configuration between the contact 1106 and the retaining portion 146B, the tip thereon on the contact 1106 side being set as a contact 1108.

The retaining portion 146B is capable of abutting against the retaining portion 146B side of the contact 1108, and as the retaining portion 146B is brought into contact with the same, the movable contact 1104 is further bent at its bent portion, thereby moving the contact 1108 toward the contact 1106. As a result, the contact 1106 and the contact 1108 are brought into contact with each other.

A coil spring 1110 is disposed between the movable contact 1104 and the holder 1100, and its opposite ends are retained by the movable contact 1104 and the holder 1100, respectively. By means of this coil spring 1110, the contact 1108 of the movable contact 1104 is slightly urged toward the retaining portion 146B, so that fine swingings of the contact 1108 in the normal running state of the vehicle are absorbed.

Wirings 1112, 1114 for outputting signals by the detecting portion 1064 are connected to the holder 1100-side end portions of the fixed contact 1102 and the movable contact 1104 by means of soldering or the like.

Figure 36:
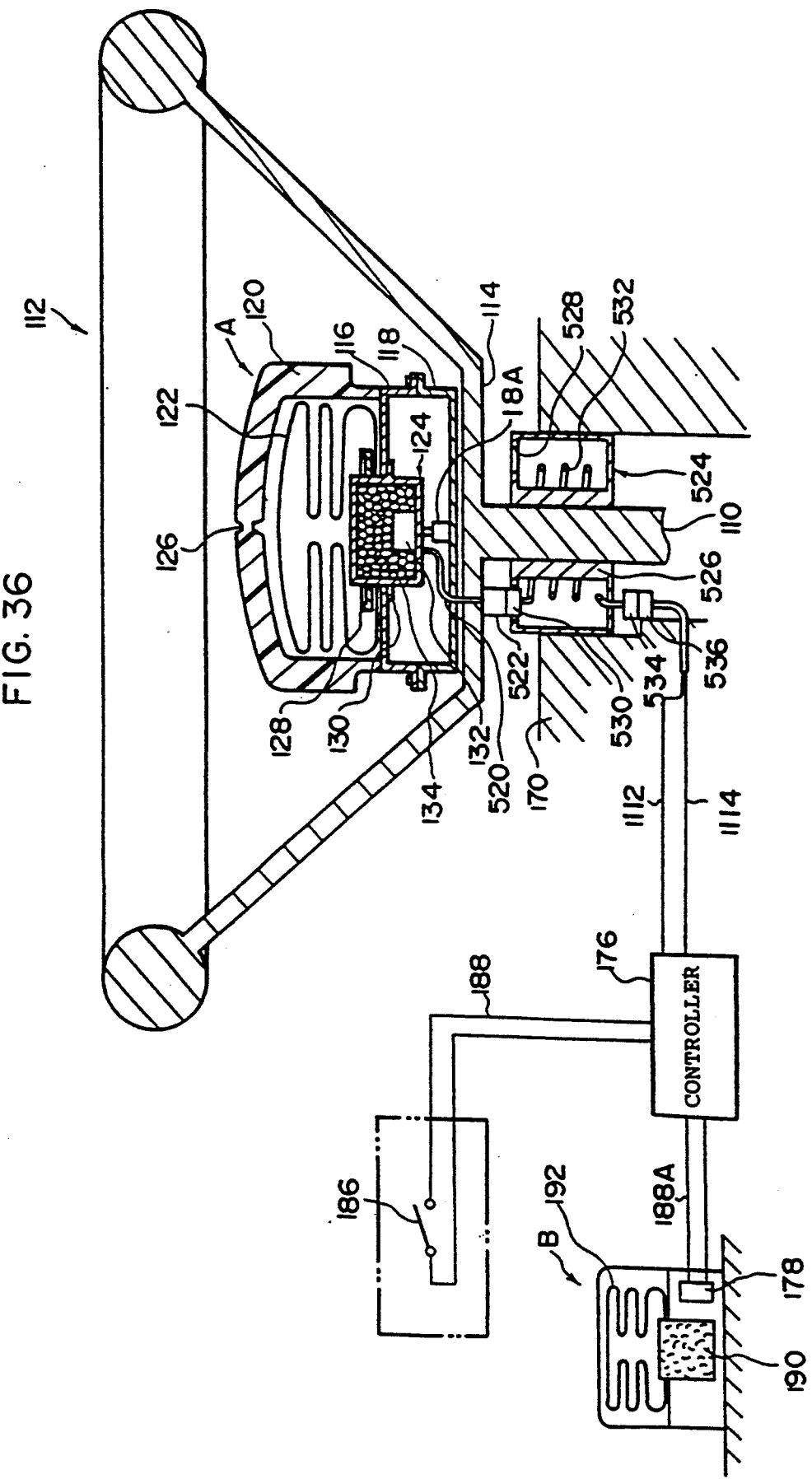
FIG. 36 is a schematic diagram of air bag devices provided for the driver's seat and the passenger's seat, respectively, in accordance with the tenth embodiment.

As shown in FIG. 36, the wirings 1112, 1114 for the detecting portion are bundled together in the form of the wire harness 520 bent and suspended from the lower side, as viewed in FIG. 36, of the hub 114. The connector 522 is provided at the end of the wire harness 520. This connector 522 is connected to the connector 530 of the roll connector 524.

The state of connection of the two wirings 1112, 1114 from the detecting portion 1064 to the controller 176 is securely maintained by means of the roll connector 524.

The connector 534 is connected to the connector 536, from which the two wirings 1112, 1114 are branched off and connected to the controller 176.

The arrangement provided is such that electric current flows from the controller 176 to the filament via a wiring 188A only when the buckle switch 186 is turned on and the a signal from the detecting portion 1064 is inputted to the controller 176. When electric current flows across the filament, Joule heat is produced to ignite the electric detonator 178, which in turn causes the gas generating agent 190 to react, thereby inflating the bag 192.

The operation of this embodiment will be described hereinunder.

In the normal running state of the vehicle, the firing pin 154 is in the state shown in FIG. 37, and since the vibrations of the movable contact 1104 in the normal state are absorbed by means of the coil spring 1110, the contact 1106 and contact 1108 of the detecting portion 1064 are not brought into contact with each other, so that a signal for actuating the air bag device A is not transmitted to the controller 176. Accordingly, the passenger's seat-side air bag device B is not actuated. Thus, the normal running state of the vehicle is maintained.

In this state, when the vehicle undergoes a sudden deceleration, the ball 144 inertially moves greatly in the direction of arrow C in FIG. 35. As a result, as shown in FIG. 37, the drive shaft 146 rotates about the support shafts 146C in the direction of arrow E in FIG. 37, so that the retaining portion 146B is disengaged from the collar 154A of the firing pin 154 (shown in FIG. 38). Consequently, the firing pin 154 moves in the direction of arrow D by means of the urging force of the compression coil spring 158, and collides against the detonator 162. Thus, the occupant seated in the driver's seat is protected positively from the impact occurring at the time of the sudden deceleration of the vehicle.

Figure 38:
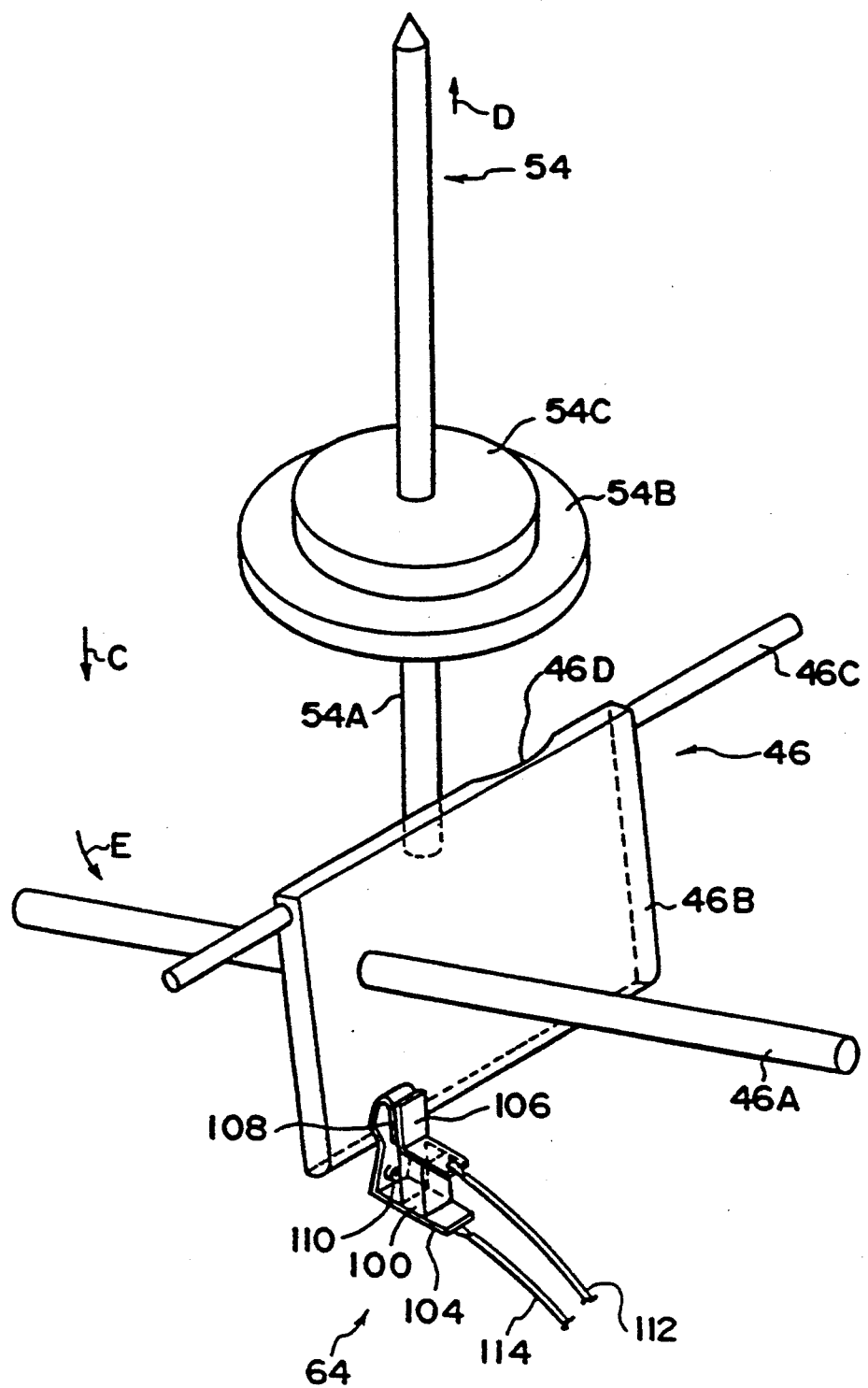
FIG. 38 is a perspective view of an essential portion illustrating the state in which the actuator body shown in FIG. 35 is actuated.

Meanwhile, in conjunction with the movement of the drive shaft 146, the retaining portion 146B rotates about the support shafts 146C, and its end portion abuts against and presses the movable contact 1104, as shown in FIG. 38. As a result, since the contact 1108 is brought into contact with the contact 1106, the contacts 1106, 1108 of the detecting portion 1064 are closed. The state in which the contacts of the detecting portion 164 are closed is detected by the controller 176 via the wirings 1112, 1114.

In the case where the occupant is seated in the passenger's seat, i.e., when the buckle switch 186 is turned on, the determination circuit of the controller 176 determines that the occupant is seated in the passenger's seat, so that a signal from the detection portion 1064 due to the operation of the drive shaft 146 is transmitted to the controller 176. Hence, the controller 176 allows electric current to flow across the filament to generate Joule heat, which in turn ignites the electric detonator 178, causing the gas generating agent 190 to produce a large amount of gas. As a result, the passenger's seat-side air bag device B is actuated, and as the bag 192 is inflated, the occupant seated in the passenger's seat is protected.

In this embodiment, since the contact 1106 and contact 1108 of the detecting portion 1064 are made to abut against each other by virtue of the movement of the drive shaft 146, the contacts are not brought into direct contact with the movement of the firing pin 154. Hence, the passenger's seat-side air bag device B can be actuated positively without losing the kinetic energy of the firing pin 154 until it collides against the detonator 162.

Figure 39:
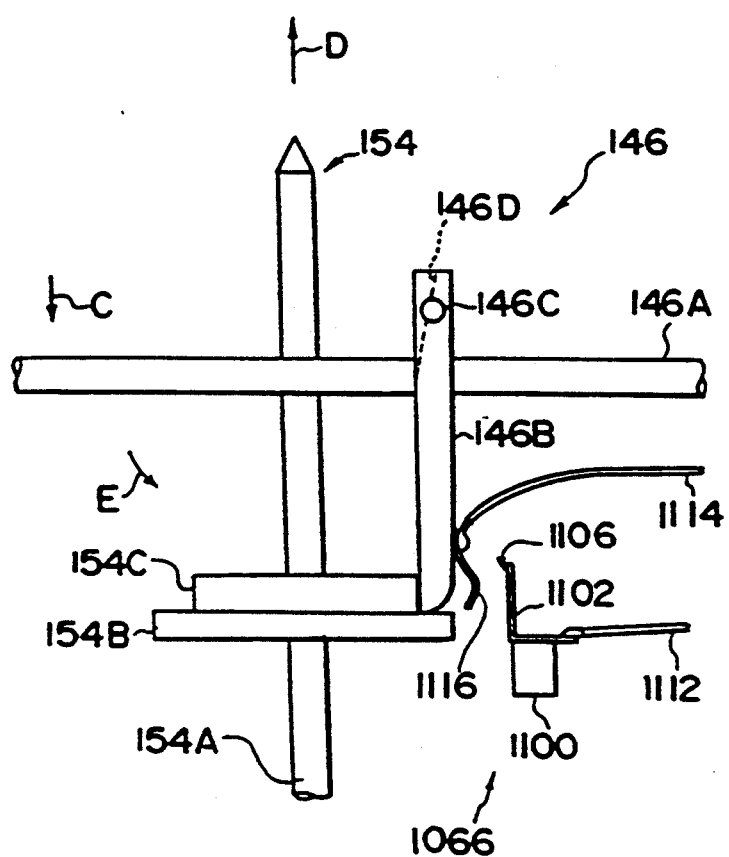
FIG. 39 is a diagram illustrating a modification of the detecting portion.

Although in this embodiment the movement of the drive shaft 146 is detected as the retaining portion 146B presses the movable contact 1108, the arrangement is not restricted to the same, and an arrangement may be alternatively provided, as shown in FIG. 39, such that a contact is provided on the retaining portion 146B, and the contact is closed as the retaining portion 146B moves.

More specifically, as shown in FIG. 39, a contact 1116 is provided in the vicinity of a tip portion of the retaining portion 146B in correspondence with contact 1106 of the fixed contact 1102. This contact 1116 is formed of a tabular configuration, a longitudinal end thereof being secured to the retaining portion 146B, and an intermediate portion thereof projecting arcuately toward the contact 1106. Since the intermediate portion of the contact 1116 is formed into an arcuate configuration, the contact 1116 is provided with resiliency.

Furthermore the contact 1116 is connected to the wiring 1114 for outputting a signal by means of soldering or the like, and the contact 1116 together with the 1106 constitutes a detecting portion 1066. This wiring 1114 is made to detour so as not to hamper the movement of the other components.

As a result, at the time of a sudden deceleration of the vehicle, the inertial movement of the ball 144 causes the drive shaft 146 to rotate about the support shafts 146C in the direction of arrow E in FIG. 39. Hence, the retaining portion 146B is disengaged from the collar 154B, allowing the contact 1116 provided on the retaining portion 146B to abut against the contact 1106.

Figure 40:
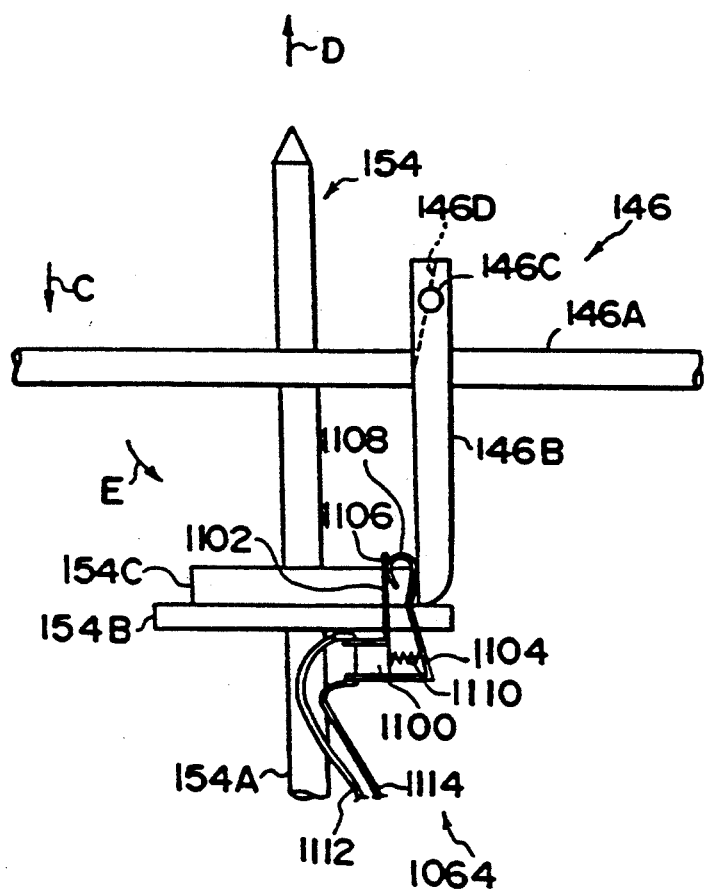
FIG. 40 is a diagram illustrating another modification of the detecting portion.

In addition, the detecting portion 1064 may be so constructed that its contact is opened by the movement of the drive shaft 146. More specifically, as shown in FIG. 40, the detecting portion 1064 may be disposed on the ball 144 side of the retaining portion 146B, so that the movable contact is normally pressed by the retaining portion 146B and is closed. When the vehicle undergoes a sudden deceleration, however, the movement of the drive shaft 146 cancels the pressed state of the movable contact provided on the retaining portion 146B, thereby opening the contact. In this case, as for the controller, it suffices if it detects the state in which the contact of the detecting portion 1064 has opened.

Furthermore, instead of the arrangement in which the contacts of the detecting portion are opened and closed by the movement of the retaining portion 146B of the drive shaft 146, an arrangement may be provided such that a detecting portion is provided for opening and closing the contacts by the movement of another component of the drive shaft 146, e.g, the shaft 146A, or by the rotation of the support shaft 146C.

What is claimed is:

1. An actuator comprising:
   an inertia member adapted to move at the time of a sudden deceleration of a vehicle;
   a moving member adapted to be moved by an urging force with the movement of said inertia member so as to actuate first gas generating means;
   means for holding said moving member in a predetermined position until said inertia member is moved; and
   energizing means for outputting an electrical signal in response to said sudden deceleration of said vehicle so as to actuate second gas generating means simultaneously with an actuation of said first gas generating means upon releasing said means for holding said moving member by movement of said inertia member.

2. An actuator according to claim 1, wherein said energizing means comprises a contact member disposed on said moving member and a contact portion disposed in face-to-face relation with said contact member and adapted to output the electrical signal by coming into contact with said contact member.

3. An actuator according to claim 2, wherein said contact portion comprises a pair of contacts which are electrically connected to each other by the contact with said contact member.

4. An actuator according to claim 1, wherein said energizing means comprises detecting means disposed on a path of movement of said moving member and adapted to detect an impact by coming into a portion of said moving member which is moving, so as to output the electrical signal.

5. An actuator according to claim 1, wherein said energizing means comprises a magnet adapted to move with said moving member and a switch which is turned on by the movement of said magnet and is adapted to output the electrical signal.

6. An actuator according to claim 1, wherein said energizing means comprises a magnetic member provided on at least a portion of said moving member, and electromotive force generating means for outputting an induced electromotive force as the electrical signal as magnetic flux density changes with the movement of said magnetic member as said moving member moves.

7. An actuator according to claim 1, wherein said energizing means comprises a pair of contact members which are set in a state of noncontact with each other by being pressed by said moving member before movement of said moving member, and which are adapted to output the electrical signal by coming into contact with each other by the movement of said moving member.

8. An actuator according to claim 1, wherein said energizing means comprises optical detection means for outputting the electrical signal by optically detecting the movement of one of said inertia member and said moving member.

9. An actuator according to claim 1, wherein said energizing means comprises pressure-change generating means for generating a change in pressure by the movement of said inertia member and conversion means for converting the pressure change into the electrical signal and outputting the electrical signal.

10. An actuator comprising:
an inertia member adapted to move at the time of a sudden deceleration of a vehicle;
a driving arm means adapted to be rotated by the movement of said inertia member;
a moving member having a firing pin whose engagement with said driving arm means is canceled by the rotation of said driving arm means, and which is adapted to be moved by the release of an urging force accumulated in urging means, so as to actuate first gas generating means; and
energizing means which is turned on when movement of said inertia member, the rotation of said driving arm means, release of the urging force of said urging means, and movement of said firing pin take place, and outputs an electrical signal so as to actuate second gas generating means.

11. An actuator according to claim 10, wherein said energizing means comprises a contact member disposed on said moving member and a contact portion disposed in face-to-face relation with said contact member and adapted to output the electrical signal by coming into contact with said contact member.

12. An actuator according to claim 11, wherein said contact portion comprises a pair of contacts which are electrically connected to each other by the contact with said contact member.

13. An actuator according to claim 10, wherein said energizing means comprises detecting means disposed on a path of movement of said moving member and adapted to detect an impact by coming into a portion of said moving member which is moving, so as to output the electrical signal.

14. An actuator according to claim 10, wherein said energizing means comprises a magnet adapted to move with said moving member and a switch which is turned on by the movement of said magnet and is adapted to output the electrical signal.

15. An actuator according to claim 10, wherein said energizing means comprises a magnetic member provided on at least a portion of said moving member, and electromotive force generating means for outputting an induced electromotive force as the electrical signal as magnetic flux density changes with the movement of said magnetic member as said moving member moves.

16. An actuator according to claim 10, wherein said energizing means comprises a pair of contact members which are set in a state of noncontact with each other by being pressed by said moving member before movement of said moving member, and which are adapted to output the electrical signal by coming into contact with each other by the movement of said moving member.

17. An actuator according to claim 10, wherein said energizing means comprises optical detection means for outputting the electrical signal by optically detecting the movement of one of said inertia member and said moving member.

18. An actuator according to claim 10, wherein said energizing means comprises pressure-change generating means for generating a change in pressure by the movement of said inertia member and conversion means for converting the pressure change into the electrical signal and outputting the electrical signal.

19. An actuator according to claim 10, wherein said energizing means comprises a pair of contact members which are brought into contact with each other by the rotation of said drive shaft so as to output the electrical signal.

20. An actuator according to claim 10, wherein said energizing means comprises angle detecting means for detecting a rotational angle of said drive shaft and output means for outputting the electrical signal if an angle detected by said angle detecting means is not less than a predetermined angle.

21. An actuator according to claim 10, wherein said energizing means comprises a pair of contact members which are brought into contact with each other by cancellation of the urging force of said urging means.

* * * * *